(12) United States Patent
Yamahiro

(10) Patent No.: US 10,281,693 B2
(45) Date of Patent: May 7, 2019

(54) INVERTED EQUAL-MAGNIFICATION RELAY LENS AND CAMERA SYSTEM

(71) Applicant: NIKON CORPORATION, Tokyo (JP)

(72) Inventor: Tomohiko Yamahiro, Chigasaki (JP)

(73) Assignee: NIKON CORPORATION, Tokyo (JP)

( * ) Notice: Subject to any disclaimer, the term of this patent is extended or adjusted under 35 U.S.C. 154(b) by 154 days.

(21) Appl. No.: 15/303,787

(22) PCT Filed: May 8, 2015

(86) PCT No.: PCT/JP2015/063317
§ 371 (c)(1),
(2) Date: Jan. 5, 2017

(87) PCT Pub. No.: WO2015/170745
PCT Pub. Date: Nov. 12, 2015

(65) Prior Publication Data
US 2017/0192209 A1    Jul. 6, 2017

(30) Foreign Application Priority Data

May 9, 2014  (JP) ................................. 2014-097568

(51) Int. Cl.
*G02B 13/00*   (2006.01)
*G02B 9/64*    (2006.01)
(Continued)

(52) U.S. Cl.
CPC .......... *G02B 13/0095* (2013.01); *G02B 7/14* (2013.01); *G02B 7/28* (2013.01); *G02B 9/64* (2013.01);
(Continued)

(58) Field of Classification Search
CPC ........ G02B 13/0095; G02B 7/28; G02B 9/64; G02B 9/12; G02B 13/18; G02B 13/26; G02B 15/10; G02B 7/14; H04N 5/23212
(Continued)

(56) References Cited

U.S. PATENT DOCUMENTS

| 5,886,835 A | 3/1999 | Suzuki et al. |
| 2014/0268363 A1 | 9/2014 | Hirayama et al. |

(Continued)

FOREIGN PATENT DOCUMENTS

| JP | S45-030788 Y1 | 11/1970 |
| JP | S61-34644 B2 | 2/1986 |

(Continued)

OTHER PUBLICATIONS

Matsui, Yoshiya. "Methods of Lens Design", Kyoritsu Publishing (1972) pp. 16-21.

(Continued)

*Primary Examiner* — Marin Pichler
(74) *Attorney, Agent, or Firm* — Oliff PLC

(57) ABSTRACT

An inverted equal-magnification relay lens includes, in order from an object side: a first lens group having a positive power, and disposed near an object; a second lens group having a positive power, and disposed at a predetermined distance from the first lens group; and a third lens group having a negative power; wherein an entrance pupil position is more toward an object surface side than the first lens group, an exit pupil position is more toward a third lens group side than an image surface, and the following Formulas (1) and (2) are satisfied: $0.65 \leq |G1F/G2F| \leq 2.0$ . . . (1); $0.35 \leq |G3F/G2F| \leq 3.1$ . . . (2); where: G1F: a focal length of the first lens group; G2F: a focal length of the second lens group; and G3F: a focal length of the third lens group.

24 Claims, 30 Drawing Sheets

(51) Int. Cl.
  *G02B 13/18* (2006.01)
  *G02B 7/14* (2006.01)
  *G02B 7/28* (2006.01)
  *H04N 5/232* (2006.01)
  *G02B 13/26* (2006.01)
  *G02B 15/10* (2006.01)

(52) U.S. Cl.
  CPC .............. *G02B 13/18* (2013.01); *G02B 13/26* (2013.01); *G02B 15/10* (2013.01); *H04N 5/23212* (2013.01)

(58) Field of Classification Search
  USPC .................................. 359/689, 434, 423, 708
  See application file for complete search history.

(56) References Cited

U.S. PATENT DOCUMENTS

| | | |
|---|---|---|
| 2015/0043078 A1 | 2/2015 | Suzuki |
| 2015/0362712 A1* | 12/2015 | Yabe .................... G02B 13/009 359/689 |
| 2016/0238828 A1 | 8/2016 | Toshi et al. |

FOREIGN PATENT DOCUMENTS

| | | |
|---|---|---|
| JP | H8-262321 A | 10/1996 |
| JP | H10-319314 A | 12/1998 |
| JP | H11-271514 A | 10/1999 |
| JP | 4006362 B2 | 11/2007 |
| JP | 2009-40663 A | 2/2009 |
| JP | 2010-102230 A | 5/2010 |
| JP | 2014-157209 A | 8/2014 |
| WO | 2011-158778 A1 | 12/2011 |
| WO | 2013-128856 A1 | 9/2013 |
| WO | 2013-161197 A1 | 10/2013 |

OTHER PUBLICATIONS

O'Shea, Donald C. et al. "Diffractive Optics Design, Fabrication, and Test," Spie Press pp. 206-211.

Nakagawa, Jihei. "Lens Design Engineering," Tokai University Press pp. 186-189.

"Introduction to Diffractive Optical Elements(Enlarged and Revised Edition)," Optronics Co. (2006), Optics Design Research Group of the Optical Society of Japan and Japan Society of Applied Physics Co. pp. 25-28.

Jul. 7, 2015 Search Report issued in International Patent Application No. PCT/JP2015/063317.

Feb. 13, 2018 Office Action issued in Japanese Patent Application No. 2016-517943.

Sep. 5, 2017 Office Action issued in Japanese Patent Application No. 2016-517943.

* cited by examiner

FIG. 7
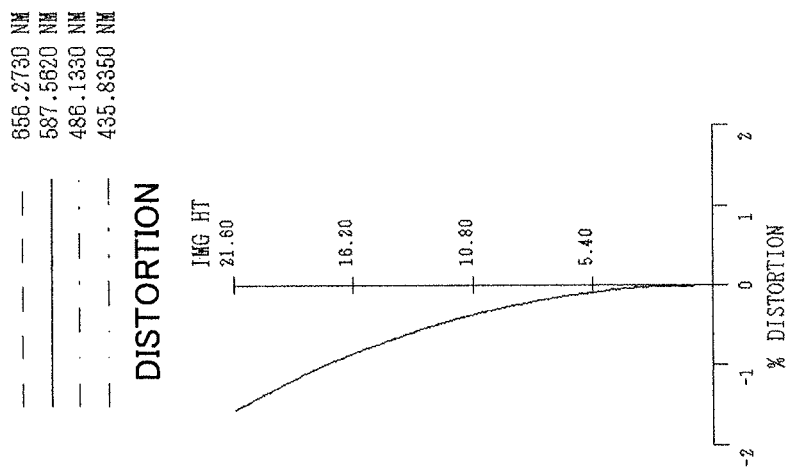
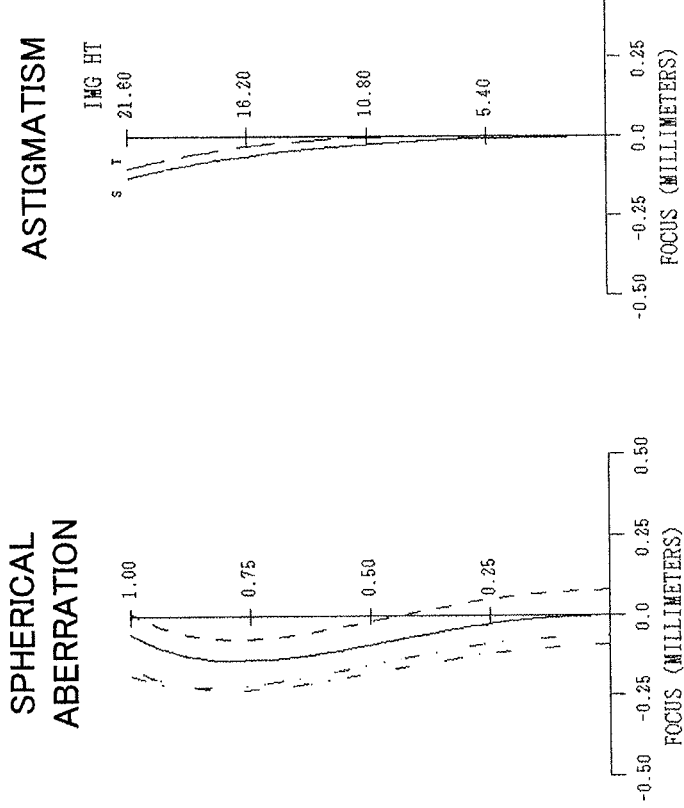

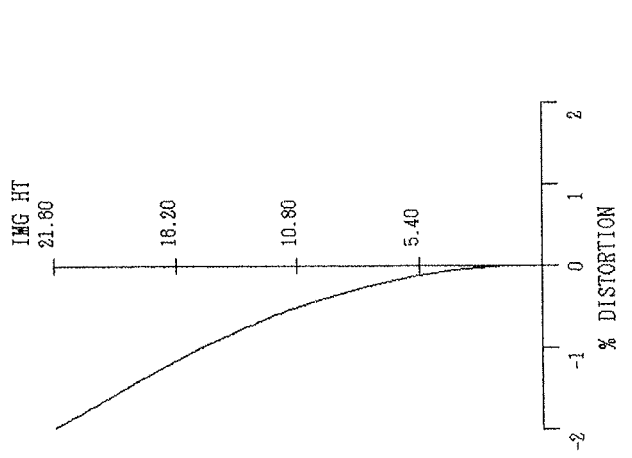
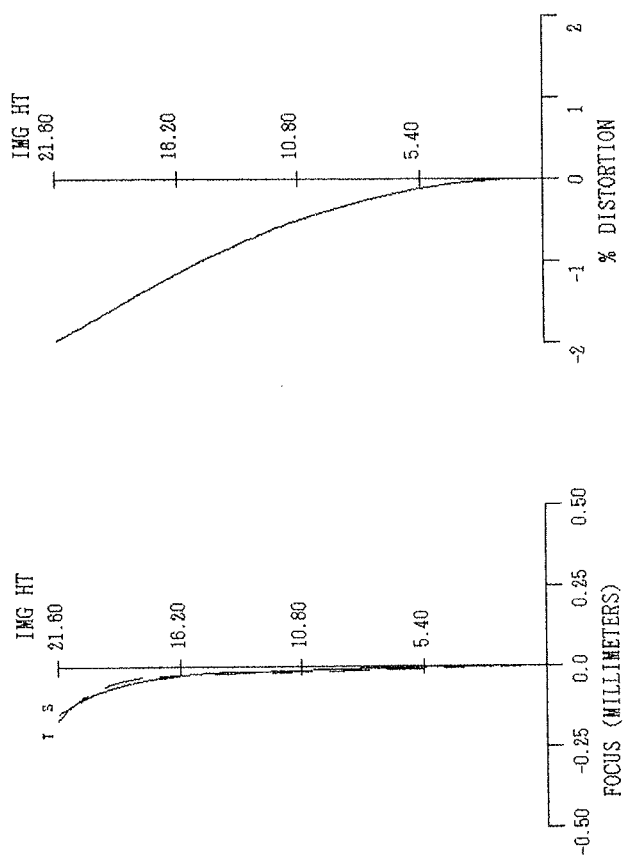
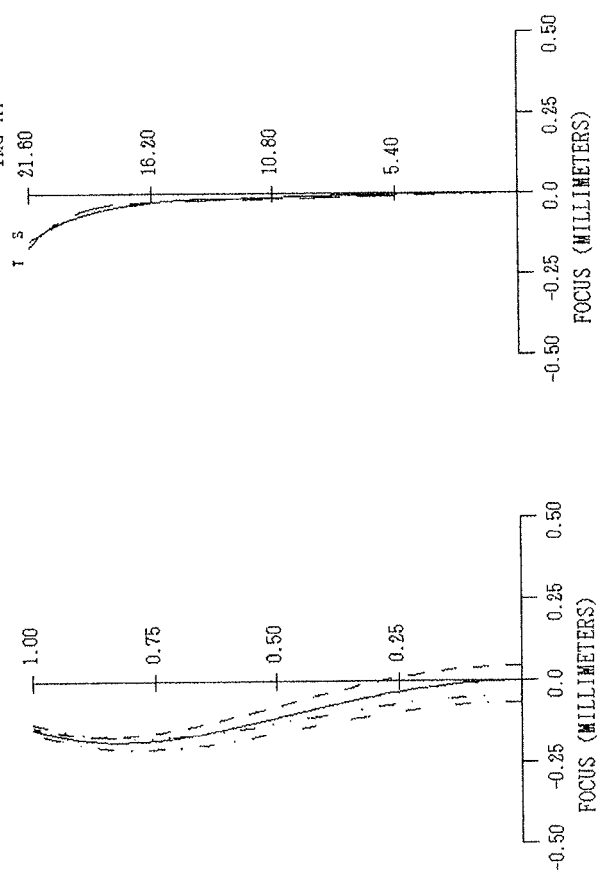
FIG.10

FIG.11
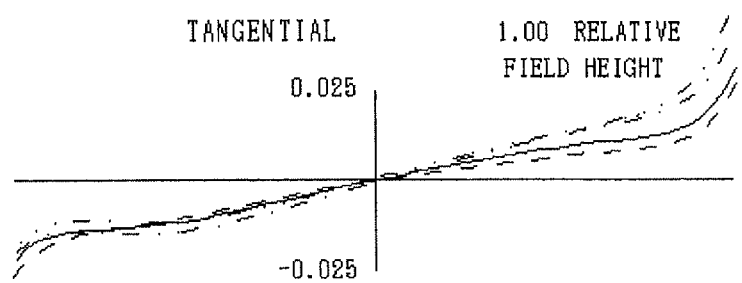
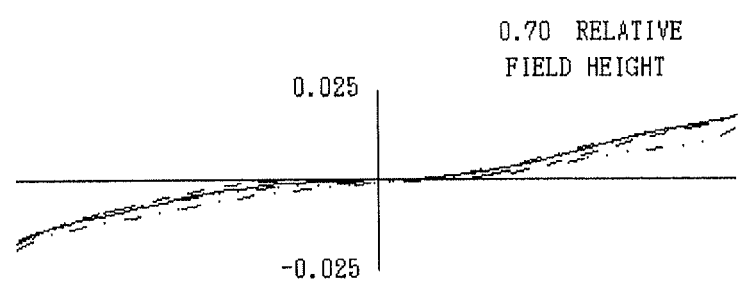
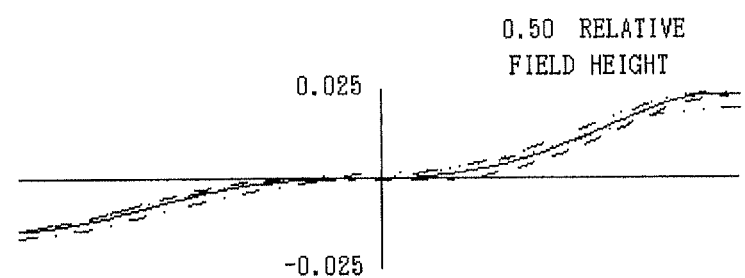
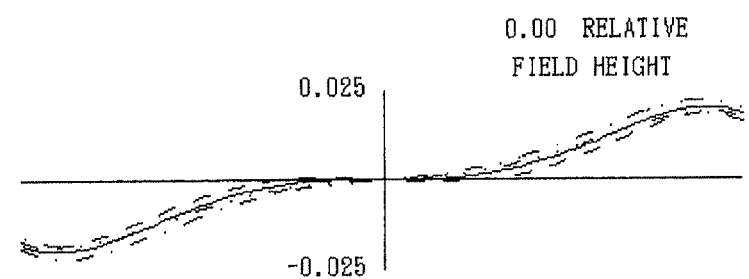

FIG.14
COMATIC ABERRATION
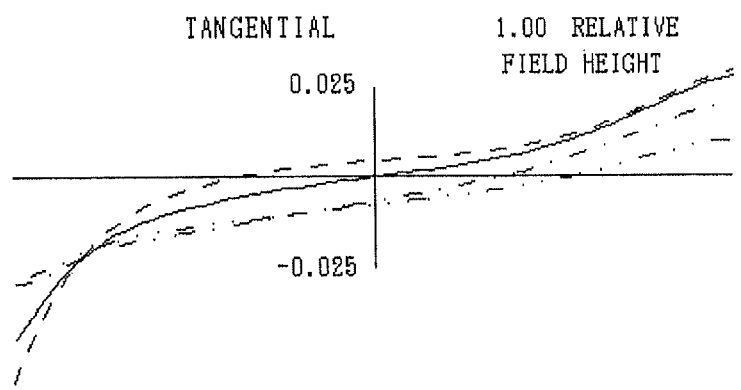
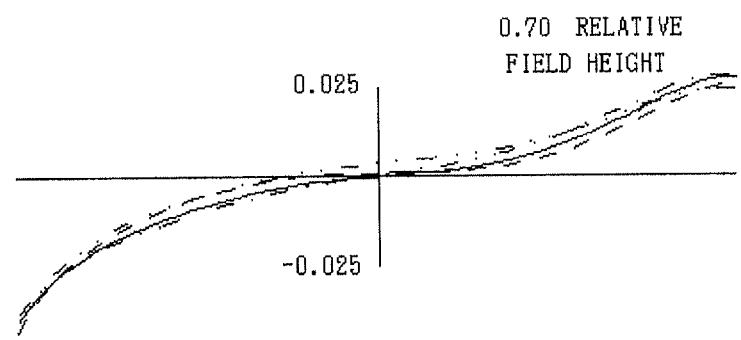
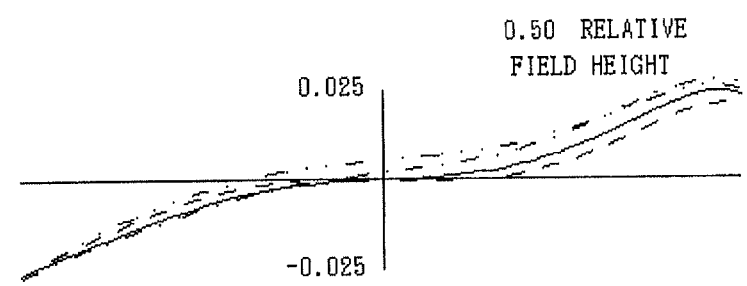
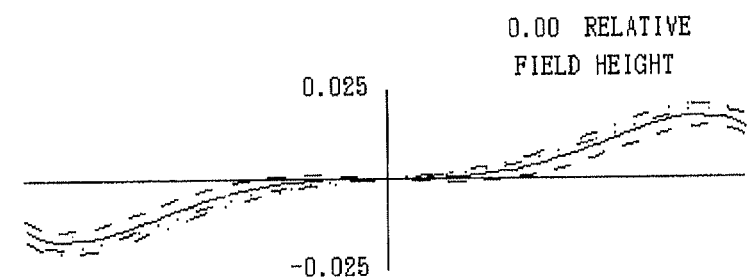

FIG.23
COMATIC ABERRATION
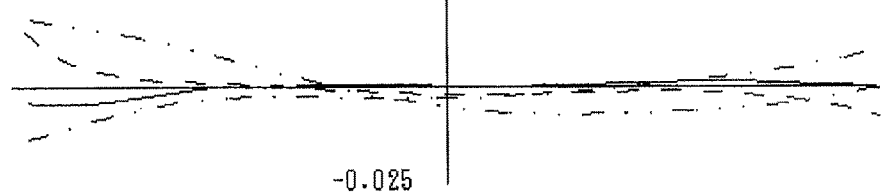
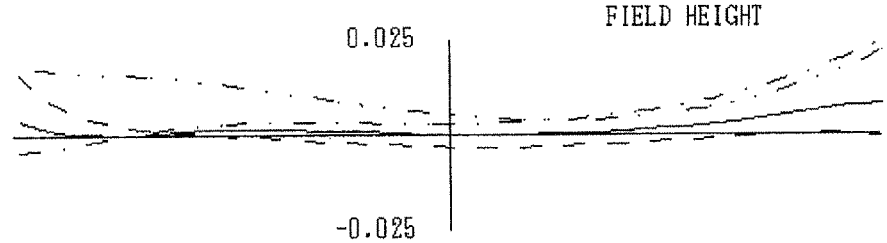
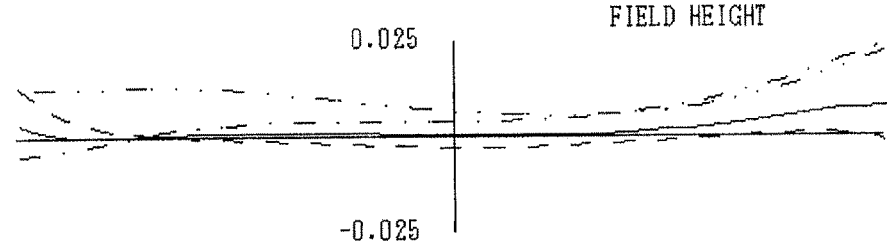
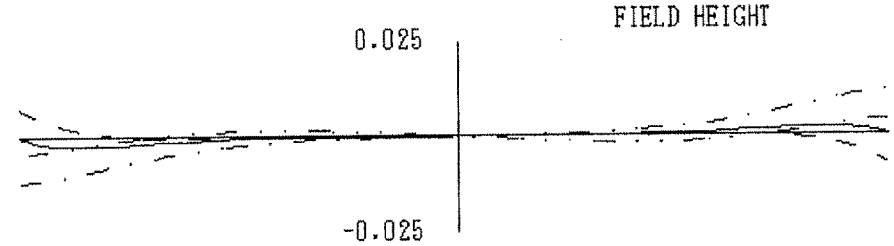

FIG.26
COMATIC ABERRATION
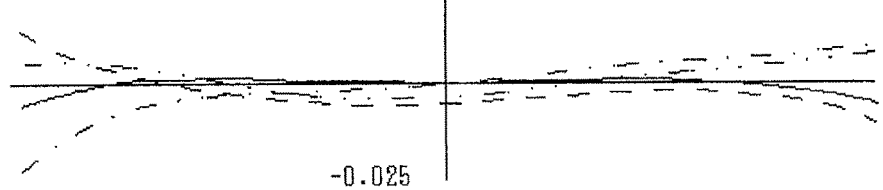
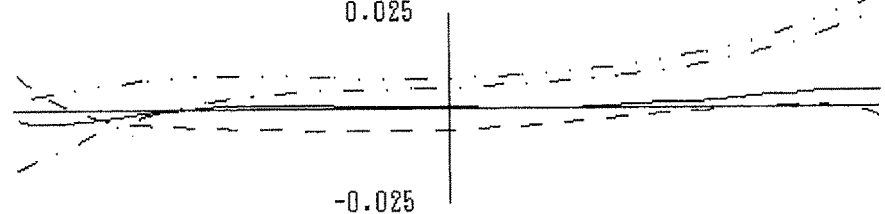
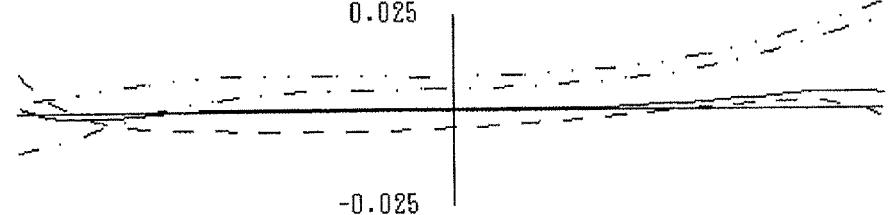
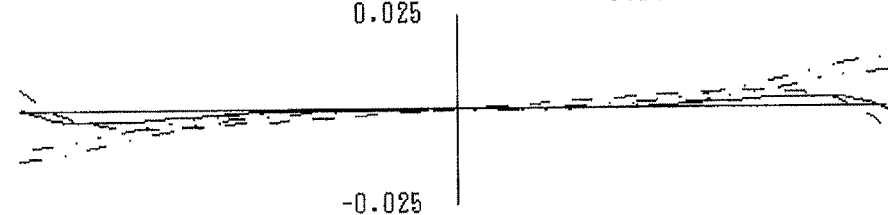

FIG.29
COMATIC ABERRATION
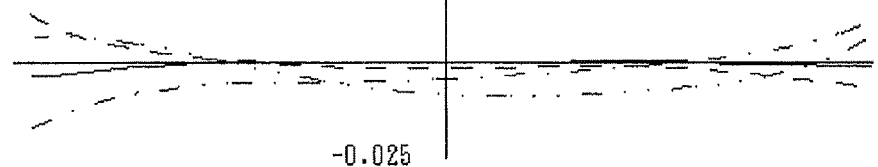
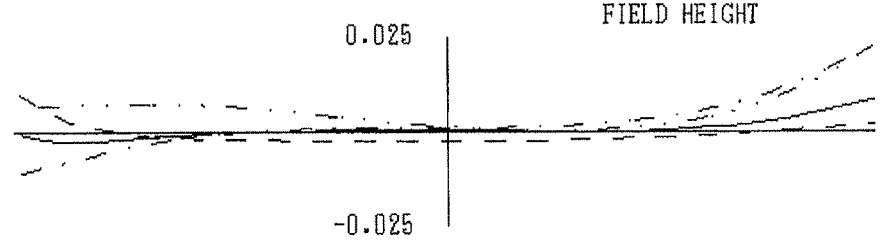
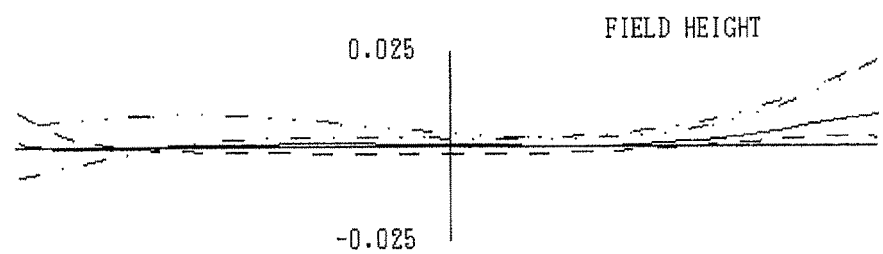
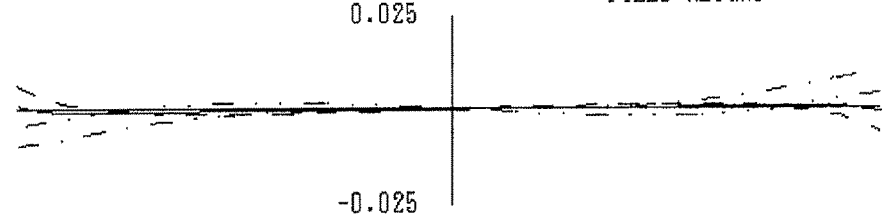

INVERTED EQUAL-MAGNIFICATION RELAY LENS AND CAMERA SYSTEM

TECHNICAL FIELD

The present invention relates to an inverted equal-magnification relay lens and to a camera system.

BACKGROUND ART

In the prior art, for example, optical systems disclosed in Patent Document #1 and in Patent Document #2 have been proposed as inverted equal-magnification relay lenses.

CITATION LIST

Patent Literature

Patent Document #1: Japanese Examined Patent Publication No. S45-30788.
Patent Document #2: Japanese Laid-Open Patent Publication No. H8-262321.

SUMMARY OF INVENTION

Technical Problem

Now, in order to attach to a single lens reflex camera body an interchangeable lens whose flange back distance is short, such as a wide angle lens with a symmetrical optical system of which a Biogon may be taken as being representative, it has been considered to insert a relay lens between the interchangeable lens and the camera body. Furthermore, a technique is disclosed in Japanese Laid-Open Patent Publication 2010-102230 for implementing a light field camera by inserting a micro lens array and a relay lens between an already existing camera body and an interchangeable lens. It should be understood that no structure for the relay lens is disclosed in Japanese Laid-Open Patent Publication 2010-102230 in concrete terms.

The case of inserting a relay lens between an interchangeable lens and a camera body in this manner will now be considered. The inverted equal-magnification relay lens disclosed in Patent Document #1 has sufficient brightness at an F.No. of 2, the supported image height is 24.3 mm, and its back focus is also 75 mm or greater. However, with this inverted equal-magnification relay lens, since the entrance pupil position is on the image surface side, accordingly, when this lens is inserted between an interchangeable lens and a camera body, the separation between the entrance pupil position of the inverted equal-magnification relay lens and the exit pupil position of the interchangeable lens is great, so that only the vicinity of the center of the optical axis can be focused. Moreover, with the inverted equal-magnification relay lens disclosed in Patent Document #2, the supported image height is 31.75 mm, and its NA (numerical aperture) is 0.3 or greater, so that it is extremely bright. However since, with this inverted equal-magnification relay lens, in a similar manner to the case with the inverted equal-magnification relay lens disclosed in Patent Document #1, the entrance pupil position is on the image surface side, and since also the back focus is only 1 mm, accordingly this lens cannot be attached to a single lens reflex camera body, because it interferes undesirably with a quick return mirror within the single lens reflex camera body.

In this manner, since an inverted equal-magnification relay lens as proposed in the prior art becomes an almost perfect symmetrical optical system across the aperture, accordingly the entrance pupil position and the exit pupil position are internal to the optical system. Due to this, when a prior art inverted equal-magnification relay lens is inserted between an interchangeable lens and a camera body, the separation between the exit pupil of the interchangeable lens and the entrance pupil of the inverted equal-magnification relay lens becomes great.

Solution to Problem

According to the 1st aspect of the present invention, an inverted equal-magnification relay lens comprises, in order from an object side: a first lens group having a positive power, and disposed near an object; a second lens group having a positive power, and disposed at a predetermined distance from the first lens group; and a third lens group having a negative power; wherein an entrance pupil position is more toward an object surface side than the first lens group, an exit pupil position is more toward a third lens group side than an image surface, and the following Formulas (1) and (2) are satisfied:

$$0.65 \leq |G1F/G2F| \leq 2.0 \tag{1}$$

$$0.35 \leq |G3F/G2F| \leq 3.1 \tag{2}$$

where:
G1F: a focal length of the first lens group;
G2F: a focal length of the second lens group; and
G3F: a focal length of the third lens group.

According to the 2nd aspect of the present invention, in the inverted equal-magnification relay lens according to the first aspect, it is preferred that the following Formula (3) is satisfied:

$$1.7 \leq |E_{G1\text{-}G2}/E_{G2\text{-}G3}| \leq 6.2 \tag{3}$$

where:
$E_{G1\text{-}G2}$ is a distance between an image side principal point of the first lens group and an object side principal point of the second lens group; and
$E_{G2\text{-}G3}$ is the distance between an image side principal point of the second lens group and an object side principal point of the third lens group.

According to the 3rd aspect of the present invention, in the inverted equal-magnification relay lens according to the 1st or 2nd aspect, it is preferred that focusing is performed by shifting one of lenses comprised in the second lens group.

According to the 4th aspect of the present invention, in the inverted equal-magnification relay lens according to any one of the 1st through 3rd aspects, it is preferred that the second lens group comprises in order from the object side, a first cemented meniscus lens that presents its concave surface toward the image side and that comprises a positive lens and a negative lens, and a single concave meniscus lens or a second cemented meniscus lens comprising a negative lens and a positive lens, opposing the first cemented meniscus lens with an aperture stop being sandwiched between them, and presenting its concave surface toward the object side; the third lens group comprises a biconcave lens; an object side NA is less than or equal to 0.125; and the following Formula (5) is satisfied:

$$|Y/G3F| \geq 0.12 \tag{5}$$

where:
Y (>0): a maximum image height; and
G3F: a focal length of the third lens group.

According to the 5th aspect of the present invention, in the inverted equal-magnification relay lens according to any one of the 1st through 4th aspects, it is preferred that the following Formula (6) is satisfied:

$$0.9 \leq ENT.P/EXT.P \leq 1.1 \quad (6)$$

where:

ENT.P: a distance from an object surface to an entrance pupil plane at a maximum image height; and EXT.P: a distance from an exit pupil plane to an image surface at a maximum image height.

According to the 6th aspect of the invention, in the inverted equal-magnification relay lens according to any one of the 1st through 5th aspects, it is preferred that a lens surface in the first lens group most toward the object side is a plane or a convex surface with respect to the object; and the following Formulas (7) and (8) are satisfied:

$$WD \geq 50 \cdot \lambda/NA^2 \quad (7)$$

$$D/Y \geq 1.8 \quad (8)$$

where:

WD: a distance from an object surface to the lens surface of the first lens group most toward the object side;

$\lambda$: a main wavelength used;

NA: an object side numerical aperture;

D: a distance from the lens surface of the third lens group most toward the image surface side to the image surface; and Y (>0): a maximum image height.

According to the 7th aspect of the present invention, in the inverted equal-magnification lens according to any one of the 1st through 6th aspects, it is preferred that the second lens group comprises a first cemented meniscus lens that presents its concave surface toward the image side and that comprises a positive lens and a negative lens, and a single concave meniscus lens or a second cemented meniscus lens comprising a negative lens and a positive lens, opposing the first cemented meniscus lens with an aperture stop being sandwiched between them, and presenting its concave surface toward the object side; the third lens group comprises a biconcave lens; and a Condition (9) described in the embodiments is satisfied.

According to the 8th aspect of the present invention, in the inverted equal-magnification relay lens according to any one of the 1st through 7th aspects of the invention, it is preferred that the second lens group comprises a first cemented meniscus lens that presents its concave surface toward the image side and that comprises a positive lens and a negative lens, and a single concave meniscus lens or a second cemented meniscus lens comprising a negative lens and a positive lens, opposing the first cemented meniscus lens with an aperture stop being sandwiched between them, and presenting its concave surface toward the object side; and at least one of the first cemented meniscus lens and the second cemented meniscus lens is a three-layered cemented lens.

According to the 9th aspect of the present invention, in the equal-magnification relay lens according to any one of the 1st through 8th aspects, it is preferred that the second lens group comprises a first cemented meniscus lens that presents its concave surface toward the image side and that comprises a positive lens and a negative lens, and a single concave meniscus lens or a second cemented meniscus lens comprising a negative lens and a positive lens, opposing the first cemented meniscus lens with an aperture stop being sandwiched between them, and presenting its concave surface toward the object side; and furthermore, in addition to the first cemented meniscus lens and the second cemented meniscus lens or the single concave meniscus lens, the second lens group also comprises at least one cemented doublet lens comprising a negative lens and a positive lens.

According to the 10th aspect of the present invention, in the inverted equal-magnification relay lens according to any one of the 1st through 9th aspects, it is preferred that the second lens group comprises an optical member comprising a glass member and a diffractive optical element bonded to the glass member; and the diffractive optical element comprises two different resin members that are bonded together, and has a diffractive optical surface at the interface therebetween upon which diffraction grating grooves are formed.

According to the 11th aspect of the present invention, in the inverted equal-magnification relay lens according to the 10th aspect, it is preferred that the following Condition (23) is satisfied:

$$23.0 \leq |f_{DOE}/G2F| \leq 57.0 \quad (23)$$

where:

G2F: a focal length of the second lens group; and $f_{DOE}$: a focal length of the diffractive optical element.

According to the 12th aspect of the present invention, in the inverted equal-magnification relay lens according to the 10th aspect, it is preferred that the following Condition (24) is satisfied:

$$0.09 \leq P_{min} \leq 0.20 \quad (24)$$

where:

$P_{min}$: the minimum pitch of the diffraction grating grooves of the diffractive optical element.

According to the 13th aspect of the present invention, in the inverted equal-magnification relay lens according to any one of the 10th through 12th aspects, wherein the following Condition (25) is satisfied:

$$0.4 \leq \Phi_{DOE}/\Phi_{MAX} \leq 0.9 \quad (25)$$

where:

$\Phi_{DOE}$: a diameter of a light flux passing through the diffractive optical surface of the diffractive optical element; and $\Phi_{MAX}$: a maximum diameter of a light flux passing through the second lens group.

According to the 14th aspect of the present invention, in the inverted equal-magnification relay lens according to any one of the 10th through 13th aspects, it is preferred that a maximum angle of a light beam that is incident upon the diffractive optical surface of the diffractive optical element is limited to within 25° with respect to a normal to a base radius of curvature that forms the diffractive optical surface.

According to the 15th aspect of the present invention, in the inverted equal-magnification relay lens according to any one of the 10th through 14th aspects, it is preferred that a Condition (26) described in the embodiments is satisfied in relation to the m unit lens elements and the diffractive optical element that constitute the entirety of the inverted equal-magnification relay lens.

According to the 16th aspect of the present invention, in the inverted equal-magnification relay lens according to any one of the 10th through 15th aspects, it is preferred that the third lens group comprises an aspheric optical surface, and the following Condition (27) is satisfied:

$$Y/TL \geq 0.08 \quad (27)$$

where:

Y (>0): a maximum image height; and

TL: a lens total length, from object surface to image surface.

According to the 17th aspect of the present invention, it is preferred that the inverted equal-magnification relay lens according to the 1st through 15th aspects further comprises an optical axis folding member that is disposed between the first lens group and the second lens group, wherein the optical axis folding member folds the optical axis between the first lens group and the second lens group into a cranked shape.

According to the 18th aspect of the present invention, a camera system comprises: an attachable and detachable interchangeable lens; an attachable and detachable camera body; and an intermediate adapter installed between the interchangeable lens and the camera body, wherein: the intermediate adapter comprises an inverted equal-magnification relay lens according to any one of the 1st through 17th aspects; and the inverted equal-magnification relay lens makes the focal plane of the interchangeable lens and the image formation surface of the camera body be conjugate with each other.

According to the 19th aspect of the present invention, a camera system comprises: an attachable and detachable interchangeable lens; an attachable and detachable camera body; and an intermediate adapter installed between the interchangeable lens and the camera body, wherein: the intermediate adapter includes an optical element comprising a plurality of lenses arranged in a two dimensional array, and an inverted equal-magnification relay lens according to any one of the 1st through 17th aspects; the optical element is disposed in the vicinity of the focal plane of the interchangeable lens; and the inverted equal-magnification relay lens makes the focal plane of the optical element and the image formation surface of the camera body be conjugate with each other.

Advantageous Effects of Invention

According to the present invention, it is possible to bring the entrance pupil of the inverted equal-magnification relay lens close to the exit pupil of the interchangeable lens.

BRIEF DESCRIPTION OF DRAWINGS

FIG. 7 is a figure showing spherical aberration, astigmatism, and distortion of this inverted equal-magnification relay lens according to the second example;

FIG. 10 is a figure showing spherical aberration, astigmatism, and distortion of this inverted equal-magnification relay lens according to the third example;

FIG. 11 is a figure showing comatic aberration of this inverted equal-magnification relay lens according to the third example;

FIG. 14 is a figure showing comatic aberration of this inverted equal-magnification relay lens according to the fourth example;

FIG. 23 is a figure showing comatic aberration of this inverted equal-magnification relay lens according to the seventh embodiment;

FIG. 26 is a figure showing comatic aberration of this inverted equal-magnification relay lens according to the eighth example;

FIG. 29 is a figure showing coma aberration of this inverted equal-magnification relay lens according to the ninth example.

DESCRIPTION OF EMBODIMENTS

Figure 1:
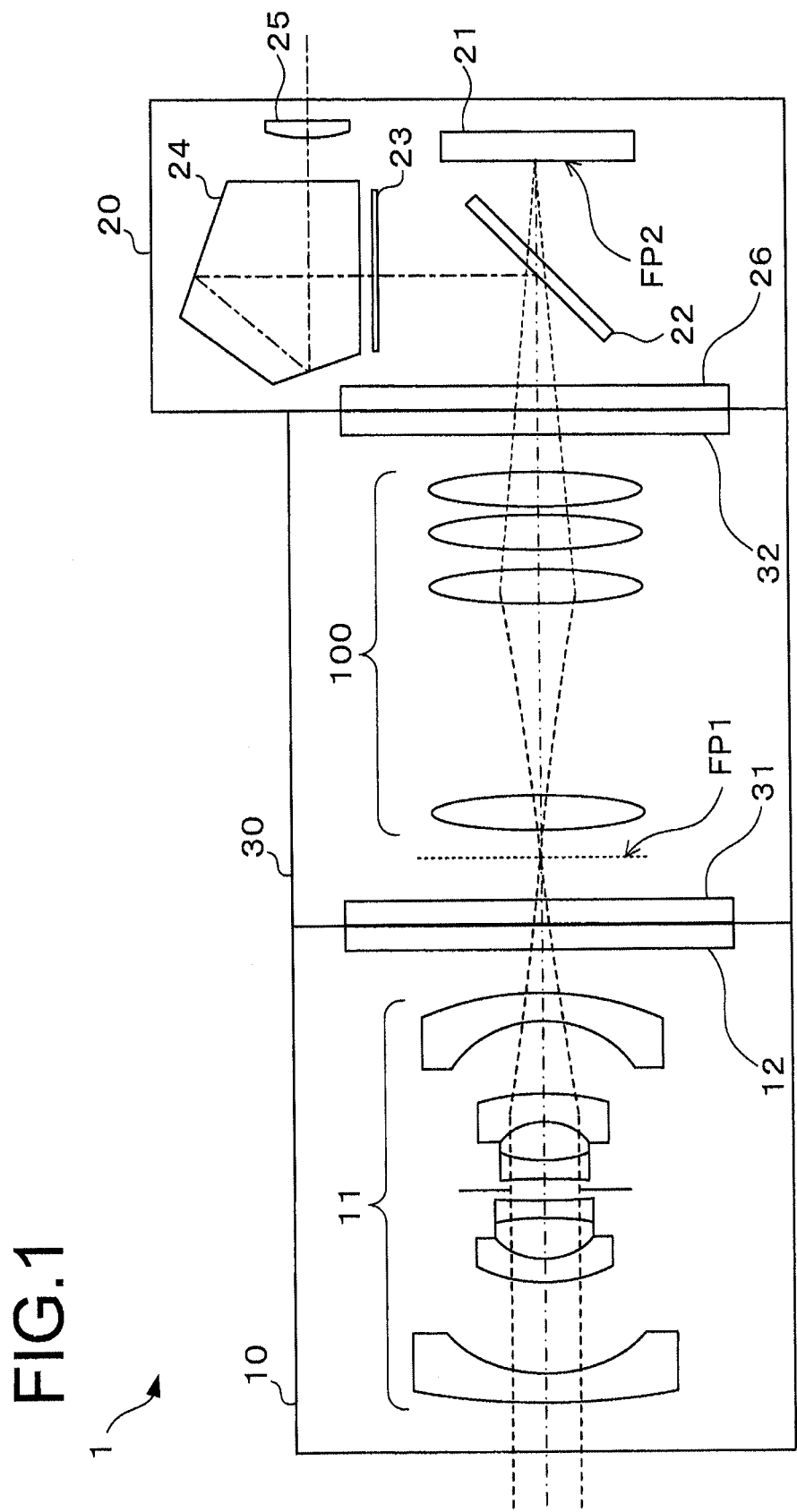
FIG. 1 is a figure for explanation of the structure of a first camera system.

An embodiment of the present invention will now be explained with reference to the drawings. First, a case in which an inverted equal-magnification relay lens 100 according to this embodiment is used in a first camera system 1 will be explained with reference to FIG. 1. This first camera system 1 comprises a detachable interchangeable lens 10, a detachable single lens reflex camera body 20, and an intermediate adapter 30 that is installed between the interchangeable lens 10 and the camera body 20. It should be understood that only devices and components related to the present invention are shown in FIG. 1; other devices and components are not shown in the figure and explanation thereof is omitted.

The interchangeable lens 10 is a lens barrel that includes a lens 11 and a lens side mounting portion 12. The camera body 20 comprises an image sensor (image capturing element) 21, a quick return mirror 22, a viewfinder screen 23, a pentaprism 24, an ocular lens 25, and a body side mounting portion 26. Before shutter release, light from a photographic subject that is incident into the camera body 20 is reflected by the quick return mirror 22 that is in the mirror down state shown by way of example in FIG. 1, and is focused upon the diffusing surface of the viewfinder screen 23. A light flux that has been diffused by the viewfinder screen 23 is incident into the pentaprism 24, and is conducted to the ocular lens 25. On the other hand, after shutter release, the quick return mirror 22 is rotated upward (so that it goes into the mirror up state), and the light flux from the photographic subject that is incident into the camera body 20 is conducted to the image sensor 21, and an image of the photographic subject is focused upon the photographic image surface of that image sensor 21. The image sensor 21 captures this image of the photographic subject that is focused upon its photographic image surface, and outputs an image signal corresponding to this image of the photographic subject. It should be understood that already existing devices may be employed as the interchangeable lens 10 and as the camera body 20.

The intermediate adapter 30 comprises an inverted equal-magnification relay lens 100 that will be described hereinafter, a lens mounting portion 31, and a body mounting portion 32. The lens side mounting portion 12 of the interchangeable lens 10 can be attached to and detached from the lens mounting portion 31 of the intermediate adapter 30. Moreover, the body mounting portion 32 of the intermediate adapter 30 can be attached to and detached from the body side mounting portion 26 of the camera body 20.

The photographic lens 11 of the interchangeable lens 10 is a short flange back distance lens such as a wide angle lens of a symmetric optical system, of which, for example, a Biogon is representative. Due to this, the interchangeable lens 10 cannot be directly installed to the camera body 20, since the photographic lens 11 would undesirably interfere with the quick return mirror 22 of the camera body 20. Accordingly, in this first camera system, the intermediate adapter 30 is inserted between the interchangeable lens 10 and the camera body 20.

The inverted equal-magnification relay lens 100 of the intermediate adapter 30 makes the focal plane FP1 of the interchangeable lens 10 (i.e. the focal plane of the lens 11) be conjugate with the image formation surface FP2 of the camera body 20 (i.e. the photographic image surface of the image sensor 21). Accordingly, the image of the photographic subject that has been focused upon the focal plane FP1 by the photographic lens 11 is relayed by the inverted equal-magnification relay lens 100, and is focused into an image upon the photographic image surface FP2 of the image sensor 21. Due to this, the image of the photographic subject that is focused by the photographic lens 11 of the interchangeable lens 10 can be captured by the image sensor 21 of the camera body 20.

As explained above, in this first camera system 1, by installing the intermediate adapter 30 described above to the interchangeable lens 10 whose flange back distance is short and that accordingly cannot be directly installed to the camera body 20, it is arranged for it to be possible to attach the interchangeable lens 10 to the camera body 20 while maintaining its photographic magnification just as it is without alteration.

Figure 2:
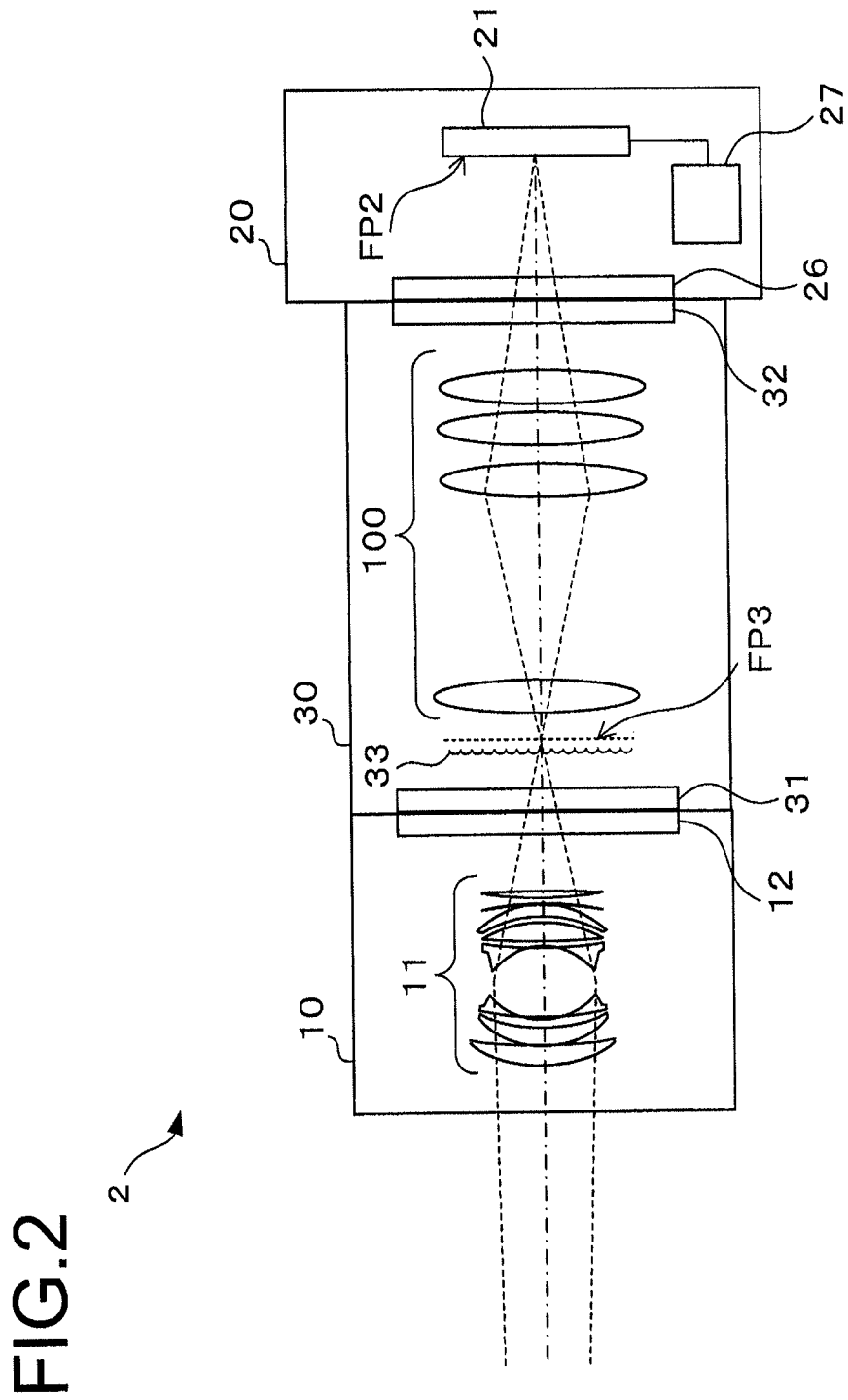
FIG. 2 is a figure for explanation of the structure of a second camera system.

Next, a case in which the inverted equal-magnification relay lens 100 according to this embodiment is used in a second camera system 2 will be explained with reference to FIG. 2. In a similar manner to the case with the first camera system 1, this second camera system 2 also comprises a detachable interchangeable lens 10, a detachable camera body 20, and an intermediate adapter 30 that is installed between the interchangeable lens 10 and the camera body 20. It should be understood that only devices and components related to the present invention are shown in FIG. 2; other devices and components are not shown in the figure and explanation thereof is omitted.

The interchangeable lens 10 is a lens barrel that includes a photographic lens 11 and a lens side mounting portion 12. The camera body 20 comprises an image sensor 21 and a body side control unit 27. The body side control unit 27 comprises a microcomputer and RAM and peripheral circuitry thereof and so on, not shown in the figures. It is possible to install the interchangeable lens 10 directly to the camera body 20 and to perform photography. In this case, a light flux from the photographic subject is conducted from the interchangeable lens 10 to the image sensor 21 of the camera body 20, and an image of the photographic subject is focused upon the photographic image surface of that image sensor 21. The image sensor 21 captures the image of the photographic subject that is focused upon its photographic image surface, and outputs an image signal corresponding to the image of the photographic subject. And the body side control unit 27 performs predetermined image processing upon this image signal outputted from the image sensor 21. It should be understood that already existing devices may be employed as the interchangeable lens 10 and as the camera body 20.

Moreover, in the second camera system 2, the intermediate adapter 30 may be inserted between the interchangeable lens 10 and the camera body 20. This intermediate adapter 30 comprises an inverted equal-magnification relay lens 100 that will be described hereinafter, a lens mounting portion 31, a body mounting portion 32, and a micro lens array 33. The lens side mounting portion 12 of the interchangeable lens 10 can be attached to and detached from the lens mounting portion 31 of the intermediate adapter 30. Moreover, the body side mounting portion 26 of the camera body 20 can be attached to and detached from the body mounting portion 32 of the intermediate adapter 30.

The micro lens array 33 includes a plurality of micro lenses that are arranged in a two dimensional array, and is disposed in the neighborhood of the focal plane of the interchangeable lens 10 (i.e. of the photographic lens 11). Due to each of the micro lenses of the micro lens array 33, the exit pupil of the interchangeable lens 10 (i.e. of the photographic lens 11) becomes conjugate with the focal plane FP3 of the micro lens array 33 (i.e. with the surface that includes the positions of the focal point of each of the micro lenses). The inverted equal-magnification relay lens 100 brings the focal plane FP3 of the micro lens array 33 and the image formation surface of the camera body 20 (i.e. the photographic image surface of the image sensor 21) to be conjugate with each other. Accordingly, the photographic image surface of the image sensor 21 becomes approximately conjugate with the exit pupil of the interchangeable lens 10 via each of the micro lenses of the micro lens array 33 and the inverted equal-magnification relay lens 100. Due to this, as disclosed in Japanese Laid-Open Patent Publication 2010-102230, a plurality of images of the exit pupil of the interchangeable lens 10 are formed upon the photographic image surface of the image sensor 21. It should be understood that each of the micro lenses of the micro lens array 33 covers a predetermined number of pixels upon the image sensor 21 of the camera body 20 (for example 3×3 pixels), and that each light flux that has passed through each of the micro lenses is received by that predetermined number of pixels.

With this type of structure, on the basis of the image signal output from the image sensor 21, the body side control unit 27 of the camera body 20 is able to generate an image at any desired photographic subject distance by performing the arithmetic processing disclosed in Japanese Laid-Open Patent Publication 2010-102230. In other words, after photography, from the image signal obtained from a single photographic shot, it is possible to implement a light field camera function of generating an image in which the focus is set to any desired photographic subject distance.

As has been described above, with this second camera system 2, it is possible to implement a light field camera function without changing the photographic magnification of the already existing interchangeable lens 10, merely by installing the above described intermediate adapter 30 between the already existing interchangeable lens 10 and camera body 20. Moreover, since it is not necessary to perform a great deal of restructuring of the hardware of the camera body 20 for the light field camera function, and it is sufficient only to perform minor retrofitting by installing the program for performing image processing for the light field camera function and so on, accordingly it is possible to implement the light field camera function at a cheap price.

Next, the inverted equal-magnification relay lens 100 according to this embodiment, in other words the inverted equal-magnification relay lens 100 that is employed in the first camera system 1 or in the second camera system 2 described above, will be explained. First, a summary of this inverted equal-magnification relay lens 100 will be explained. The inverted equal-magnification relay lens 100 is inserted between the already existing interchangeable lens 10 and camera body 20, and, for focusing into an image height up to around Leica size 21.6 mm, it is necessary for the entrance pupil position of the inverted equal-magnification relay lens 100 to be positioned toward the object surface side, and furthermore for the distance at the maximum image height from the object surface to the entrance pupil plane and the distance from the exit pupil plane to the image surface generally to agree with one another. Moreover, in view of enhancing the sensitivity of the recent image sensors, it is desirable in practice to adapt the NA of the inverted equal-magnification relay lens 100 to be 0.125 or less.

Accordingly, with the inverted equal-magnification relay lens 100 according to this embodiment, the exit pupil position in order to correspond to the exit pupil of the interchangeable lens 10 is on the object surface side, and the back focus is sufficiently ensured so that there is no interference with the quick return mirror 22 within the single lens reflex camera body 20. Furthermore, with the inverted equal-magnification relay lens 100 according to this embodiment, the distance from the object surface to the entrance pupil plane at the maximum image height and the distance from the exit pupil plane to the image surface are approximately the same, and, with the object side NA being 0.125 or less, the image height can be up to approximately the Leica size.

Next, the structure of the inverted equal-magnification relay lens 100 according to this embodiment will be explained with reference to FIG. 3. The inverted equal-magnification relay lens 100 comprises, in order from the object side, a first lens group G1, a second lens group G2, and a third lens group G3. The first lens group G1 has an overall positive power, and is disposed near the object. The second lens group G2 is disposed with an appropriate distance separating it from the first lens group G1, and has an overall positive power. And the third lens group G3 has a negative power.

The first lens group G1 is a device for positioning the entrance pupil more toward the object surface O than the first lens group G1. It should be understood that the object surface O of the inverted equal-magnification relay lens 100 is the image formation surface at which an image of the photographic subject is focused by the interchangeable lens 10 (i.e., it is the focal plane of the interchangeable lens 10). Moreover, the exit pupil is positioned by the third lens group G3 at a position more toward the third lens group G3 than the image surface I. It should be understood that the image surface I of the inverted equal-magnification relay lens 100 is the image formation surface where an image of the photographic subject is formed in the camera body 20 (i.e., it is the photographic image surface of the image sensor 21). Furthermore, the power distributions between the first lens group G1, the second lens group G2, and the third lens group G3 that make up the inverted equal-magnification relay lens 100 (in other words, the ratios of their focal lengths) satisfy the following Conditions (1) and (2):

$$0.65 \leq |G1F/G2F| \leq 2.0 \quad (1)$$

$$0.35 \leq |G3F/G2F| \leq 3.1 \quad (2)$$

where:
G1F: the focal length of the first lens group G1
G2F: the focal length of the second lens group G2
G3F: the focal length of the third lens group G3

When the value of |G1F/G2F| is outside Condition (1) in the high direction (i.e. when it is greater than the upper limit value), then the pupil aberration increases due to increase of the power of the first lens group G1, and as a result the chromatic aberration of magnification and the comatic aberration deteriorate; and, conversely, when that value is outside Condition (1) in the low direction (i.e. when it is less than the lower limit value), then the field curvature and/or the spherical aberration deteriorate.

Furthermore, when the value of |G3F/G2F| is outside Condition (2) in the high direction (i.e. when it is greater than the upper limit value), then the pupil aberration increases due to increase of the power of the third lens group G3, and as a result the chromatic aberration of magnification and the astigmatism deteriorate. Conversely, when that value is outside Condition (2) in the low direction (i.e. when it is less than the lower limit value), then the power of the third lens group G3 becomes small, and in this state the field curvature and/or the distortion deteriorate when an unreasonable attempt is made to position the exit pupil toward the object side.

It should be understood that it is possible to ensure a more satisfactory aberration performance if the following Conditions (1-1) and (2-1) are satisfied, instead of the Conditions (1) and (2) described above.

$$0.85 \leq |G1F/G2F| \leq 1.7 \quad (1\text{-}1)$$

$$0.47 \leq |G3F/G2F| \leq 2.7 \quad (1\text{-}2)$$

Furthermore, with the inverted equal-magnification relay lens 100 of this embodiment, it is desirable for the following Condition (3) to be satisfied. By doing this, it becomes easy to improve the structure of the inverted equal-magnification by yet a further level.

$$1.7 \leq |E_{G1\text{-}G2}/E_{G2\text{-}G3}| \leq 6.2 \quad (3)$$

where:

$E_{G1\text{-}G2}$: the distance between the image side principal point of the first lens group G1 and the object side principal point of the second lens group G2

$E_{G2\text{-}G3}$: the distance between the image side principal point of the second lens group G2 and the object side principal point of the third lens group G3

When the value of $|E_{G1\text{-}G2}/E_{G2\text{-}G3}|$ is outside Condition (3) in the high direction (i.e. when it is greater than the upper limit value), then the pupil aberration increases due to increase of the power of the second lens group G2, and as a result the chromatic aberration of magnification and the distortion deteriorate. Conversely, when that value is outside Condition (3) in the low direction (i.e. when it is less than the lower limit value), then the spherical aberration, the field curvature, the astigmatism, and the distortion deteriorate.

It should be understood that it is possible to ensure a more satisfactory aberration performance if the following Condition (3-1) is satisfied, instead of the Condition (3) described above.

$$2.15 \leq |E_{G1\text{-}G2}/E_{G2\text{-}G3}| \leq 5.2 \quad (3\text{-}1)$$

Moreover, it is desirable for the inverted equal-magnification relay lens 100 of this embodiment to have a focusing function of performing focusing by one or more of the lenses incorporated in the second lens group G2 being shifted. Due to this, it is possible to perform focus correction with respect to shifting of the image position that originates due to temperature fluctuations or the like. It should be understood that it is desirable for the lens that is employed as the lens for performing focusing (also termed the "focusing lens") to be a lens for which there is an air gap of 1 mm or greater between it and the lenses in front of it and behind it. Furthermore, it is desirable for the following Condition (4) to be satisfied in relation to the focusing lens. By doing this, it is possible to perform focus correction without any loss of the image forming performance.

$$|\alpha_{mid}/\alpha_{out}| \leq 0.15 \quad (4)$$

where:

$\alpha_{mid}$: converted angle of inclination of the paraxial light beam emitted from the surface of the focusing lens to the air side $\alpha_{out}$: converted angle of inclination of the paraxial light beam emitted from the lens surface of the third lens group G3 closest to the image side It should be understood that, as the definition of the converted angle of inclination, for example, it will be acceptable to employ the definition disclosed in 'Methods of Lens Design', Yoshiya Matsui, Kyoritsu Publishing, 1972, p. 20.

In addition, in order to maintain the image forming performance, it is yet more effective to perform focus correction by, together with the above, also performing shifting of another lens for which there is an air gap of 1 mm or greater between it and the lenses in the second lens group G2 in front of it and behind it.

Furthermore, in the inverted equal-magnification relay lens 100 of this embodiment, the second lens group G2 includes, in order from the object side, a first cemented meniscus lens ML1, and a second cemented meniscus lens ML2 with an aperture stop AS sandwiched between it and the first cemented meniscus lens ML1. The first cemented meniscus lens ML1 presents a concave surface toward the image side, and incorporates positive lenses and a negative lens. And the second cemented meniscus lens ML2 presents a concave surface to the object side, and incorporates a negative lens and positive lenses. Moreover, the third lens group G3 comprises or consists of a biconcave lens. With this type of structure, when the maximum image height is taken as being Y, it is desirable for the focal length G3F of the third lens group G3 to satisfy the following Condition (5). By doing this, it is possible to impose compatibility between the exit pupil position of the inverted equal-magnification relay lens 100 and the exit pupil of the interchangeable lens 10, and furthermore, along with it being possible to correct the spherical aberration, comatic aberration, and astigmatism and so on generated by the first lens group G1 and the second lens group G2, it is also possible to correct field curvature.

$$|Y/G3F| \geq 0.12 \quad (5)$$

where:

Y (>0): the maximum image height

G3F: the focal length of the third lens group

When the value of |Y/G3F| is outside Condition (5) (i.e. when it is less than the lower limit value), then the exit pupil position becomes positioned more toward the object side, and it becomes impossible to maintain compatibility with the exit pupil of the interchangeable lens 10, and moreover the spherical aberration, the comatic aberration, the astigmatism, and the field curvature deteriorate.

Furthermore, in consideration of enhancing the sensitivity of the recent image sensors, in practice it is desirable for the object side NA of the inverted equal-magnification relay lens 100 of this embodiment to be 0.125 or less.

Moreover, with the inverted equal-magnification relay lens 100 of this embodiment, it is desirable for the ratio between the distance ENT.P from the object surface O to the entrance pupil plane at the maximum image height and the distance EXT.P from the exit pupil plane to the image surface I at the maximum image height to satisfy the following Condition (6). By doing this, when the inverted equal-magnification relay lens 100 has been inserted between the camera body 20 and the interchangeable lens 10, it becomes possible to perform image forming up to an image height of around Leica size 21.6 mm of a peripheral field of view without generating vignetting.

$$0.9 \leq ENT.P/EXT.P \leq 1.1 \quad (6)$$

where:

ENT.P: the distance from the object surface O to the entrance pupil plane at the maximum image height EXT.P: the distance from the exit pupil plane to the image surface I at the maximum image height Furthermore, with the inverted equal-magnification relay lens 100 of this embodiment, it is desirable for the lens surface of the first lens group G1 that is closest to the object side to be made as a plane surface or as a convex surface with respect to the object. Due to this, even if some minute defect such as a particle of dirt or the like becomes attached upon this lens surface of the first lens group G1 that is closest to the object side, still it is possible to suppress the influence thereof to the minimum limit. Moreover, it is desirable for the distance WD from the object surface O to the lens surface of the first lens group G1 that is closest to the object side to satisfy the following Condition (7). By doing this, even if some minute defect such as a particle of dirt or the like becomes attached upon this lens surface of the first lens group G1 that is closest to the object side, still it is possible to suppress the influence thereof to the minimum limit more effectively, since the distance WD is sufficiently large as compared to the object side focal depth.

$$WD \geq 50 \cdot \lambda / NA^2 \qquad (7)$$

where:
WD: the distance (mm) from the object surface O to the lens surface of the first lens group G1 closest to the object side
$\lambda$: the main wavelength used (for example, $\lambda$=0.000587582 mm)
NA: the object side numerical aperture Moreover, with the inverted equal-magnification relay lens 100 of this embodiment, it is desirable for the ratio between the distance D from the lens surface of the third lens group G3 most toward the image side to the image surface I and the maximum image height Y to satisfy the following Condition (8). By doing this, when the inverted equal-magnification relay lens 100 has been attached to the camera body 20, it is possible to ensure that no interference with the quick return mirror 22 within the camera body occurs.

$$D/Y \geq 1.8 \qquad (8)$$

where:
D: the distance from the lens surface of the third lens group G3 most toward the image side to the image surface I
Y (>0): the maximum image height Yet further, with the inverted equal-magnification relay lens 100 of this embodiment, it is desirable for the following Condition (9) relating to the first cemented meniscus lens ML1 and the second cemented meniscus lens ML2 of the second lens group G2 and to the biconcave lens L31 of the third lens group G3 to be satisfied. By doing this, it is possible to correct field curvature more effectively.

[Equation 1]

$$0.55 \leq Y \cdot \sum_{i=1}^{4} \left\{ \frac{1}{R_i} \left( \frac{1}{n_i} - \frac{1}{n_{i-1}} \right) \right\} \leq 1.5 \qquad (9)$$

where:
Y (>0): the maximum image height
suffix i=1: the concave surface of the first cemented meniscus lens G1 toward the image side (in other words, its lens surface closest to the image side)
suffix i=2: the concave surface of the second cemented meniscus lens G2 toward the object side (in other words, its lens surface closest to the object side)
suffix i=3: the concave surface of the biconcave lens G3 of the third lens group G3 toward the object side
suffix i=4: the concave surface of the biconcave lens G3 of the third lens group G3 toward the image side
$R_i$: the radius of curvature of the lens surface corresponding to the suffix i
$n_{i-1}$: the refractive index of the medium on the object side with respect to the lens surface corresponding to the suffix i $n_i$: the refractive index of the medium on the image side with respect to the lens surface corresponding to the suffix i Moreover, with the inverted equal-magnification relay lens 100 of this embodiment, while it is necessary for the power of the first lens group G1 to be great in order to set the entrance pupil to the predetermined position toward the object surface O, it is desirable, in order to suppress the generation of chromatic aberration and to correct field curvature, for the nature of the type of glass that is used for the positive lens of the first lens group G1 to satisfy the following Conditions (10) and (11).

$$n_{dG1} \geq 1.75 \qquad (10)$$

$$\nu_{dG1} \geq 45 \qquad (11)$$

where:
$n_{dG1}$: the refractive index of the positive lens of the first lens group G1
$\nu_{dG1}$: the Abbe number of the positive lens of the first lens group G1

If a type of glass that does not satisfy Conditions (10) and (11) described above is employed, and an attempt is made to correct the field curvature by forcibly suppressing the occurrence of chromatic aberration, then the field curvatures of the lenses included in the second lens group G2 become great, so that the spherical aberration and off-axis aberration become worse.

Furthermore, with the inverted equal-magnification relay lens 100, it is desirable for one or more of the first cemented meniscus lens ML1 and the second cemented meniscus lens ML2 of the second lens group G2 to be built as a cemented lens having three layers. By doing this, it is possible to reduce on-axis chromatic aberration of the secondary spectrum and differences in comatic aberration due to differences of wavelength. And, for this, it is desirable for the type of glass that is used for the three-layered cemented lens mentioned above to satisfy the following Conditions (12) through (17):

$$\nu d_{G2TN} \leq 47 \qquad (12)$$

$$\Delta \theta g, F_{G2TN} \leq -0.0035 \qquad (13)$$

$$\nu d_{G2TP1} \leq 35 \qquad (14)$$

$$\Delta \theta g, F_{G2TP1} \geq 0.006 \qquad (15)$$

$$\nu d_{G2TP2} \geq 57 \qquad (16)$$

$$\Delta \theta g, F_{G2TP2} \geq -0.008 \qquad (17)$$

where:
$\nu d_{G2TN}$: the Abbe number of the biconcave lens in the three-layered cemented lens described above
$\Delta \theta g, F_{G2TN}$: values giving the anomalous dispersion of g-F rays of the biconcave lens in the three-layered cemented lens described above
$\nu d_{G2TP1}$: the Abbe number of the convex lens sandwiched at the middle of the three-layered cemented lens described above
$\Delta \theta g, F_{G2TP1}$: values giving the anomalous dispersion for g-F rays of the convex lens sandwiched at the middle of the three-layered cemented lens described above
$\nu d_{G2TP2}$: the Abbe number of the convex lens at the air surface side within the three-layered cemented lens described above
$\Delta \theta g, F_{G2TP2}$: values giving the anomalous dispersion for g-F rays of the convex lens at the air surface side within the three-layered cemented lens described above It should be understood that, in Conditions (12) through (17) described above, the values that give anomalous dispersion for g-F rays (i.e. $\Delta\theta g$, $F_{G2TN}$, $\Delta\theta g$, $F_{G2TP1}$, $\Delta\theta g$, and $F_{G2TP2}$) may be calculated by the method disclosed in Japanese Laid-Open Patent Publication 2009-40663.

If a type of glass that does not satisfy Conditions (12) through (17) described above is employed, and on-axis chromatic aberration correction of the secondary spectrum is forcibly performed, then the curvatures of the bonded surfaces of the three-layered cemented lens described above become strong, and spherical aberration comes to be generated due to difference in wavelength.

Moreover, with the inverted equal-magnification relay lens 100 of this embodiment, apart from the first cemented meniscus lens ML1 and the second cemented meniscus lens ML2, it is desirable for one or more cemented doublet lenses consisting of a negative lens and a positive lens bonded together to be included in the second lens group G2. And it is desirable for the type of glass that is used for this cemented doublet lens to satisfy the following Conditions (18) through (21):

$$\text{vd}_{G2DN} \leq 47 \qquad (18)$$

$$\Delta\theta g, F_{G2DN} \leq 0.008 \qquad (19)$$

$$\text{vd}_{G2DP} \geq 50 \qquad (20)$$

$$\Delta\theta g, F_{G2DP} \geq -0.011 \qquad (21)$$

where:
$\text{vd}_{G2DN}$: the Abbe number of the negative lens in the cemented doublet lens mentioned above
$\Delta\theta g, F_{G2DN}$: values giving the anomalous dispersion for g-F rays of the negative lens in the cemented doublet lens mentioned above
$\text{vd}_{G2DP}$: the Abbe number of the positive lens in the cemented doublet lens mentioned above
$\Delta\theta g, F_{G2DP}$: values giving the anomalous dispersion for g-F rays of the positive lens in the cemented doublet lens mentioned above It should be understood that, in a similar manner to the case for the three-layered cemented lens described above, in Conditions (18) through (21) described above, the values that give anomalous dispersion for g-F rays (i.e. $\Delta\theta g$, $F_{G2DN}$, $\Delta\theta g$, and $F_{G2DP}$) may be calculated by the method disclosed in Japanese Laid-Open Patent Publication 2009-40663.

If a type of glass that does not satisfy Conditions (18) through (21) described above is used, and spherical aberration or on-axis chromatic aberration correction is forcibly performed, then the curvature of the bonded surface of the cemented doublet lens described above becomes great, and spherical aberration comes to be generated due to difference in wavelength.

Figure 3:
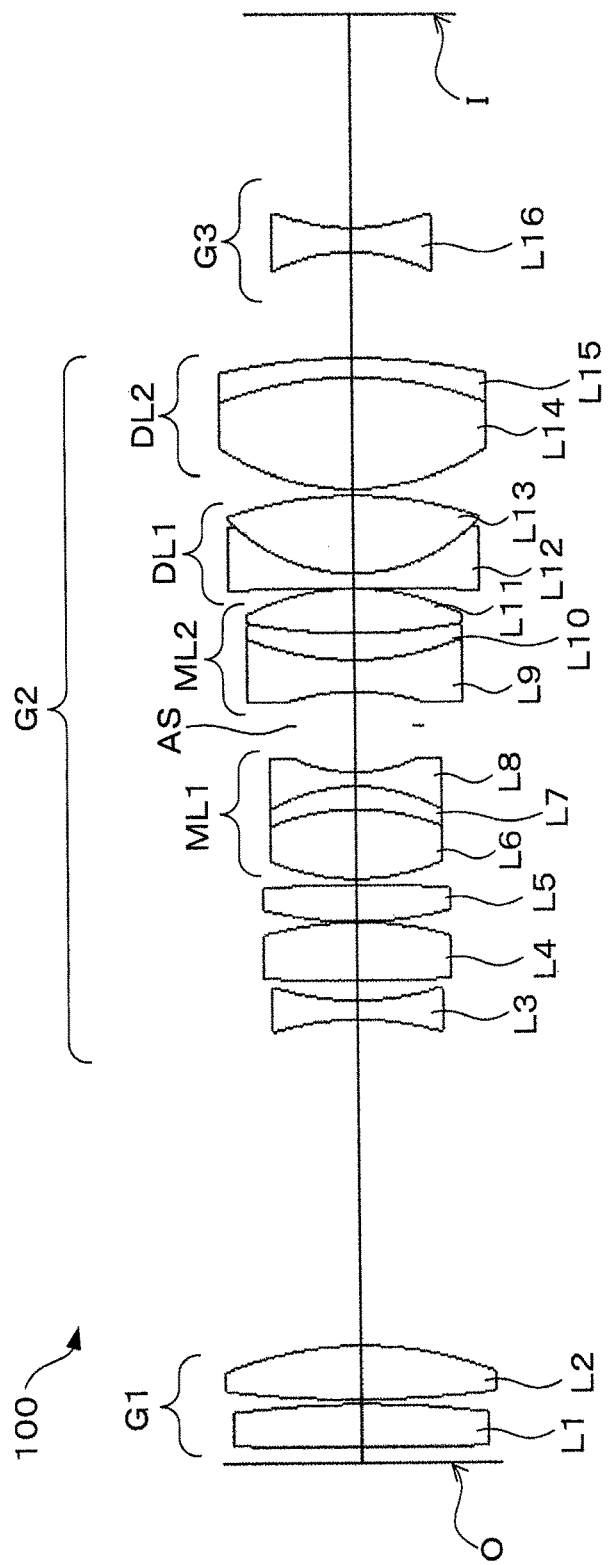
FIG. 3 is a figure for explanation of the structure of an inverted equal-magnification relay lens according to a first example.
Figure 12:
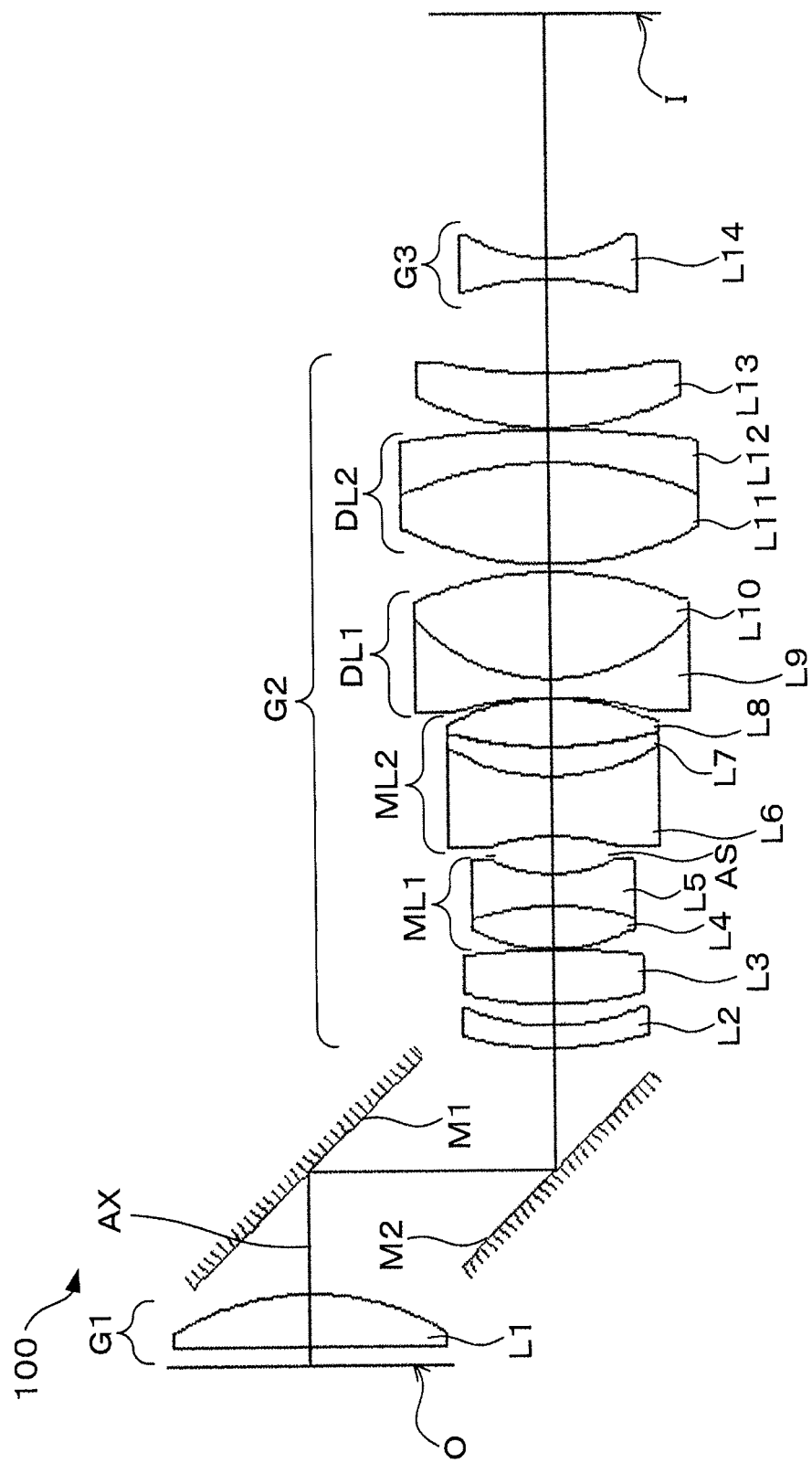
FIG. 12 is a figure for explanation of the structure of a inverted equal-magnification relay lens according to a fourth example.

Furthermore, with the inverted equal-magnification relay lens 100 of this embodiment, FIG. 12 is a figure for explanation of the structure of an inverted equal-magnification relay lens 100 according to a concrete example (a fourth example) that is different from FIG. 3 (a first example). With the inverted equal-magnification relay lens 100 shown in FIG. 12, two plane mirrors (a first plane mirror M1 and a second plane mirror M2) are disposed between the first lens group G1 and the second lens group G2 (in the air gap between them), and serve as optical axis folding members. The first plane mirror M1 and the second plane mirror M2 are mutually parallel, and are both arranged so as to be inclined at 45° with respect to the optical axis AX from the first lens group G1. The first plane mirror M1 and the second plane mirror M2 fold the optical axis AX between the first lens group G1 and the second lens group G2 into a cranked shape. Since, due to this, the length of the inverted equal-magnification relay lens 100 becomes shorter, accordingly it becomes possible to make the inverted equal-magnification relay lens 100 more compact. In order to dispose the first plane mirror M1 and the second plane mirror M2 between the first lens group G1 and the second lens group G2, it is desirable for the inverted equal-magnification relay lens 100 to satisfy the following Condition (22).

$$L/Y \geq 4 \qquad (22)$$

where
L: the air gap between first lens group G1 and the second lens group G2
Y (>0): the maximum image height Furthermore, at the maximum image height, the ratio between the distance from the object surface O to the entrance pupil plane and the distance from the exit pupil plane to the image surface I is regulated by Condition (6) described above, and the ratio between the distance from the lens surface of the third lens group G3 most toward the image side to the image surface I and the maximum image height is regulated by Condition (8) described above. Due to the above, in the first camera system 1, when the interchangeable lens 10 whose flange back distance is short is attached to the single lens reflex camera body 20 via this inverted equal-magnification relay lens 100, the focal plane FP1 of the interchangeable lens 10 and the image forming surface FP2 of the camera body 20 come to be in a conjugate relationship. And, since, at the maximum image height, the distance from the object surface O to the entrance pupil plane and the distance from the exit pupil plane to the image surface I generally agree with one another, accordingly it is possible to perform focusing up to an image height of Leica size around 21.6 mm. Moreover, in the second camera system 2, due to the micro lens array 33 that is installed in the focal plane of the interchangeable lens 10 and the inverted equal-magnification relay lens 100, the exit pupil of the interchangeable lens 10 and the photographic image surface of the image sensor 1 come to be in a conjugate relationship, so that it is possible to implement the light field camera function.

Figure 21:
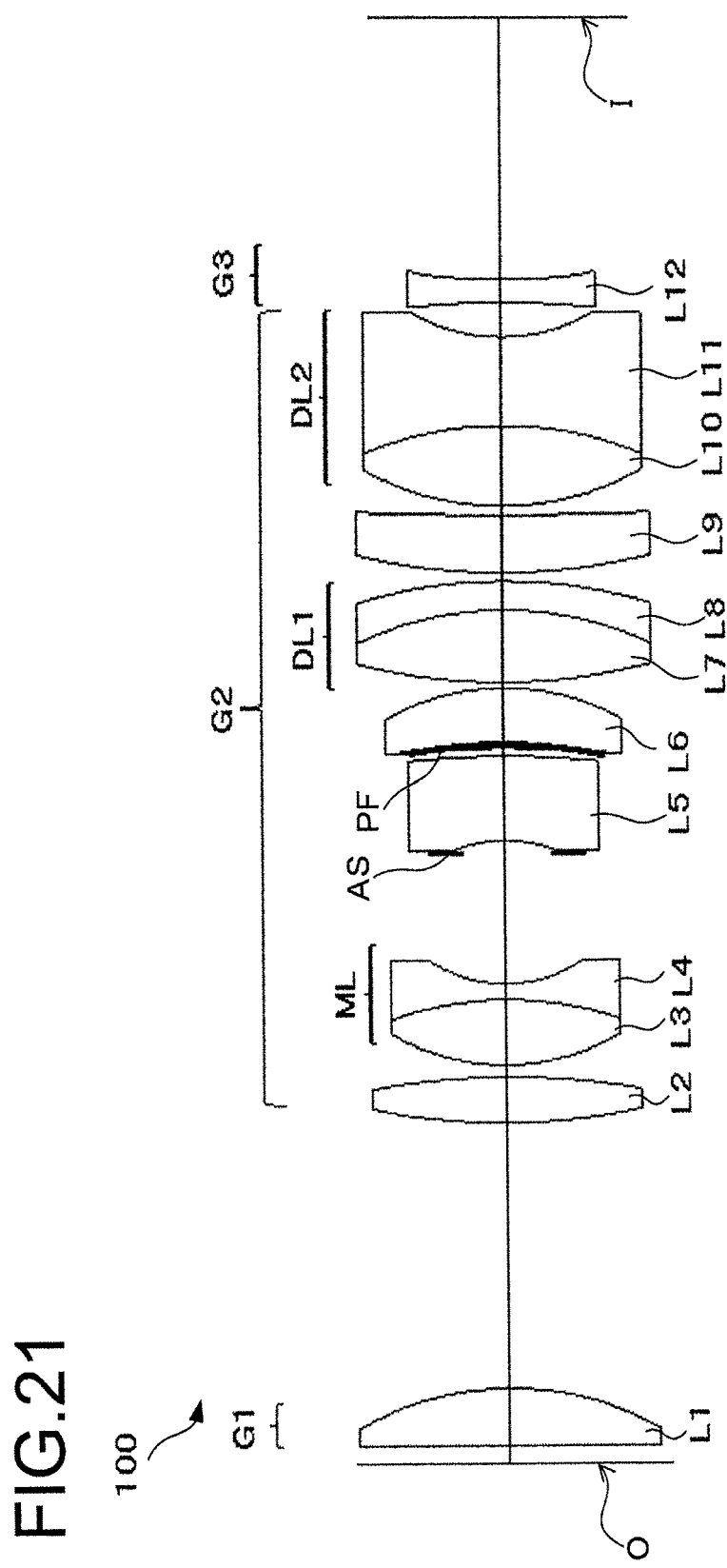
FIG. 21 is a figure for explanation of the structure of a inverted equal-magnification relay lens according to a seventh embodiment.

Furthermore, for the inverted equal-magnification relay lens 100 of this embodiment, FIG. 21 is a figure for explanation of the structure of an inverted equal-magnification relay lens 100 according to a concrete embodiment (a seventh concrete embodiment) that is different from FIG. 3 (the first concrete embodiment). Instead of the second cemented meniscus lens ML2 in the inverted equal-magnification relay lens 100 shown in FIG. 3, the inverted equal-magnification relay lens 100 shown in FIG. 21 includes a single concave meniscus lens L5. In other words, in the inverted equal-magnification relay lens 100 shown in FIG. 21, the second lens group G2 includes, in order from the object side, the first cemented meniscus lens ML1 and the single concave meniscus lens L5 that opposes the first cemented meniscus lens ML1, with an aperture stop AS being sandwiched between them. The first cemented meniscus lens ML1 presents its concave surface toward the image side, and consists of a positive lens and a negative lens. The single concave meniscus lens L5 presents its concave surface toward the object side. Moreover, the third lens group G3 comprises a biconcave lens. With this type of structure as well, if the maximum image height is taken as being Y, it is desirable for the focal length G3F of the third lens group G3 to satisfy Condition (5) described above, and also for the object side NA to correspond in practice to 0.125 or less.

Moreover, with the inverted equal-magnification relay lens 100 shown in FIG. 21 as well, in relation to the first cemented meniscus lens ML1 and the single concave meniscus lens L5 of the second lens group G2 and the biconcave lens of the third lens group G3, it is desirable for a Condition (9) to be satisfied as described above. By doing this, it is possible to correct field curvature more effectively.

[Equation 2]

$$0.55 \le Y \cdot \sum_{i=1}^{4} \left\{ \frac{1}{R_i} \left( \frac{1}{n_i} - \frac{1}{n_{i-1}} \right) \right\} \le 1.5 \quad (9)$$

where:
Y (>0): the maximum image height
suffix i=1: the concave surface toward the image side of the first cemented meniscus lens G1 (in other words, its lens surface closest to the image side)
suffix i=2: the concave surface toward the object side of the single concave meniscus lens L5
suffix i=3: the concave surface of the object side of the biconcave lens of the third lens group G3
suffix i=4: the concave surface of the image side of the biconcave lens of the third lens group G3
$R_i$: the radius of curvature of the lens surface corresponding to the suffix i
$n_{i-1}$: the refractive index of the medium on the object side with respect to the lens surface corresponding to the suffix i
$n_i$: the refractive index of the medium on the image side with respect to the lens surface corresponding to the suffix i Furthermore, with the inverted equal-magnification relay lens 100 shown in FIG. 21 as well, apart from the first cemented meniscus lens ML1 and the single concave meniscus lens L5, it is desirable for one or more cemented doublet lenses consisting of a negative lens and a positive lens bonded together to be included in the second lens group G2. And it is desirable for the type of glass that is used for this cemented doublet lens to satisfy the Conditions (18) through (21) described above.

Yet further, in the inverted equal-magnification relay lens 100 of this embodiment, it is desirable for the second lens group G2 that has a positive power to include an optical member that comprises a glass member and a diffractive optical element PF that is bonded to this glass member.

While the methods generally known for bending light are refraction and reflection, diffraction is also per se known as a third method. In concrete terms, the use of a diffraction grating or a Fresnel zone plate is per se known from the prior art. Even in the case of natural light, since the normal coherent length (i.e. the distance over which interference is possible) is a few or several λ (nm), accordingly, if a structure on the order of the wavelength is constructed, the result of the operation of optical wave interference is that it is possible to generate clear diffraction phenomena. A surface that operates to bend a light beam by applying the phenomenon of diffraction in this manner is termed a "diffractive optical surface". And an optical element that incorporates this type of surface is generally termed a "diffractive optical element".

A diffractive optical element includes a diffractive optical surface upon which a grating structure is formed in concentric circles from several to several hundreds of minute groove shapes or slits per millimeter, and which has the property of diffracting light that is incident upon this diffractive optical surface in a direction that is determined by the grating pitch (i.e. by the gaps between the diffraction grating grooves) and by the wavelength of this incident light. While having a positive refractive power, the diffractive optical surface has a negative Abbe number (−3.453). To put it in another manner, the diffractive optical surface of the diffractive optical element has a negative dispersion value, and it is per se known that chromatic aberration correction is extremely effective, since the dispersion is great and the anomalous dispersion is strong. While normally the Abbe number of optical glass is around 30 to 80, as described above, the Abbe number of a diffractive optical surface has a negative value. With a diffractive optical surface the refractive index becomes smaller as the wavelength of light becomes shorter, which is opposite to the case of glass (a refracting optical element) whose dispersion characteristic is normal; and a diffractive optical surface has the characteristic of bending light more when its wavelength is longer. Due to this, by combining a diffractive optical element with normal optical glass (which is a refracting optical element), it becomes possible to perform satisfactory chromatic aberration correction, which cannot be achieved with normal optical glass; and it becomes possible to achieve satisfactory chromatic aberration correction such as otherwise can only be achieved with expensive special type anomalous dispersion glass.

Figure 30:
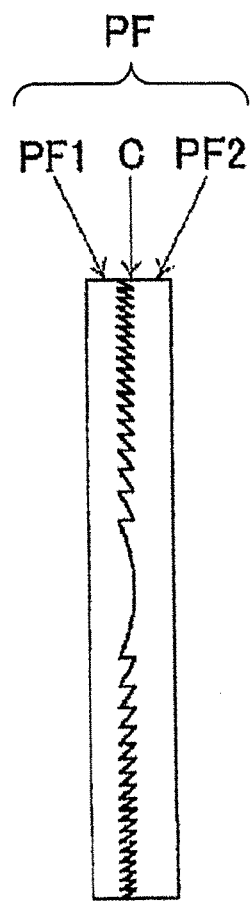
FIG. 30 is a schematic figure illustrating a diffractive optical element according to this embodiment.

As shown for example in FIG. 30, the diffractive optical element PF according to this embodiment is a so called "close contact multi-layer type diffractive optical element" in which two different resin members PF1 and PF2 are bonded together, and that has, at the interface between these resin members, a diffractive optical surface C upon which diffraction grating grooves are formed. Due to this, this diffractive optical element PF can achieve a high diffraction efficiency over a wide band of wavelengths, including from g rays to C rays. It should be understood that, if first order diffracted light is used in a transmission type diffractive optical element, then the diffraction efficiency is given by the proportion η (=I1/I0×100 [%]) of the intensity I1 of the first order diffracted light to the incident light optical intensity I0.

Furthermore, with a close contact multi-layer type diffractive optical element, compared to a so called separate multi-layer type diffractive optical element in which the two diffraction elements upon which the diffraction grating grooves are formed are arranged close together so that these diffraction grating grooves oppose one another, the manufacturing process is simplified and, since it is unnecessary to consider mutual eccentricity errors between the diffraction grating grooves that are disposed close together, accordingly the manufacture becomes simple and easy, and also the diffraction efficiency becomes good.

Yet further, with the inverted equal-magnification relay lens 100 of this embodiment, it is desirable for the following Condition (23) to be satisfied in relation to the diffractive optical element PF:

$$23.0 \le |f_{DOE}/G2F| \le 57.0 \quad (23)$$

where:
G2F: the focal length of the second lens group G2
$f_{DOE}$: the focal length of the diffractive optical element PF Condition (23) is one that regulates the ratio between the focal length of the diffractive optical element PF (i.e. its refractive power) and the focal length (i.e. the refractive power) of the second lens group G2 that includes this diffractive optical element PF. When the ratio described above is outside the value of this Condition in the high direction (i.e. when the ratio becomes greater than the upper limit value), then the refractive power of the diffractive optical element PF becomes small, and is insufficient for correction of chromatic aberration. Conversely, when the ratio described above is outside the value of this Condition in the low direction (i.e. when the ratio becomes lower than the lower limit value), then the refractive power of the diffractive optical element PF becomes great, the grating pitch of the diffractive optical element PF becomes very small, and it becomes difficult to manufacture so that its suitability for mass production deteriorates.

Furthermore, with the inverted equal-magnification relay lens 100 of this embodiment, it is desirable for the minimum pitch of the diffraction grating grooves formed upon the diffractive optical surface C of the diffractive optical element PF to satisfy the following Condition (24).

$$0.09 \leq P_{min} \leq 0.20 \quad (24)$$

where:

$P_{min}$: the minimum pitch of the diffraction grating grooves of the diffractive optical element PF Condition (24) is one that regulates the minimum pitch of the diffraction grating grooves of the diffractive optical element PF. When the minimum pitch described above is outside the value of this Condition in the high direction (i.e. when it becomes greater than the upper limit value), then the refractive power of the diffractive optical element PF becomes low, and is insufficient for chromatic aberration correction. Conversely, when the minimum pitch described above is outside the value of this Condition in the low direction (i.e. when it becomes lower than the lower limit value), then the refractive power of the diffractive optical element PF becomes great, and the grating pitch of the diffractive optical element PF becomes very small, and thus it becomes difficult to manufacture so that its suitability for mass production deteriorates.

Furthermore, with the inverted equal-magnification relay lens 100 of this embodiment, it is desirable for the ratio of the maximum diameter of the light flux passing through the second lens group G2 and the diameter of the light flux passing through the diffractive optical surface C of the diffractive optical element PF to satisfy the following Condition (25):

$$0.4 \leq \Phi_{DOE}/\Phi_{MAX} \leq 0.9 \quad (25)$$

where:

$\Phi_{DOE}$: the diameter of the light flux passing through the diffractive optical surface C $\Phi_{MAX}$: the maximum diameter of the light flux passing through the second lens group G2

Condition (25) is one that regulates the ratio between the maximum diameter of the light flux passing through the second lens group G2 and the diameter of the light flux passing through the diffractive optical surface C of the diffractive optical element PF. When the ratio described above is outside the value of this Condition in the high direction (i.e. when the value becomes greater than the upper limit value), then spherical aberration and/or comatic aberration of the higher order colors occurs, and this is undesirable. Conversely, when the ratio described above is outside the value of this Condition in the low direction (i.e. when the value becomes lower than the lower limit value), then on-axis chromatic aberration correction becomes difficult, and also the grating pitch of the diffractive optical element PF becomes very small, and it becomes difficult to manufacture so that its suitability for mass production deteriorates.

Even further, with the inverted equal-magnification relay lens 100 of this embodiment, it is desirable for the maximum angle of the light beam that is incident upon the diffractive optical surface C of the diffractive optical element PF with respect to the normal to base radius of curvature that defines the diffractive optical surface C to be limited to be within 25°.

It is generally desirable for the angle of the light beam that passes through a diffractive optical surface of an optical system with respect to the normal to the diffractive optical surface to be as small as possible. The reason is that, if the angle of the light beam that passes through the diffractive optical surface is great, then it becomes easy for flare (a phenomenon in which blazing light other than that of a predetermined order becomes harmful, and reaches the image formation surface) to occur from a drop-off portion (step portion) of the grating of the diffractive optical surface or the like, so that the image quality is undesirably deteriorated. In order to obtain a satisfactory image that experiences almost no influence from flare, it is desirable to limit the angle of the light beam that passes through the diffractive optical surface C to within 25° with respect to the normal to base radius of curvature that generates the diffractive optical surface C.

Yet further, for the m unit lens elements and the diffractive optical element PF that make up the entire inverted equal-magnification relay lens 100 of this embodiment, it is desirable for the following Condition (26) to be satisfied, in order to improve the athermal characteristic (i.e. to improve the non-dependence upon temperature):

[Equation 3]

$$\left| \sum_{i=1}^{m} \left( \alpha_i - \frac{dn_i/dT}{n_i - 1} \right) \cdot \frac{h_i^2}{f_i} + 2\alpha_{DOE} \cdot \frac{h_{DOE}^2}{f_{DOE}} \right| \leq 4.5 \times 10^{-7} \quad (26)$$

where:

m: the total number of unit lens elements that make up the inverted equal-magnification relay lens 100

$\alpha_i$: the thermal expansion coefficient of the optical member that constitutes the i-th unit lens element among the m unit lens elements $n_i$: the d ray refractive index of the optical member that constitutes the i-th unit lens element among the m unit lens elements $dn_i/dT$: the relative refractive index temperature coefficient for d rays of the optical member that constitutes the i-th unit lens element among the m unit lens elements $f_i$: the focal length of the optical member that constitutes the i-th unit lens element among the m unit lens elements $h_i$: the average value of the relative incident heights upon the two sides of the optical member that constitutes the i-th unit lens element among the m unit lens elements, when the incident heights at which a paraxial light beam emitted from an on-axis object point and incident upon the inverted equal-magnification relay lens 100 is incident upon each of the optical members of the inverted equal-magnification relay lens 100 are taken as relative incident heights by normalizing the maximum incident height as unity $\alpha_{DOE}$: the average thermal expansion coefficient of the two resin members that constitute the diffractive optical element PF $f_{DOE}$: the focal length of the diffractive optical element PF $h_{DOE}$: the average value of the relative incident heights upon the three surfaces of the diffractive optical element PF, when the incident heights at which a paraxial light beam emitted from an on-axis object point and incident upon the inverted equal-magnification relay lens 100 is incident upon each of the optical members of the inverted equal-magnification relay lens 100 are taken as relative incident heights by normalizing the maximum incident height as unity For Condition (26), for example in the case of FIG. 21 since the inverted equal-magnification relay lens 100 has 12 unit lens elements (the lenses L1 through L12), accordingly the total number m of unit lens elements is m=12.

Moreover, the expression "$\{\alpha_i-(dn_i/dT)/(n_i-1)\}\cdot(h_i^2/f_i)$" in Condition 26 is an expression related to fluctuation of the back focus position that is generated due to change of the temperature of the environment acting upon the optical member (the normal refracting optical element, i.e. the unit lens optical element) that constitutes the i-th unit lens element. This expression comprises the product of a material term for the unit lens optical element, comprising the sum of the following two terms: a thermal expansion and contraction component term $\alpha_i$ of the refracting optical element; and a temperature change component term $-(dn_i/dT)/(n_i-1)$ in the refractive index of the member, and a refraction operation contribution rate term, comprising the product of the refractive power $1/f_i$ of the unit lens optical element and the square $h_i^2$ of the average value $h_i$ of the relative incident height at both sides thereof. This fact means that, even if the value of the material term "$\{\alpha_i-(dn_i/dT)/(n_i-1)\}$ is large, still the influence of temperature change is small for a refracting optical element for which the average value $h_i$ of the relative incident height on its two sides is small (in other words, for a refracting optical element that is positioned in the vicinity of the object surface or of the image surface), or for a refracting optical element of which the focal length $f_i$ is large or the like.

Furthermore, on the one hand the linear expansion coefficients (thermal expansion coefficients) $\alpha_i$ of the unit lens optical elements are normally always >0, and, since for typical optical glass the term $-(dn_i/dT)/(n_i-1)$ related to change of the refractive index with temperature is <0, accordingly the term $\{\alpha_i-(dn_i/dT)/(n_i-1)\}$ resulting from the mutual cancellation of this with the value $\alpha_i$ of the linear expansion coefficient becomes small. However, for anomalous dispersion glass, since the value of $-(dn_i/dT)/(n_i-1)$ is >0, it is added to the value $\alpha_i$ of the linear expansion coefficient, and the value of $\{\alpha_i-(dn_i/dT)/(n_i-1)\}$ becomes large. Accordingly, the frequent use of anomalous dispersion glass in the optical members included in the second lens group G2 for which the average value of the relative incident height of on-axis light is large becomes disadvantageous, because fluctuations of the back focus position due to variations of the temperature of the environment become great.

Moreover, for the diffractive optical element PF, a component related to fluctuation of the back focus position generated by change of the temperature of the environment can be expressed as the term $2\alpha_{DOE}\cdot(h_{DOE}^2/f_{DOE})$. While the refraction operation contribution rate term is the same term as in the case of a unit lens element, the value of the material term for the diffractive optical element PF is only the linear expansion coefficient $\alpha_{DOE}$, and this means that the temperature change component of the refractive index of the resin members from which the diffractive optical element PF is formed does not make any contribution. Accordingly, as a means for suppressing fluctuation of the back focus position caused by change of the temperature of the environment, it is extremely effective not to use very much anomalous dispersion glass, while also providing the diffractive optical element PF, to ensure good chromatic aberration performance.

As shown by Condition (26), an amount related to fluctuation of the back focus position generated due to variation of the temperature of the environment of the optical system of the inverted equal-magnification relay lens 100 as a whole is given by the sum of the total of the m terms $\{\alpha_i-(dn_i/dT)/(n_i-1)\}\cdot(h_i^2/f_i)$ for each of the m unit lens optical elements (i.e. the unit lens elements) and the term $2\alpha_{DOE}\cdot(h_{DOE}^2/f_{DOE})$ related to the diffractive optical element PF. By keeping this value less than or equal to $4.5\times10^{-7}$, it is possible to keep the amount of fluctuation of the position of the back focus small.

In this connection, in relation to the glass members included in the second lens group G2, by keeping the number of unit lens optical elements that employ anomalous dispersion glass, for which dni/dT<0, down to one or none, and by keeping the maximum value of $\{\alpha_i-(dn_i/dT)/(n_i-1)\}$ for each of the unit lens elements (i.e. the unit lens optical elements) less than or equal to around $21\times10^{-6}$, it becomes possible to keep the expression in Condition (26) described above less than or equal to the upper limit value yet more simply and easily.

Moreover, with the inverted equal-magnification relay lens 100 of this embodiment, it is desirable for an optical surface that is an aspheric optical surface to be included in the third lens group G3 that has a negative power, and for the ratio between the lens total length from its object surface to its image surface and the maximum image height to satisfy the following Condition (27):

$$Y/TL \geq 0.08 \quad (27)$$

where:

Y (>0): the maximum image height

TL: the total length of the lens, from the object surface to the image surface

Condition (27) is one that regulates the ratio between the lens total length from its object surface to its image surface, and the maximum image height. The larger the ratio described above is, the more it is possible to make the inverted equal-magnification relay lens 100 more compact. Generally, it becomes difficult to ensure predetermined off-axis aberration performance for astigmatism and field curvature and so on while reducing the total length of the lens without changing the value of the maximum image height. However when, in order to aim at compatibility of shortening the total length of the lens and also ensuring off-axis aberration performance, an aspheric optical surface is provided in the third lens group G3 having a negative power whose incident height of the main light beam being incident upon each of the optical members thereof being high, then such compatibility can be simply implemented to yet a further level.

Furthermore, in order to suppress astigmatism and distortion along with shortening the total length of the lens, it is desirable for the aspheric surface to have a configuration in which, along with the height of incidence of the main light beam becoming high, the distance along the optical axis from the tangent plane at the vertex of the aspheric surface to the aspheric surface at the height of incidence of the light beam (i.e. the sag amount) becomes greater than the sag amount that is calculated from the paraxial radius of curvature, and it is desirable for the curve of the shape of the aspheric surface cross section to be a curve that does not have a point of inflexion. It should be understood that the Condition that the curved shape of the cross section of the aspheric surface should not have a point of inflexion will be satisfied if, at each height in directions perpendicular to the optical axis, the sign of the second derivative of the aspheric surface equation defined by the following Formula (b) should not change.

[Equation 4]

$$S(y) = \frac{y^2/r}{1 + \sqrt{1 - (\kappa + 1) \cdot y^2/r^2}} + A_4 y^4 + A_6 y^6 + A_8 y^8 + A_{10} y^{10} \quad (b)$$

where:
y: height in the direction perpendicular to the optical axis
S(y): the distance along the optical axis at height y from the tangent plane at the vertex of each aspheric surface to that aspheric surface (i.e. the sag amount)
r: reference radius of curvature (paraxial radius of curvature)
κ: a conic constant
$A_i$: i-th order aspheric surface coefficient Furthermore, when making the inverted equal-magnification relay lens 100 more compact, in order to keep it to a more practical size, it is desirable to maintain the value of Y/TL at 0.08 or greater, as shown in Condition (27).

EXAMPLES

Next, various concrete examples of the inverted equal-magnification relay lens 100 according to this embodiment will be explained.

Example #1

First, a first example will be explained. FIG. 3 is a figure for explanation of the structure of an inverted equal-magnification relay lens 100 according to this first example. This inverted equal-magnification relay lens 100 according to the first example comprises, in order from the object side, a first lens group G1, a second lens group G2, and a third lens group G3.

The first lens group G1 has an overall positive power, and is disposed near the object. This first lens group G1 comprises, in order from the object side, a positive lens L1 and a positive lens L2.

The second lens group G2 is disposed with an appropriate distance separating it from the first lens group G1, and overall has a positive power. This second lens group G2 comprises, in order from the object side, a negative lens L3, a positive lens L4, a positive lens L5, a first cemented meniscus lens ML1, a second cemented meniscus lens ML2, a first doublet lens DL1, and a second doublet lens DL2.

The first cemented meniscus lens ML1 presents its concave surface toward the image side, and comprises positive lenses (a biconvex lens L6 and a convex meniscus lens L7) and a negative lens (a biconcave lens L8). And the second cemented meniscus lens ML2 faces toward the first cemented meniscus lens ML1 with an aperture stop AS sandwiched between them and presents its concave surface toward the object side, and comprises a negative lens (a biconcave lens L9) and positive lenses (a convex meniscus lens L10 and a biconvex lens L11). Thus, in this first example, both the first cemented meniscus lens ML1 and also the second cemented meniscus lens ML2 are three-layered cemented lenses. Due to this, it is possible to reduce on-axis chromatic aberration of the secondary spectrum and the difference in comatic aberration due to differences in wavelength.

The first doublet lens DL1 is a cemented doublet lens in which a negative lens L12 and a positive lens L13 are bonded together. And the second doublet lens DL2 is a cemented doublet lens in which a positive lens L14 and a negative lens L15 are bonded together. Thus, in this first example, two cemented doublet lenses are included in the second lens group G2.

The third lens group G3 comprises a biconcave lens L16, and has a negative power.

Moreover, in the inverted equal-magnification relay lens 100 according to this first example, the entrance pupil position is more toward the object surface O side than the first lens group G1, while the exit pupil position is more toward the third lens group G3 than the image surface I. The distance (ENT.P) from the object surface to the entrance pupil plane at the maximum image height is 76.71 mm, while the distance (EXT.P) from the exit pupil plane to the image surface is 74.22 mm. The focusing position surface number is the 10th surface (in other words, the focusing lens is the positive lens L5 of the second lens group G2), and the air gap from the lens behind it is 1.2 mm.

The following Table 1 gives data of various parameters for this inverted equal-magnification relay lens 100 according to the first example. It should be understood that, in Table 1, respectively, the surface number is the number of the optical surface counted in sequence from the object side, r is the radius of curvature of each of the optical surfaces, d is the surface gap at the optical surface, nd is the refractive index for d rays (λ=587.582 nm), and νd is the Abbe number. These reference symbols are the same in the Tables for the second through the ninth examples that will be explained hereinafter.

TABLE 1

(Overall Specifications)
magnification β = −1.00
numerical aperture NA = 0.125
maximum image height Y = 21.6 mm
(Lens Data)

| Surface number | r | d | nd | νd |
|---|---|---|---|---|
| object | | 3.00 | | |
| 1 | 800.0000 | 9.00 | 1.81600 | 46.6 |
| 2 | −200.0436 | 1.00 | | |
| 3 | 224.3002 | 11.00 | 1.81600 | 46.6 |
| 4 | −73.9653 | 66.70 | | |
| 5 | −58.3104 | 4.00 | 1.61340 | 44.3 |
| 6 | 55.3768 | 4.00 | | |
| 7 | 367.6259 | 12.10 | 1.72916 | 54.6 |
| 8 | −70.6954 | 0.20 | | |
| 9 | 75.9884 | 7.70 | 1.60300 | 65.4 |
| 10 | −241.3472 | 1.20 | | |
| 11 | 43.3465 | 14.39 | 1.49782 | 82.6 |
| 12 | −45.0000 | 4.70 | 1.74077 | 27.7 |
| 13 | −35.0000 | 3.00 | 1.61340 | 44.3 |
| 14 | 29.0000 | 9.47 | | |
| 15 | ∞ | 7.00 | aperture stop | |
| 16 | −47.3614 | 6.60 | 1.61340 | 44.3 |
| 17 | 57.3481 | 5.50 | 1.80810 | 22.8 |
| 18 | 115.2202 | 9.20 | 1.60300 | 65.4 |
| 19 | −48.2142 | 0.20 | | |
| 20 | −608.5863 | 3.00 | 1.61340 | 44.3 |

TABLE 1-continued (Overall Specifications)
magnification β = −1.00
numerical aperture NA = 0.125
maximum image height Y = 21.6 mm
(Lens Data)

| Surface number | r | d | nd | vd |
|---|---|---|---|---|
| 21 | 35.0378 | 16.00 | 1.59319 | 67.9 |
| 22 | −79.8910 | 1.40 | | |
| 23 | 48.7887 | 23.00 | 1.60300 | 65.4 |
| 24 | −74.7527 | 4.00 | 1.67300 | 38.2 |
| 25 | −124.7840 | 21.92 | | |
| 26 | −34.4119 | 5.00 | 1.56384 | 60.7 |
| 27 | 42.1197 | 44.05 | | |

As will be understood from Table 1, the lens surface of the first lens group G1 that is closest toward the object side (i.e. its first surface) is a convex surface with respect to the object. Due to this, as described above, it is possible to keep the influence of minute defects such as waste or the like down to a minimum limit.

Moreover, with the inverted equal-magnification relay lens 100 according to this first example, the values related to Conditions (1) through (21) described above are as given below. Since, as shown below, the inverted equal-magnification relay lens 100 according to this first example satisfies Conditions (1) through (21), accordingly it is possible to obtain the advantageous effects described above.

|G1F/G2F|=1.36    Condition (1):

|G3F/G2F|=0.85    Condition (2):

|E$_{G1-G2}$/E$_{G2-G3}$|=4.49    Condition (3):

|α$_{mid}$/α$_{out}$|=0.14    Condition (4):

|Y/G3F|=0.66    Condition (5):

ENT.P/EXT.P=1.03    Condition (6):

WD=3.0 50·λ/NA²=1.88    Condition (7):

D/Y=2.04    Condition (8):

Condition (9):

[Equation 5]

$$Y \cdot \sum_{i=1}^{4}\left\{\frac{1}{R_i}\left(\frac{1}{n_i}-\frac{1}{n_{i-1}}\right)\right\}=0.87$$

n$_{dG1}$=1.81600 (positive lens L1 of first lens group G1)

n$_{dG1}$=1.81600 (positive lens L2 of first lens group G1)    Condition (10):

ν$_{dG1}$=46.6 (positive lens L1 of first lens group G1)

ν$_{dG1}$=46.6 (positive lens L2 of first lens group G1)    Condition (11):

νd$_{G2TN}$=44.3 (biconcave lens L8 of first cemented meniscus lens ML1)

νd$_{G2TN}$=44.3 (biconcave lens L9 of second cemented meniscus lens ML2)    Condition (12):

Δθg, F$_{G2TN}$=−0.0065 (biconcave lens L8 of first cemented meniscus lens ML1)

Δθg, F$_{G2TN}$=−0.0065 (biconcave lens L9 of second cemented meniscus lens ML2)    Condition (13):

νd$_{G2TP1}$=27.7 (convex lens L7 sandwiched in center of first cemented lens ML1)

νd$_{G2TP1}$=22.8 (convex lens L10 sandwiched in center of second cemented lens ML2)    Condition (14):

Δθg, F$_{G2TP1}$=0.0122 (convex lens L7 sandwiched in center of first cemented lens ML1)

Δθg, F$_{G2TP1}$=0.0261 (convex lens L10 sandwiched in center of second cemented lens ML2)    Condition (15):

νd$_{G2TP2}$=82.6 (convex lens L6 on air surface side of first cemented meniscus lens ML1)

νd$_{G2TP2}$=65.4 (convex lens L11 on air surface side of second cemented meniscus lens ML2)    Condition (16):

Δθg, F$_{G2TP2}$=0.0307 (convex lens L6 on air surface side of first cemented meniscus lens ML1)

Δθg, F$_{G2TP2}$=0.0033 (convex lens L11 on air surface side of second cemented meniscus lens ML2)    Condition (17):

νd$_{G2DN}$=44.3 (negative lens L12 of first doublet lens DL1)

νd$_{G2DN}$=38.2 (negative lens L15 of second doublet lens DL2)    Condition (18):

Δθg, F$_{G2DN}$=−0.0065 (negative lens L12 of first doublet lens DL1)

Δθg, F$_{G2DN}$=−0.0043 (negative lens L15 of second doublet lens DL2)    Condition (19):

νd$_{G2DP}$=67.9 (positive lens L13 of first doublet lens DL1)

νd$_{G2DP}$=65.4 (positive lens L14 of second doublet lens DL2)    Condition (20):

Δθg, F$_{G2DP}$=0.0123 (positive lens L13 of first doublet lens DL1)

Figure 4:
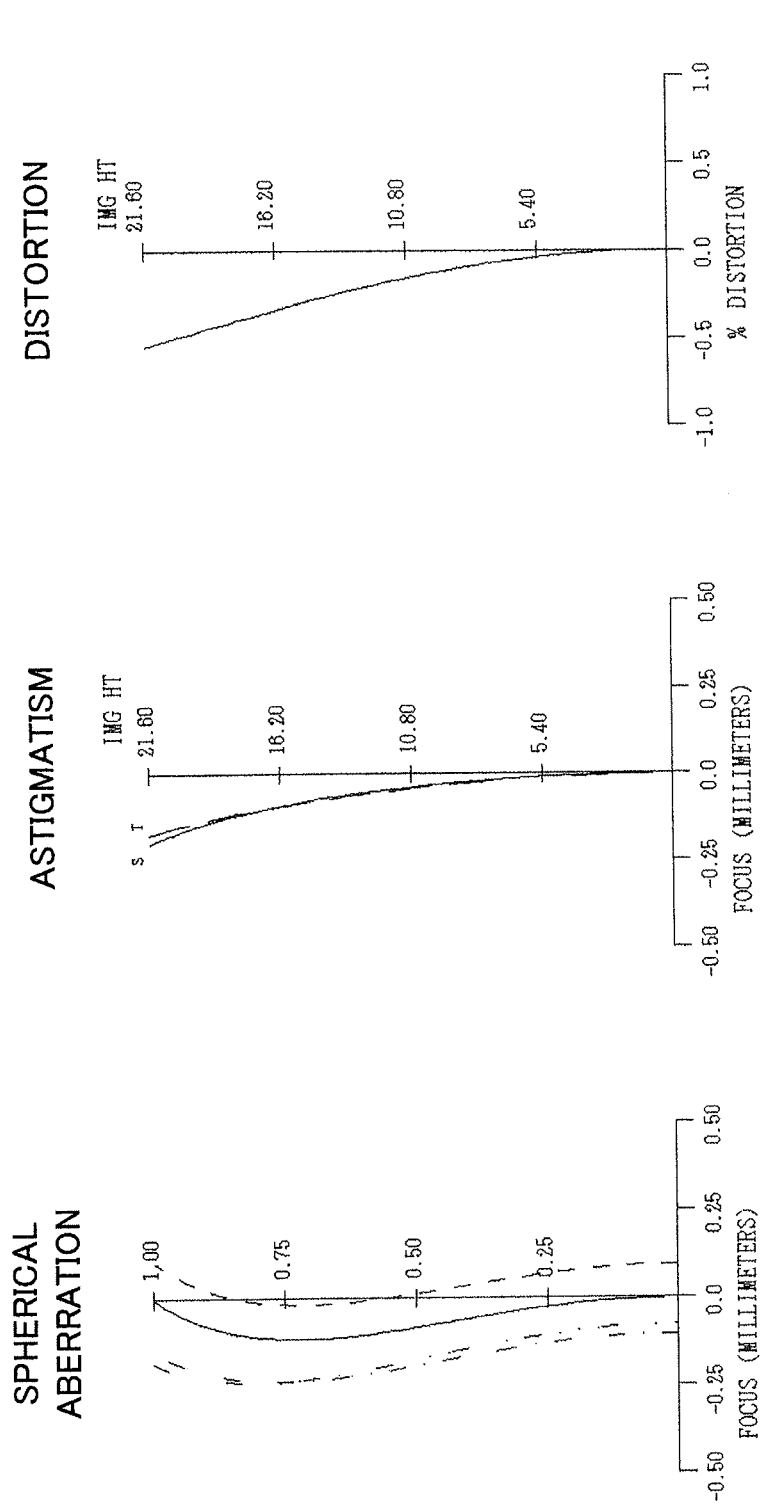
FIG. 4 is a figure showing spherical aberration, astigmatism, and distortion of this inverted equal-magnification relay lens according to the first example.
Figure 5:
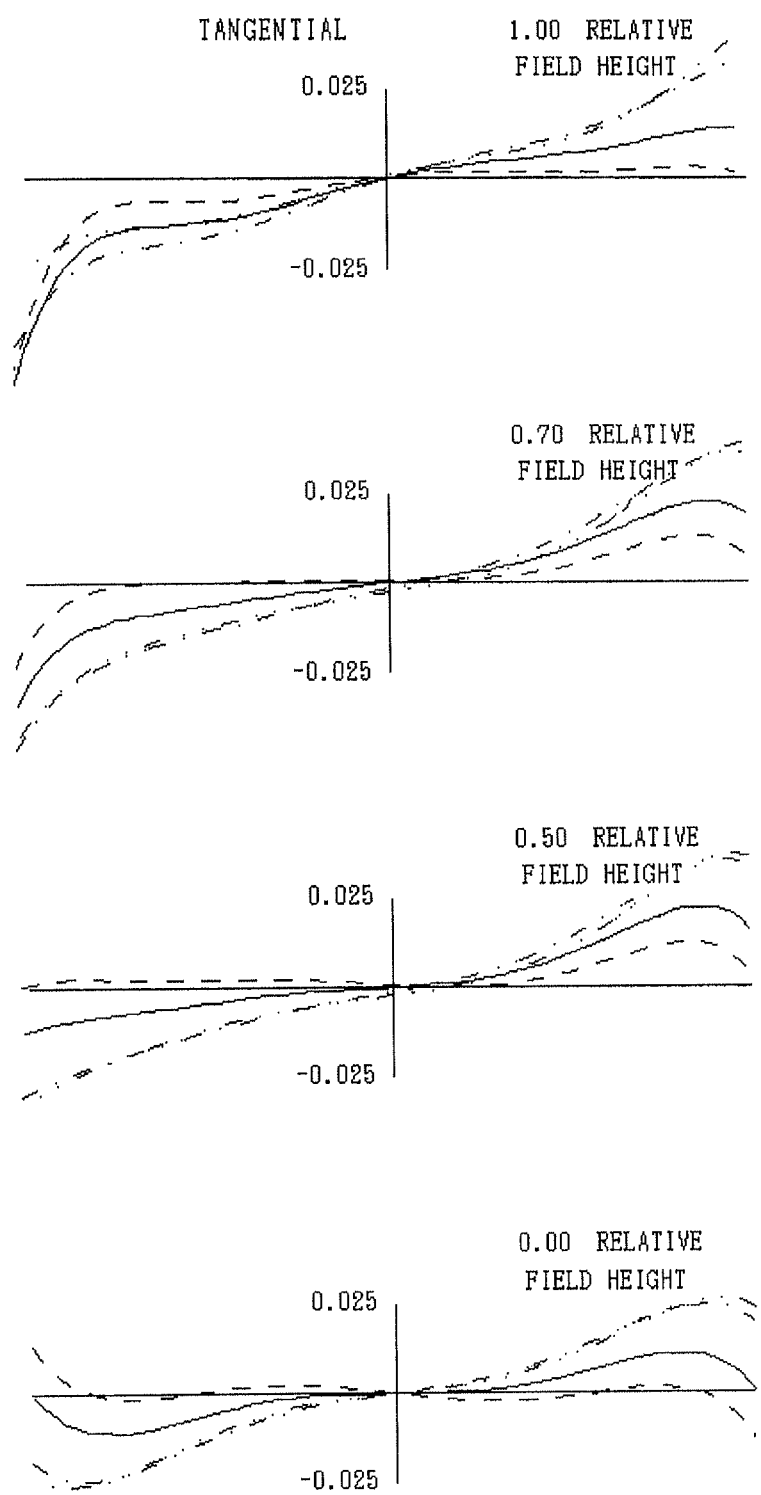
FIG. 5 is a figure showing comatic aberration of this inverted equal-magnification relay lens according to the first example.

Δθg, F$_{G2DP}$=0.0033 (positive lens L14 of second doublet lens DL2)    Condition (21):

FIG. 4 is a figure showing the spherical aberration, the astigmatism, and the distortion of this inverted equal-magnification relay lens 100 according to this first example. And FIG. 5 is a figure showing the comatic aberration of this inverted equal-magnification relay lens 100 according to the first example. In each of these aberration diagrams, the spherical aberration is displayed relatively with a maximum numerical aperture NA=0.125 being taken as 1.0, while the astigmatism, distortion, and tangential comatic aberration are shown up to an image height Y=21.6 mm. Furthermore, in the aberration diagram that shows astigmatism, the solid line shows a sagittal image surface, while the broken line shows a tangential image surface. In the aberration diagram that shows tangential comatic aberration, display is performed relatively with the maximum image height Y=21.6 mm being taken as 1.0. These displays and reference symbols related to the aberration diagrams are the same in the aberration diagrams for the second through the fourth examples that will be explained hereinafter. As will be clear from the aberrations shown in FIGS. 4 and 5, with this inverted equal-magnification relay lens 100 according to the first example, all of the aberrations are corrected satisfactorily.

Example #2

Figure 6:
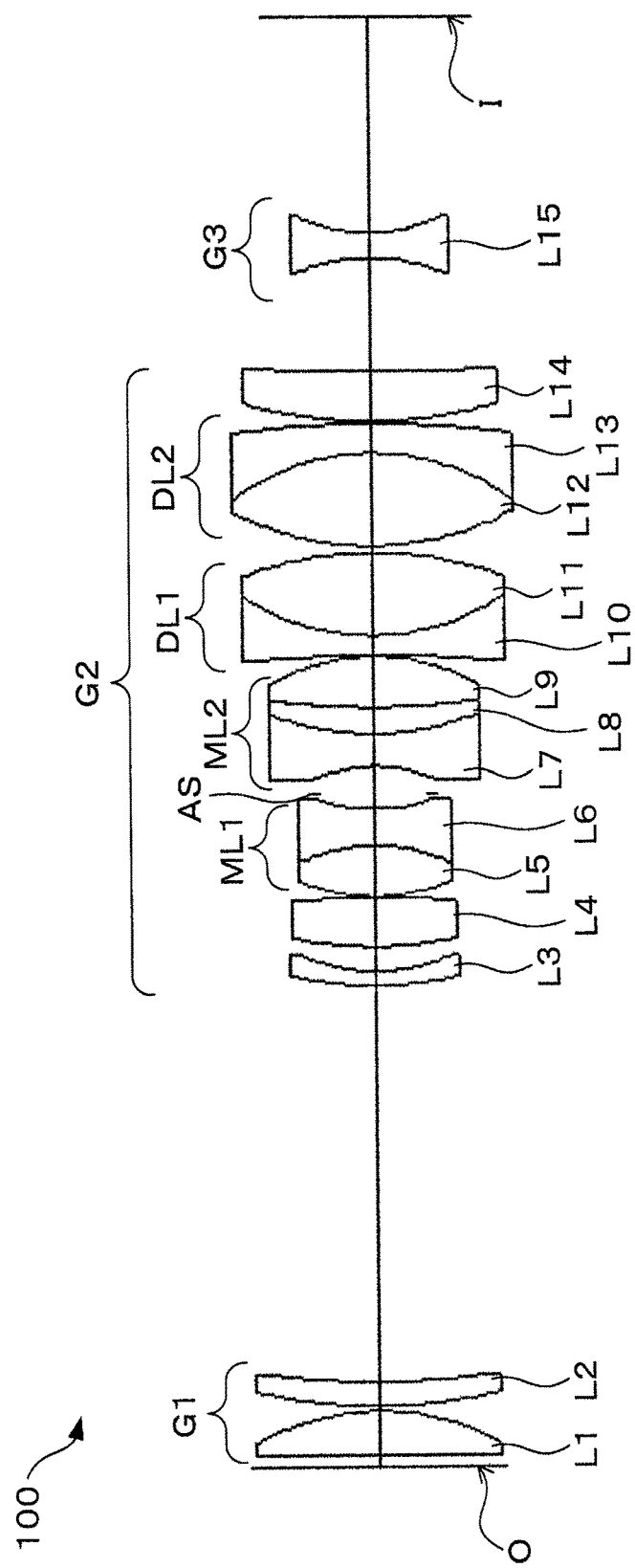
FIG. 6 is a figure for explanation of the structure of a inverted equal-magnification relay lens according to a second example.

Next, a second example will be explained. FIG. 6 is a figure for explanation of the structure of an inverted equal-magnification relay lens 100 according to this second example. This inverted equal-magnification relay lens 100 according to the second example also comprises, in order from the object side, a first lens group G1, a second lens group G2, and a third lens group G3.

The first lens group G1 has an overall positive power, and is disposed near the object. This first lens group G1 comprises, in order from the object side, a positive lens L1 and a positive lens L2.

The second lens group G2 is disposed with an appropriate distance separating it from the first lens group G1, and overall has a positive power. This second lens group G2 comprises, in order from the object side, a negative lens L3, a positive lens L4, a first cemented meniscus lens ML1, a second cemented meniscus lens ML2, a first doublet lens DL1, a second doublet lens DL2, and a positive lens L22.

The first cemented meniscus lens ML1 presents its concave surface toward the image side, and comprises a positive lens (a biconvex lens L5) and a negative lens (a biconcave lens L6). And the second cemented meniscus lens ML2 faces toward the first cemented meniscus lens ML1 with an aperture stop AS sandwiched between them and presents its concave surface toward the object side, and comprises a negative lens (a biconcave lens L7) and positive lenses (a convex meniscus lens L8 and a biconvex lens L9). Thus, in this second example, the second cemented meniscus lens ML2 is a three-layered cemented lens. Due to this, it is possible to reduce on-axis chromatic aberration of the secondary spectrum and the difference in comatic aberration due to differences in wavelength.

The first doublet lens DL1 is a cemented doublet lens in which a negative lens L10 and a positive lens L11 are bonded together. And the second doublet lens DL2 is a cemented doublet lens in which a positive lens L12 and a negative lens L13 are bonded together. Thus, in this second example, two cemented doublet lenses are included in the second lens group G2.

The third lens group G3 comprises a biconcave lens L15, and has a negative power.

Moreover, in the inverted equal-magnification relay lens 100 according to this second example, the entrance pupil position is more toward the object surface O side than the first lens group G1, while the exit pupil position is more toward the third lens group G3 than the image surface I. The distance (ENT.P) from the object surface to the entrance pupil plane at the maximum image height is 76.00 mm, while the distance (EXT.P) from the exit pupil plane to the image surface is 74.15 mm. The focusing position surface number is the 19th surface (in other words, the focusing lens is the first doublet lens DL1 of the second lens group G2), and the air gap from the lens behind it is 1.4 mm.

The following Table 2 gives data of various parameters for this inverted equal-magnification relay lens 100 according to the second example.

TABLE 2

(Overall Specifications)
magnification β = −1.00
numerical aperture NA = 0.125
maximum image height Y = 21.6 mm
(Lens Data)

| Surface number | r | d | nd | vd |
|---|---|---|---|---|
| object | | 3.00 | | |
| 1 | ∞ | 9.00 | 1.81600 | 46.6 |
| 2 | −51.5089 | 1.00 | | |
| 3 | 105.0000 | 5.00 | 1.81600 | 46.6 |
| 4 | 173.0571 | 80.44 | | |
| 5 | 70.8043 | 3.00 | 1.61340 | 44.3 |
| 6 | 37.3171 | 5.00 | | |
| 7 | 79.3434 | 10.00 | 1.72916 | 54.6 |
| 8 | −217.8876 | 0.20 | | |
| 9 | 37.6569 | 10.55 | 1.49782 | 82.6 |
| 10 | −35.6797 | 7.70 | 1.61340 | 44.3 |
| 11 | 31.6997 | 3.40 | | |
| 12 | ∞ | 5.50 | aperture stop | |
| 13 | −31.7526 | 6.60 | 1.61340 | 44.3 |
| 14 | 54.7717 | 5.50 | 1.80810 | 22.8 |
| 15 | 151.5919 | 10.36 | 1.60300 | 65.4 |
| 16 | −42.6892 | 0.20 | | |
| 17 | −255.3860 | 4.00 | 1.61340 | 44.3 |
| 18 | 46.7755 | 17.00 | 1.59319 | 67.9 |
| 19 | −76.3925 | 1.40 | | |
| 20 | 60.0000 | 19.00 | 1.59319 | 67.9 |
| 21 | −47.0980 | 6.00 | 1.61340 | 44.3 |
| 22 | −205.7179 | 0.50 | | |
| 23 | 94.0980 | 10.00 | 1.72916 | 54.6 |
| 24 | 439.4193 | 23.15 | | |
| 25 | −40.1367 | 5.00 | 1.56384 | 60.7 |
| 26 | 33.1433 | 44.00 | | |

As will be understood from Table 2, the lens surface of the first lens group G1 that is closest toward the object side (i.e. its first surface) is a plane. Due to this, as described above, it is possible to keep the influence of minute defects such as particles of waste or the like to a minimum.

Moreover, with the inverted equal-magnification relay lens 100 according to this second example, the values related to Conditions (1) through (21) described above are as given below. Since, as shown below, the inverted equal-magnification relay lens 100 according to this second example satisfies Conditions (1) through (21), accordingly it is possible to obtain the advantageous effects described above.

$|G1F/G2F|=1.17$      Condition (1):

$|G3F/G2F|=0.70$      Condition (2):

$|E_{G1-G2}/E_{G2-G3}|=3.92$      Condition (3):

$|\alpha_{mid}/\alpha_{out}|=0.048$      Condition (4):

$|Y/G3F|=0.69$      Condition (5):

ENT.P/EXT.P=1.02      Condition (6):

$WD=3.0 \ 50\cdot\lambda/NA^2=1.88$      Condition (7):

$D/Y=2.04$      Condition (8):

Condition (9):

$$Y \cdot \sum_{i=1}^{4} \left\{ \frac{1}{R_i} \left( \frac{1}{n_i} - \frac{1}{n_{i-1}} \right) \right\} = 0.95 \quad \text{[Equation 6]}$$

$n_{dG1}$=1.81600 (positive lens L1 of first lens group G1)

$n_{dG1}$=1.81600 (positive lens L2 of first lens group G1)   Condition (10):

$v_{dG1}$=46.6 (positive lens L1 of first lens group G1)

$v_{dG1}$=46.6 (positive lens L2 of first lens group G1)   Condition (11):

$vd_{G2TN}$=44.3 (biconcave lens L7 of second cemented meniscus lens ML2)   Condition (12):

$\Delta\theta g, F_{G2TN}$=−0.0065 (biconcave lens L7 of second cemented meniscus lens ML2)   Condition (13):

$vd_{G2TP1}$=22.8 (convex lens L8 sandwiched in center of second cemented meniscus lens ML2)   Condition (14):

$\Delta\theta g, F_{G2TP1}$=0.0261 (convex lens L8 sandwiched in center of second cemented meniscus lens ML2)   Condition (15):

$vd_{G2TP2}$=65.4 (convex lens L9 on air surface side of second cemented meniscus lens ML2)   Condition (16):

$\Delta\theta g, F_{G2TP2}$=0.0033 (convex lens L9 on air surface side of second cemented meniscus lens ML2)   Condition (17):

$vd_{G2DN}$=44.3 (negative lens L10 of first doublet lens DL1)

$vd_{G2DN}$=44.3 (negative lens L13 of second doublet lens DL2)   Condition (18):

$\Delta\theta g, F_{G2DN}$=−0.0065 (negative lens L10 of first doublet lens DL1)

$\Delta\theta g, F_{G2DN}$=−0.0065 (negative lens L13 of second doublet lens DL2)   Condition (19):

$vd_{G2DP}$=67.9 (positive lens L11 of first doublet lens DL1)

$vd_{G2DP}$=67.9 (positive lens L12 of second doublet lens DL2)   Condition (20):

$\Delta\theta g, F_{G2DP}$=0.0123 (positive lens L11 of first doublet lens DL1)

Figure 8:
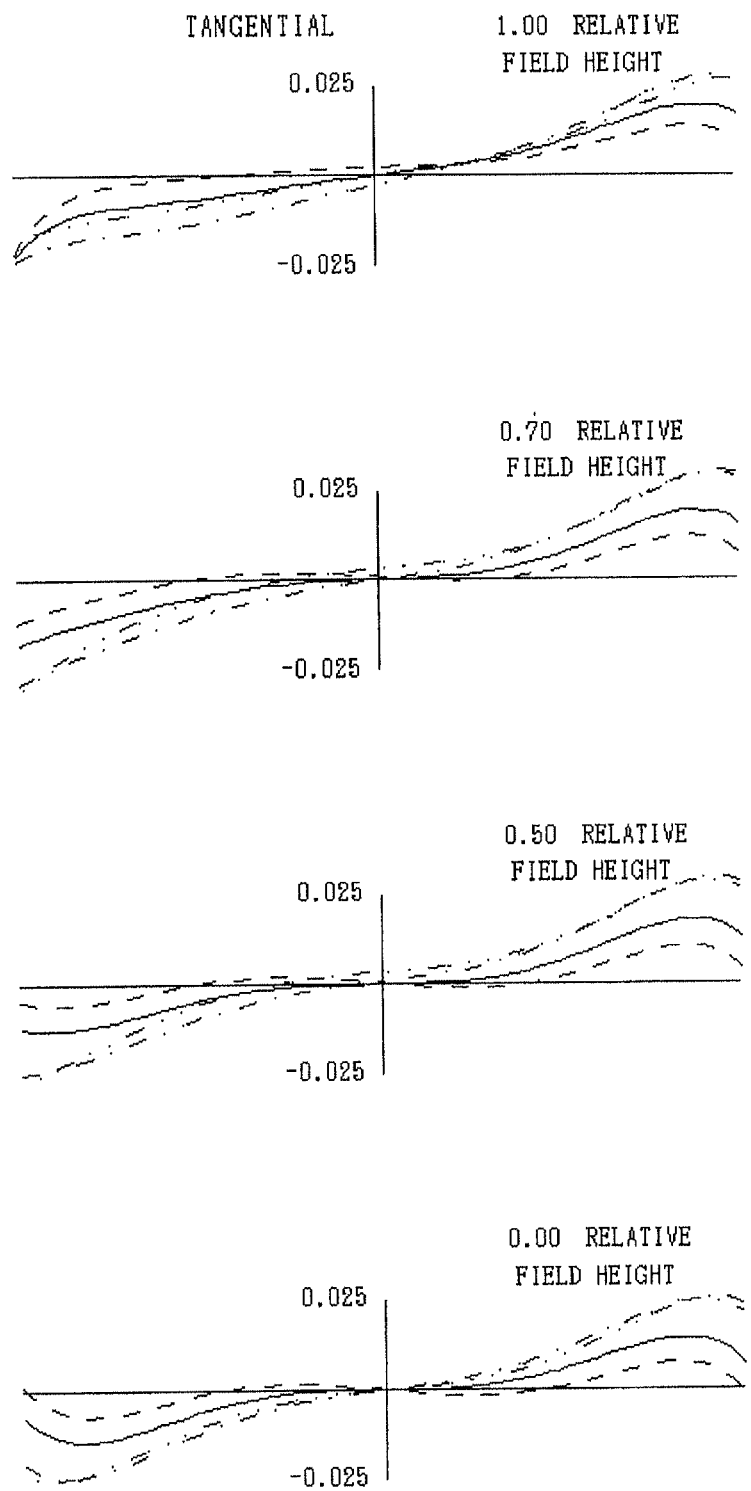
FIG. 8 is a figure showing comatic aberration of this inverted equal-magnification relay lens according to the second example.

$\Delta\theta g, F_{G2DP}$=0.0123 (positive lens L12 of second doublet lens DL2)   Condition (21):

FIG. 7 is a figure showing the spherical aberration, the astigmatism, and the distortion of this inverted equal-magnification relay lens 100 according to this second example. And FIG. 8 is a figure showing the comatic aberration of this inverted equal-magnification relay lens 100 according to the second example. As will be clear from the aberrations shown in FIGS. 7 and 8, with this inverted equal-magnification relay lens 100 according to the second example, all of the aberrations are corrected satisfactorily.

Example #3

Figure 9:
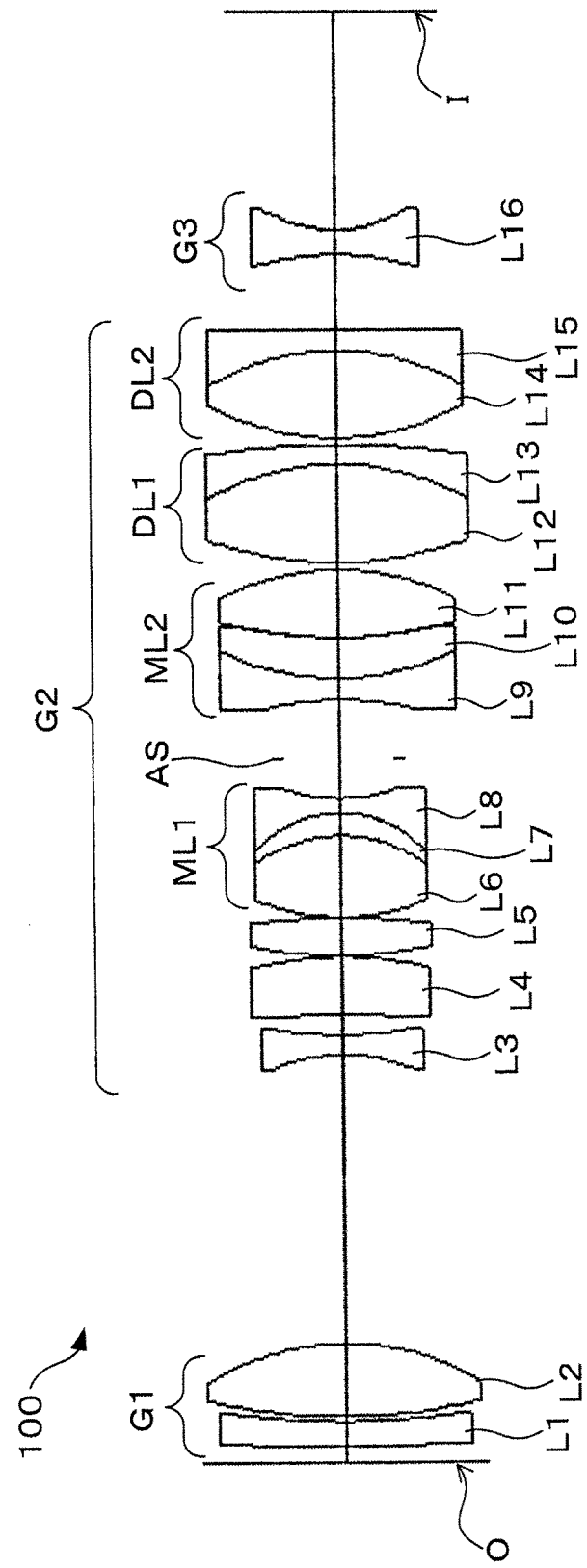
FIG. 9 is a figure for explanation of the structure of a inverted equal-magnification relay lens according to a third example.

Next, a third example will be explained. FIG. 9 is a figure for explanation of the structure of an inverted equal-magnification relay lens 100 according to this third example. This inverted equal-magnification relay lens 100 according to the third example also comprises, in order from the object side, a first lens group G1, a second lens group G2, and a third lens group G3.

The first lens group G1 has an overall positive power, and is disposed near the object. This first lens group G1 comprises, in order from the object side, a negative lens L1 and a positive lens L2.

The second lens group G2 is disposed with an appropriate distance separating it from the first lens group G1, and overall has a positive power. This second lens group G2 comprises, in order from the object side, a negative lens L3, a positive lens L4, a positive lens L5, a first cemented meniscus lens ML1, a second cemented meniscus lens ML2, a first doublet lens DL1, and a second doublet lens DL2.

The first cemented meniscus lens ML1 presents its concave surface toward the image side, and comprises positive lenses (a biconvex lens L6 and a convex meniscus lens L7) and a negative lens (a biconcave lens L8). And the second cemented meniscus lens ML2 faces toward the first cemented meniscus lens ML1 with an aperture stop AS sandwiched between them and presents its concave surface toward the object side, and comprises a negative lens (a biconcave lens L9) and positive lenses (a convex meniscus lens L10 and a biconvex lens L11). Thus, in this third example, both the first cemented meniscus lens ML1 and also the second cemented meniscus lens ML2 are three-layered cemented lenses. Due to this, it is possible to reduce on-axis chromatic aberration of the secondary spectrum and the difference in comatic aberration due to differences in wavelength.

The first doublet lens DL1 is a cemented doublet lens in which a positive lens L12 and a negative lens L13 are bonded together. And the second doublet lens DL2 is a cemented doublet lens in which a positive lens L14 and a negative lens L15 are bonded together. Thus, in this third example, two cemented doublet lenses are included in the second lens group G2.

The third lens group G3 consists of a biconcave lens L16, and has a negative power.

Moreover, in the inverted equal-magnification relay lens 100 according to this third example, the entrance pupil position is more toward the object surface O side than the first lens group G1, while the exit pupil position is more toward the third lens group G3 than the image surface I. The distance (ENT.P) from the object surface to the entrance pupil plane at the maximum image height is 76.85 mm, while the distance (EXT.P) from the exit pupil plane to the image surface is 74.98 mm.

The following Table 3 gives data of various parameters for this inverted equal-magnification relay lens 100 according to the third example.

TABLE 3

(Overall Specifications)
magnification β = −1.00
numerical aperture NA = 0.125
maximum image height Y = 21.6 mm
(Lens Data)

| Surface number | r | d | nd | vd |
|---|---|---|---|---|
| object | | 3.00 | | |
| 1 | 800.0000 | 5.00 | 1.73800 | 32.3 |
| 2 | 158.0586 | 1.00 | | |

TABLE 3-continued (Overall Specifications)
magnification β = −1.00
numerical aperture NA = 0.125
maximum image height Y = 21.6 mm
(Lens Data)

| Surface number | r | d | nd | vd |
|---|---|---|---|---|
| 3 | 116.9771 | 15.00 | 1.81600 | 46.6 |
| 4 | −53.0103 | 58.51 | | |
| 5 | −39.3958 | 4.00 | 1.61340 | 44.3 |
| 6 | 88.2832 | 4.00 | | |
| 7 | −394.3570 | 12.10 | 1.72916 | 54.6 |
| 8 | −69.6984 | 0.20 | | |
| 9 | 88.8280 | 7.70 | 1.60300 | 65.4 |
| 10 | −164.1970 | 0.20 | | |
| 11 | 43.2243 | 16.64 | 1.49782 | 82.6 |
| 12 | −30.2572 | 4.70 | 1.67270 | 32.2 |
| 13 | −23.2532 | 3.50 | 1.61340 | 44.3 |
| 14 | 34.2771 | 7.79 | | |
| 15 | ∞ | 12.20 | aperture stop | |
| 16 | −73.0899 | 4.50 | 1.61340 | 44.3 |
| 17 | 53.8337 | 8.36 | 1.80810 | 22.8 |
| 18 | 89.6646 | 13.94 | 1.59319 | 67.9 |
| 19 | −52.2802 | 1.40 | | |
| 20 | 75.0836 | 20.00 | 1.59319 | 67.9 |
| 21 | −55.0000 | 4.00 | 1.61340 | 44.3 |
| 22 | −186.8780 | 1.40 | | |
| 23 | 52.0327 | 18.00 | 1.59319 | 67.9 |
| 24 | −50.0000 | 4.00 | 1.61340 | 44.3 |
| 25 | 996.0024 | 15.50 | | |
| 26 | −64.8647 | 5.00 | 1.56384 | 60.7 |
| 27 | 27.6331 | 44.80 | | |

As will be understood from Table 3, the lens surface of the first lens group G1 that is closest toward the object side (i.e. its first surface) is a convex surface toward the object. Due to this, as described above, it is possible to keep the influence of minute defects such as particles of waste or the like to a minimum.

Moreover, with the inverted equal-magnification relay lens 100 according to this third example, the values related to Conditions (1) through (3) and (5) through (21) described above are as given below. Since, as shown below, the inverted equal-magnification relay lens 100 according to this third example satisfies Conditions (1) through (3) and (5) through (21), accordingly it is possible to obtain the advantageous effects described above.

|G1F/G2F|=1.57   Condition (1):

|G3F/G2F|=0.96   Condition (2):

|$E_{G1\text{-}G2}/E_{G2\text{-}G3}$|=4.77   Condition (3):

|Y/G3F|=0.64   Condition (5):

ENT.P/EXT.P=1.02   Condition (6):

WD=3.0 50·λ/NA²=1.88   Condition (7):

D/Y=2.07   Condition (8):

Condition (9):

$$Y \cdot \sum_{i=1}^{4}\left\{\frac{1}{R_i}\left(\frac{1}{n_i}-\frac{1}{n_{i-1}}\right)\right\} = 0.75 \qquad \text{[Equation 7]}$$

$n_{dG1}$=1.81600 (positive lens L2 of first lens group G1)   Condition (10):

$\nu_{dG1}$=46.6 (positive lens L2 of first lens group G1)   Condition (11):

$\nu d_{G2TN}$=44.3 (biconcave lens L8 of first cemented meniscus lens ML1)

$\nu d_{G2TN}$=44.3 (biconcave lens L9 of second cemented meniscus lens ML2)   Condition (12):

Δθg, $F_{G2TN}$=−0.0065 (biconcave lens L8 of first cemented meniscus lens ML1)

Δθg, $F_{G2TN}$=−0.0065 (biconcave lens L9 of second cemented meniscus lens ML2)   Condition (13):

$\nu d_{G2TP1}$=32.2 (convex lens L7 sandwiched in center of first cemented lens ML1)

$\nu d_{G2TP1}$=22.8 (convex lens L10 sandwiched in center of second cemented lens ML2)   Condition (14):

Δθg, $F_{G2TP1}$=0.0079 (convex lens L7 sandwiched in center of first cemented lens ML1)

Δθg, $F_{G2TP1}$=0.0261 (convex lens L10 sandwiched in center of second cemented lens ML2)   Condition (15):

$\nu d_{G2TP2}$=82.6 (convex lens L6 on air surface side of first cemented meniscus lens ML1)

$\nu d_{G2TP2}$=67.9 (convex lens L11 on air surface side of second cemented meniscus lens ML2)   Condition (16):

Δθg, $F_{G2TP2}$=0.0307 (convex lens L6 on air surface side of first cemented meniscus lens ML1)

Δθg, $F_{G2TP2}$=0.0123 (convex lens L11 on air surface side of second cemented meniscus lens ML2)   Condition (17):

$\nu d_{G2DN}$=44.3 (negative lens L13 of first doublet lens DL1)

$\nu d_{G2DN}$=44.3 (negative lens L15 of second doublet lens DL2)   Condition (18):

Δθg, $F_{G2DN}$=−0.0065 (negative lens L13 of first doublet lens DL1)

Δθg, $F_{G2DN}$=−0.0065 (negative lens L15 of second doublet lens DL2)   Condition (19):

$\nu d_{G2DP}$=67.9 (positive lens L12 of first doublet lens DL1)

$\nu d_{G2DP}$=67.9 (positive lens L14 of second doublet lens DL2)   Condition (20):

Δθg, $F_{G2DP}$=0.0123 (positive lens L12 of first doublet lens DL1)

Δθg, $F_{G2DP}$=0.0123 (positive lens L14 of second doublet lens DL2)   Condition (21):

FIG. 10 is a figure showing the spherical aberration, the astigmatism, and the distortion of this inverted equal-magnification relay lens 100 according to the third example. And FIG. 11 is a figure showing the comatic aberration of this inverted equal-magnification relay lens 100 according to the third example. As will be clear from the aberrations shown in FIGS. 10 and 11, with this inverted equal-magnification relay lens 100 according to the third example as well, all of the aberrations are corrected satisfactorily.

Example #4

Next, a fourth example will be explained. FIG. 12 is a figure for explanation of the structure of an inverted equal-magnification relay lens 100 according to this fourth example. This inverted equal-magnification relay lens 100 according to the fourth example comprises, in order from the object side, a first lens group G1, a first plane mirror M1, a second plane mirror M2, a second lens group G2, and a third lens group G3.

The first plane mirror M1 and the second plane mirror M2 are mutually parallel, and are both arranged so as to be inclined at 45° with respect to the optical axis AX from the first lens group G1. The first plane mirror M1 folds the light flux from the first lens group G1 vertically and directs it toward the second plane mirror M2. And the second plane mirror M2 again folds the light flux from the first plane mirror M1 vertically, thus bringing it into a direction that is parallel to the light flux from the first lens group G1 to the first plane mirror M1, and directs it toward the second lens group G2. In this manner, the first plane mirror M1 and the second plane mirror M2 fold the optical axis AX between the first lens group G1 and the second lens group G2 into a cranked shape. Since, due to this, the length of the inverted equal-magnification relay lens 100 becomes shorter, accordingly it is possible to make the inverted equal-magnification relay lens 100 more compact.

The first lens group G1 has an overall positive power, and is disposed near the object side. This first lens group G1 comprises a positive lens L1.

The second lens group G2 is disposed with an appropriate distance separating it from the first lens group G1, and overall has a positive power. This second lens group G2 comprises, in order from the object side, a negative lens L2, a positive lens L3, a first cemented meniscus lens ML1, a second cemented meniscus lens ML2, a first doublet lens DL1, a second doublet lens DL2, and a positive lens L13.

The first cemented meniscus lens ML1 presents its concave surface toward the image side, and comprises a positive lens (a biconvex lens L4) and a negative lens (a biconcave lens L5). And the second cemented meniscus lens ML2 faces toward the first cemented meniscus lens ML1 with an aperture stop AS sandwiched between them and presents its concave surface toward the object side, and comprises a negative lens (a biconcave lens L6) and positive lenses (a convex meniscus lens L7 and a biconvex lens L8). Thus, in this fourth example, the second cemented meniscus lens ML2 is a three-layered cemented lens. Due to this, it is possible to reduce on-axis chromatic aberration of the secondary spectrum and the difference in comatic aberration due to differences in wavelength.

The first doublet lens DL1 is a cemented doublet lens in which a negative lens L9 and a positive lens L10 are bonded together. And the second doublet lens DL2 is a cemented doublet lens in which a positive lens L11 and a negative lens L12 are bonded together. Thus, in this fourth example, two cemented doublet lenses are included in the second lens group G2.

The third lens group G3 comprises a biconcave lens L14, and has a negative power.

Moreover, in the inverted equal-magnification relay lens 100 according to this fourth example, the entrance pupil position is more toward the object surface O side than the first lens group G1, while the exit pupil position is more toward the third lens group G3 than the image surface I. The distance (ENT.P) from the object surface to the entrance pupil plane at the maximum image height is 77.03 mm, while the distance (EXT.P) from the exit pupil plane to the image surface is 75.98 mm. The focusing position surface number is the 19th surface (in other words, the focusing lens is the first doublet lens DL1 of the second lens group G2), and the air gap from the lens behind it is 1.4 mm.

The following Table 4 gives data of various parameters for this inverted equal-magnification relay lens 100 according to the fourth example.

TABLE 4

(Overall Specifications)
magnification β = −1.00
numerical aperture NA = 0.125
maximum image height Y = 21.6 mm
(Lens Data)

| Surface number | r | d | nd | vd |
|---|---|---|---|---|
| object | | 3.00 | | |
| 1 | ∞ | 10.00 | 1.81600 | 46.6 |
| 2 | −47.0020 | 22.50 | | |
| 3 | ∞ | 45.70 | reflecting | |
| 4 | ∞ | 22.50 | reflecting | |
| 5 | 65.4640 | 4.05 | 1.61340 | 44.3 |
| 6 | 39.6230 | 4.00 | | |
| 7 | 66.8190 | 10.05 | 1.72916 | 54.6 |
| 8 | −160.9560 | 0.20 | | |
| 9 | 31.6040 | 8.00 | 1.49782 | 82.6 |
| 10 | −48.7130 | 6.00 | 1.61340 | 44.3 |
| 11 | 25.6410 | 3.50 | | |
| 12 | ∞ | 3.50 | aperture stop | |
| 13 | −38.2290 | 11.20 | 1.61340 | 44.3 |
| 14 | 38.2290 | 5.50 | 1.80810 | 22.8 |
| 15 | 76.4200 | 8.90 | 1.59319 | 67.9 |
| 16 | −45.1530 | 0.20 | | |
| 17 | −70.031 | 3.90 | 1.61340 | 44.3 |
| 18 | 34.9930 | 19.95 | 1.59319 | 67.9 |
| 19 | −62.1900 | 1.40 | | |
| 20 | 58.4110 | 19.00 | 1.60300 | 65.4 |
| 21 | −68.3360 | 6.00 | 1.61340 | 44.3 |
| 22 | −193.9730 | 0.50 | | |
| 23 | 54.2180 | 10.05 | 1.72916 | 54.6 |
| 24 | 102.7580 | 17.45 | | |
| 25 | −53.5290 | 3.90 | 1.56384 | 60.7 |
| 26 | 26.8280 | 45.40 | | |

As will be understood from Table 4, the lens surface of the first lens group G1 that is closest toward the object side (i.e. its first surface) is a plane. Due to this, as described above, it is possible to keep the influence of minute defects such as waste or the like down to a minimum limit.

Moreover, with the inverted equal-magnification relay lens 100 according to this fourth example, the values related to Conditions (1) through (22) described above are as given below. Since, as shown below, the inverted equal-magnification relay lens 100 according to this fourth example satisfies Conditions (1) through (22), accordingly it is possible to obtain the advantageous effects described above.

| $|G1F/G2F|=1.20$ | Condition (1): |
|---|---|
| $|G3F/G2F|=0.65$ | Condition (2): |
| $|E_{G1-G2}/E_{G2-G3}|=3.88$ | Condition (3): |
| $|\alpha_{mid}/\alpha_{out}|=0.069$ | Condition (4): |
| $|Y/G3F|=0.69$ | Condition (5): |
| ENT.P/EXT.P=1.01 | Condition (6): |

$WD=3.00$ $50 \cdot \lambda/NA^2=1.88$  Condition (7):

$D/Y=2.10$  Condition (8):

Condition (9):

$$Y \cdot \sum_{i=1}^{4} \left\{ \frac{1}{R_i} \left( \frac{1}{n_i} - \frac{1}{n_{i-1}} \right) \right\} = 0.97 \quad \text{[Equation 8]}$$

$n_{dG1}=1.81600$ (positive lens L1 of first lens group G1)  Condition (10):

$\nu_{dG1}=46.6$ (positive lens L1 of first lens group G1)  Condition (11):

$\nu d_{G2TN}=44.3$ (biconcave lens L6 of second cemented meniscus lens ML2)  Condition (12):

$\Delta\theta g, F_{G2TN}=-0.0065$ (biconcave lens L6 of second cemented meniscus lens ML2)  Condition (13):

$\nu d_{G2TP1}=22.8$ (convex lens L7 sandwiched in center of second cemented meniscus lens ML2)  Condition (14):

$\Delta\theta g, F_{G2TP1}=0.0261$ (convex lens L7 sandwiched in center of second cemented meniscus lens ML2)  Condition (15):

$\nu d_{G2TP2}=67.9$ (convex lens L8 on air surface side of second cemented meniscus lens ML2)  Condition (16):

$\Delta\theta g, F_{G2TP2}=0.0123$ (convex lens L8 on air surface side of second cemented meniscus lens ML2)  Condition (17):

$\nu d_{G2DN}=44.3$ (negative lens L9 of first doublet lens DL1)

$\nu d_{G2DN}=44.3$ (negative lens L12 of second doublet lens DL2)  Condition (18):

$\Delta\theta g, F_{G2DN}=-0.0065$ (negative lens L9 of first doublet lens DL1)

$\Delta\theta g, F_{G2DN}=-0.0065$ (negative lens L12 of second doublet lens DL2)  Condition (19):

$\nu d_{G2DP}=67.9$ (positive lens L10 of first doublet lens DL1)

$\nu d_{G2DP}=65.4$ (positive lens L11 of second doublet lens DL2)  Condition (20):

$\Delta\theta g, F_{G2DP}=0.0123$ (positive lens L10 of first doublet lens DL1)

Figure 13:
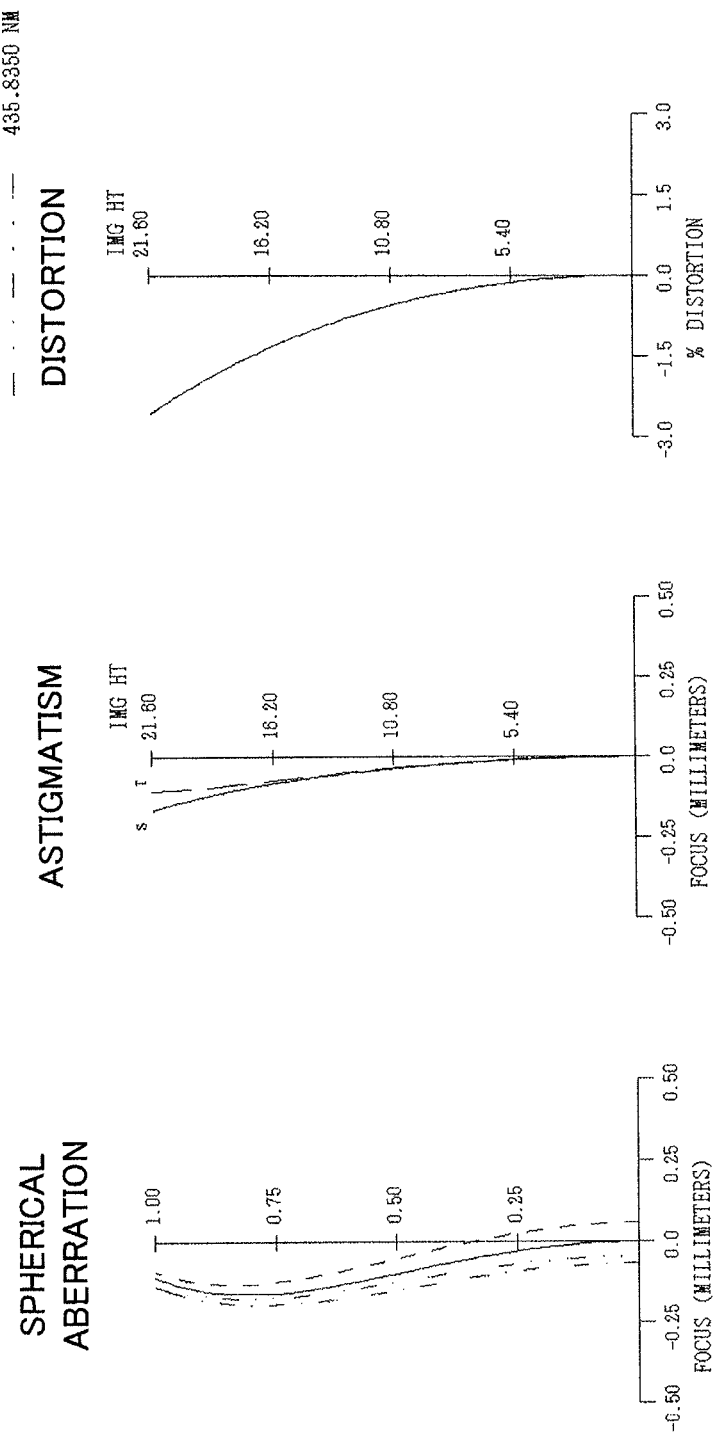
FIG. 13 is a figure showing spherical aberration, astigmatism, and distortion of this inverted equal-magnification relay lens according to the fourth example.

$\Delta\theta g, F_{G2DP}=0.0033$ (positive lens L11 of second doublet lens DL2)  Condition (21):

$L=90.7$ $L/Y=4.199$  Condition (22):

FIG. 13 is a figure showing the spherical aberration, the astigmatism, and the distortion of this inverted equal-magnification relay lens 100 according to this fourth example. And FIG. 14 is a figure showing the comatic aberration of this inverted equal-magnification relay lens 100 according to the fourth example. As will be clear from the aberrations shown in FIGS. 13 and 14, with this inverted equal-magnification relay lens 100 according to the fourth example as well, all of the aberrations are corrected satisfactorily.

Example #5

Figure 15:
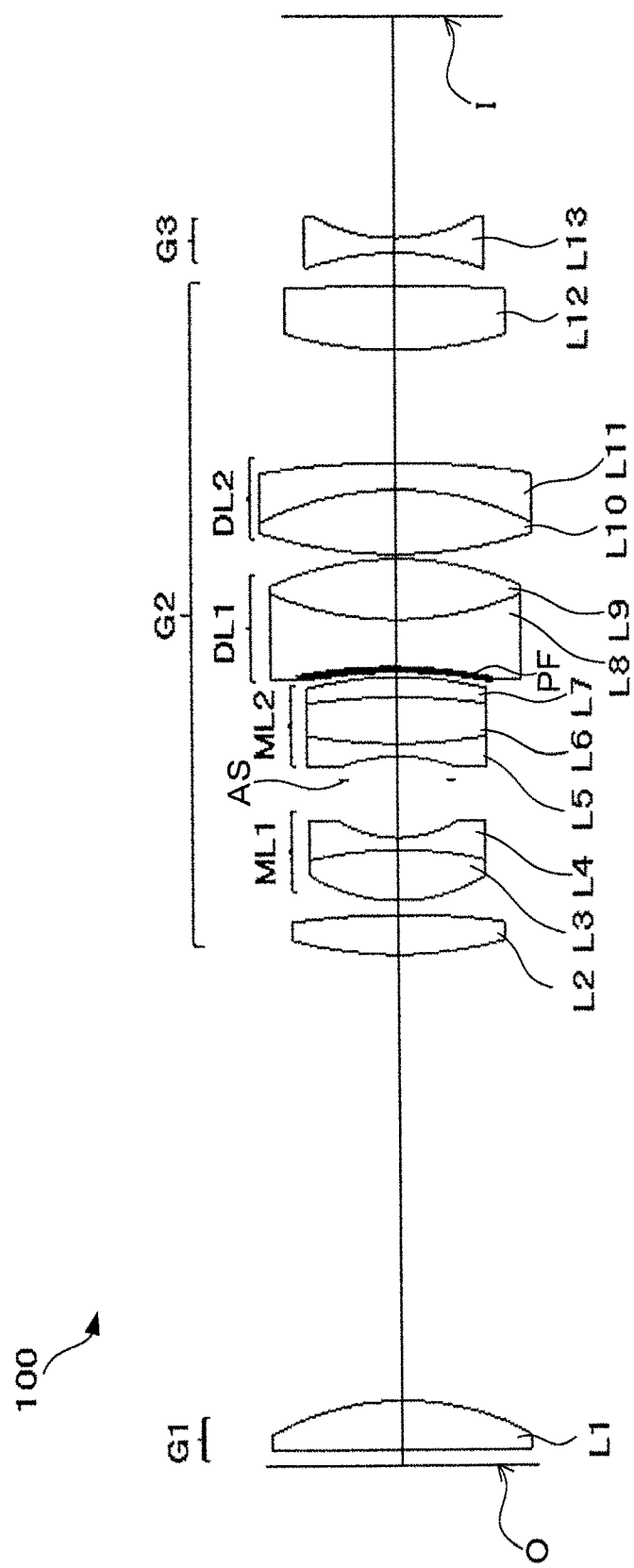
FIG. 15 is a figure for explanation of the structure of a inverted equal-magnification relay lens according to a fifth example.

Next, a fifth example will be explained. FIG. 15 is a figure for explanation of the structure of an inverted equal-magnification relay lens 100 according to this fifth example. This inverted equal-magnification relay lens 100 according to the fifth example also comprises, in order from the object side, a first lens group G1, a second lens group G2, and a third lens group G3.

The first lens group G1 has an overall positive power, and is disposed near the object. This first lens group G1 comprises a positive lens L1.

The second lens group G2 is disposed with an appropriate distance separating it from the first lens group G1, and overall has a positive power. This second lens group G2 comprises, in order from the object side, a positive lens L2, a first cemented meniscus lens ML1, a second cemented meniscus lens ML2, a first doublet lens DL1, a second doublet lens DL2, and a positive lens L12. A close contact multi-layer type diffractive optical element PF that comprises two different resin members is provided on the object side concave surface of a negative lens L8 of the first doublet lens DL1.

The first cemented meniscus lens ML1 presents its concave surface toward the image side, and comprises a positive lens (a biconvex lens L3) and a negative lens (a biconcave lens L4). And the second cemented meniscus lens ML2 faces toward the first cemented meniscus lens ML1 with an aperture stop AS sandwiched between them and presents its concave surface toward the object side, and comprises a negative lens (a biconcave lens L5) and positive lenses (a biconvex lens L6 and a convex meniscus lens L7). Thus, in this fifth example, the second cemented meniscus lens ML2 is a three-layered cemented lens. Due to this, it is possible to reduce on-axis chromatic aberration of the secondary spectrum and the difference in comatic aberration due to differences in wavelength.

The first doublet lens DL1 is a cemented doublet lens in which a negative lens L8 and a positive lens L9 are bonded together. The close contact multi-layer type diffractive optical element PF is provided on the object side concave surface of the negative lens L8 of the first doublet lens L8, and the positive lens L9 is adhered to the image side concave surface of the negative lens L8. And the second doublet lens DL2 is a cemented doublet lens in which a positive lens L10 and a negative lens L11 are bonded together. Thus, in this fifth example, two cemented doublet lenses are included in the second lens group G2.

Due to the chromatic aberration correction function of the close contact multi-layer type diffractive optical element PF which is provided on the object side concave surface of the negative lens L8 of the first doublet lens DL1, it is possible not to employ anomalous dispersion glass for the positive lens L9 of the first doublet lens DL1 and for the positive lens L10 of the second doublet lens DL2, and furthermore it is possible to reduce axial chromatic aberration of the secondary spectrum and/or fluctuations of the back focus position generated due to changes of the temperature of the environment.

The third lens group G3 comprises a biconcave lens L13, and has a negative power.

Moreover, in the inverted equal-magnification relay lens 100 according to this fifth example, the entrance pupil position is more toward the object surface O side than the first lens group G1, while the exit pupil position is more toward the third lens group G3 than the image surface I. The distance (ENT.P) from the object surface to the entrance pupil plane at the maximum image height is 77.88 mm, while the distance (EXT.P) from the exit pupil plane to the image surface is 82.69 mm.

The following Table 5 gives data of various parameters for this inverted equal-magnification relay lens 100 according to the fifth example. It should be understood that, in Table 5, a is the thermal expansion coefficient ($\times 10^{-7}/°$ C.) at standard temperature, and dn/dT is the relative refractive index temperature coefficient ($\times 10^{-6}/°$ C.) of d rays ($\lambda$=587.582 nm) at 20~40° C. These reference symbols mean the same in the Tables for the sixth through the ninth examples explained below. In this connection, since it has been checked that, for the thermal expansion coefficients ($\times 10^{-7}/°$ C.) at normal temperature for a close contact multi-layer type diffractive optical element PF made from two different resin members, there is very little difference in value from the absolute value, accordingly these two values are both represented by the average value for the two resin members; and the same is the case in the Tables for the sixth through the ninth examples explained below.

Moreover, if the optical surface is a diffractive optical surface, an asterisk * is appended thereto in Table 5. The same is the case in the Tables for the sixth through the ninth examples explained below. It will be supposed that the shape of the diffractive optical surface is defined by the following Equation (a) by using a phase function method. In other words, it will be supposed that the diffractive optical surface is subject to phase conversion of the wave front on the basis of the following Equation (a). In this Equation (a) below, Φ denotes the phase function, h denotes the distance in the radial direction, $C_i$ denotes the i-th order coefficient, and $\lambda_e$ denotes the reference wavelength (e rays). Here, it is supposed that the diffractive optical surface is rotationally symmetric about the optical axis as center. It should be understood that a phase function method is disclosed in, for example, "Introduction to Diffractive Optical Elements (enlarged and revised edition)", Optronics Co, 2006, Optics Design Research Group, The Optical Society of Japan, Japan Society of Applied Physics (Co).

$$\Phi(h) = (2\pi/\lambda_e) \times (C_1 \cdot h^2 + C_2 \cdot h^4 + C_3 \cdot h^6 + C_4 \cdot h^8) \quad (a)$$

The entries under "Diffractive Optical Surface Data" in the Table specify the coefficients when the shape of the diffractive optical surface given in "Lens Data" is described by the following Equation (a). Moreover, in the Table, "E-n" means "$\times 10^{-n}$"; for example, "1.234E-n" means "1.234 × $10^{-n}$".

TABLE 5

(Overall Specifications)
magnification β = −1.00
numerical aperture NA = 0.125
maximum image height Y = 21.6 mm (Lens Data)

| Surface number | r | d | nd | νd | α | dn/dT |
|---|---|---|---|---|---|---|
| object |  | 3.00 |  |  |  |  |
| 1 | ∞ | 10.00 | 1.81600 | 46.6 | 58 | 4.7 |
| 2 | −49.5705 | 90.50 |  |  |  |  |
| 3 | 76.5179 | 8.00 | 1.72916 | 54.6 | 56 | 4 |
| 4 | −149.4628 | 2.90 |  |  |  |  |
| 5 | 30.7273 | 10.40 | 1.51860 | 69.9 | 63 | 3.6 |
| 6 | −71.4176 | 2.50 | 1.67300 | 38.2 | 86 | 3.8 |
| 7 | 21.5031 | 11.80 |  |  |  |  |
| 8 | ∞ | 5.00 | aperture stop |  |  |  |
| 9 | −29.6372 | 2.50 | 1.67300 | 38.2 | 86 | 3.8 |
| 10 | 94.0758 | 9.50 | 1.80810 | 22.8 | 83 | −0.3 |
| 11 | −120.0000 | 4.15 | 1.64000 | 60.2 | 60 | 3.1 |
| 12 | −67.7824 | 1.00 |  |  |  |  |
| 13 | −95.1880 | 0.20 | 1.55710 | 50.0 | 1255 |  |
| 14* | −95.1880 | 0.20 | 1.52780 | 33.3 | 1255 |  |
| 15 | −95.1880 | 10.35 | 1.72047 | 34.7 | 81 | 3.5 |
| 16 | 59.8752 | 12.25 | 1.72916 | 54.6 | 56 | 4 |
| 17 | −57.1593 | 1.05 |  |  |  |  |
| 18 | 82.8091 | 13.10 | 1.72916 | 54.6 | 56 | 4 |
| 19 | −55.6070 | 5.45 | 1.67300 | 38.2 | 86 | 3.8 |
| 20 | −163.7125 | 23.10 |  |  |  |  |
| 21 | 71.4453 | 13.00 | 1.72916 | 54.6 | 56 | 4 |
| 22 | −610.1088 | 6.85 |  |  |  |  |
| 23 | −47.3477 | 3.05 | 1.56384 | 60.7 | 64 | 3.4 |
| 24 | 31.8966 | 45.05 |  |  |  |  |

(Diffractive Optical Surface Data)

Surface 14

$C_1 = -2.1062E-04$, $C_2 = 1.7850E-07$, $C_3 = -1.9799E-10$, $C_4 = 5.1578E-13$

As will be understood from Table 5, the lens surface of the first lens group G1 that is closest toward the object side (i.e. its first surface) is a plane. Due to this, as described above, it is possible to keep the influence of minute defects such as particles of waste or the like to a minimum.

Moreover, with the inverted equal-magnification relay lens 100 according to this fifth example, the values related to Conditions (1) through (3), (5) through (21), and (23) through (26) described above are as given below. Since, as shown below, the inverted equal-magnification relay lens 100 according to this fifth example satisfies Conditions (1) through (3), (5) through (21), and (23) through (26), accordingly it is possible to obtain the advantageous effects described above.

|G1F/G2F|=0.94  Condition (1):

|G3F/G2F|=0.52  Condition (2):

|$E_{G1-G2}/E_{G2-G3}$|=3.4  Condition (3):

|Y/G3F|=0.65  Condition (5):

ENT.P/EXT.P=0.94  Condition (6):

WD=3.00  50·$\lambda$/NA²=1.88  Condition (7):

D/Y=2.09  Condition (8):

Condition (9):

$$Y \cdot \sum_{i=1}^{4}\left\{\frac{1}{R_i}\left(\frac{1}{n_i} - \frac{1}{n_{i-1}}\right)\right\} = 1.11 \quad \text{[Equation 9]}$$

$n_{dG1}$=1.81600 (positive lens L1 of first lens group G1)  Condition (10):

$\nu_{dG1}$=46.6 (positive lens L1 of first lens group G1)  Condition (11):

$\nu d_{G2TN}$=38.2 (biconcave lens L5 of second cemented lens ML2)  Condition (12):

$\Delta\theta g$, $F_{G2TN}$=−0.0044 (biconcave lens L5 of second cemented lens ML2)  Condition (13):

$\nu d_{G2TP1}$=22.8 (convex lens L6 sandwiched at center of second cemented meniscus lens ML2) Condition (14):

$\Delta\theta g, F_{G2TP1}$=0.0261 (convex lens L6 sandwiched at center of second cemented meniscus lens ML2) Condition (15):

$\nu d_{G2TP2}$=60.2 (convex lens L7 at air surface side of second cemented meniscus lens ML2) Condition (16):

$\Delta\theta g, F_{G2TP2}$=−0.0064 (convex lens L7 at air surface side of second cemented meniscus lens ML2) Condition (17):

$\nu d_{G2DN}$=34.7 (negative lens L8 of first doublet lens DL1)

$\nu d_{G2DN}$=38.2 (negative lens L11 of second doublet lens DL2) Condition (18):

$\Delta\theta g, F_{G2DN}$=−0.0017 (negative lens L8 of first doublet lens DL1)

$\Delta\theta g, F_{G2DN}$=−0.0044 (negative lens L11 of second doublet lens DL2) Condition (19):

$\nu d_{G2DP}$=54.6 (positive lens L9 of first doublet lens DL1)

$\nu d_{G2DP}$=54.6 (positive lens L10 of second doublet lens DL2) Condition (20):

$\Delta\theta g, F_{G2DP}$=−0.0088 (positive lens L9 of first doublet lens DL1)

$\Delta\theta g, F_{G2DP}$=−0.0088 (positive lens L10 of second doublet lens DL2) Condition (21):

$L$=90.5$L/Y$=4.190 Condition (22):

$|f_{DOE}/G2F|$=33.6 Condition (23):

$P_{min}$=0.13 Condition (24):

$\Phi_{DOE}/\Phi_{MAX}$=0.67 Condition (25):

Condition (26)

$$\left| \sum_{i=1}^{13} \left( \alpha_i - \frac{dn_i/dT}{n_i - 1} \right) \cdot \frac{h_i^2}{f_i} + 2\alpha_{DOE} \cdot \frac{h_{DOE}^2}{f_{DOE}} \right| = 0.03 \times 10^{-7}$$ [Equation 10]

Furthermore, since Condition (22) is satisfied in this fifth example as described above, accordingly, when a first plane mirror M1 and a second plane mirror M2 are disposed between the first lens group G1 and the second lens group G2 in a similar manner to the case with the fourth example, it is possible to make the inverted equal-magnification relay lens 100 more compact.

Yet further since, in this fifth example, the maximum angle of the light beam that is incident upon the diffractive optical surface (i.e. the fourteenth surface) with respect to the normal to base radius of curvature is 7.9°, and is well within 25°, accordingly almost no influence from flare is experienced, and it is possible to obtain a satisfactory image.

Figure 16:
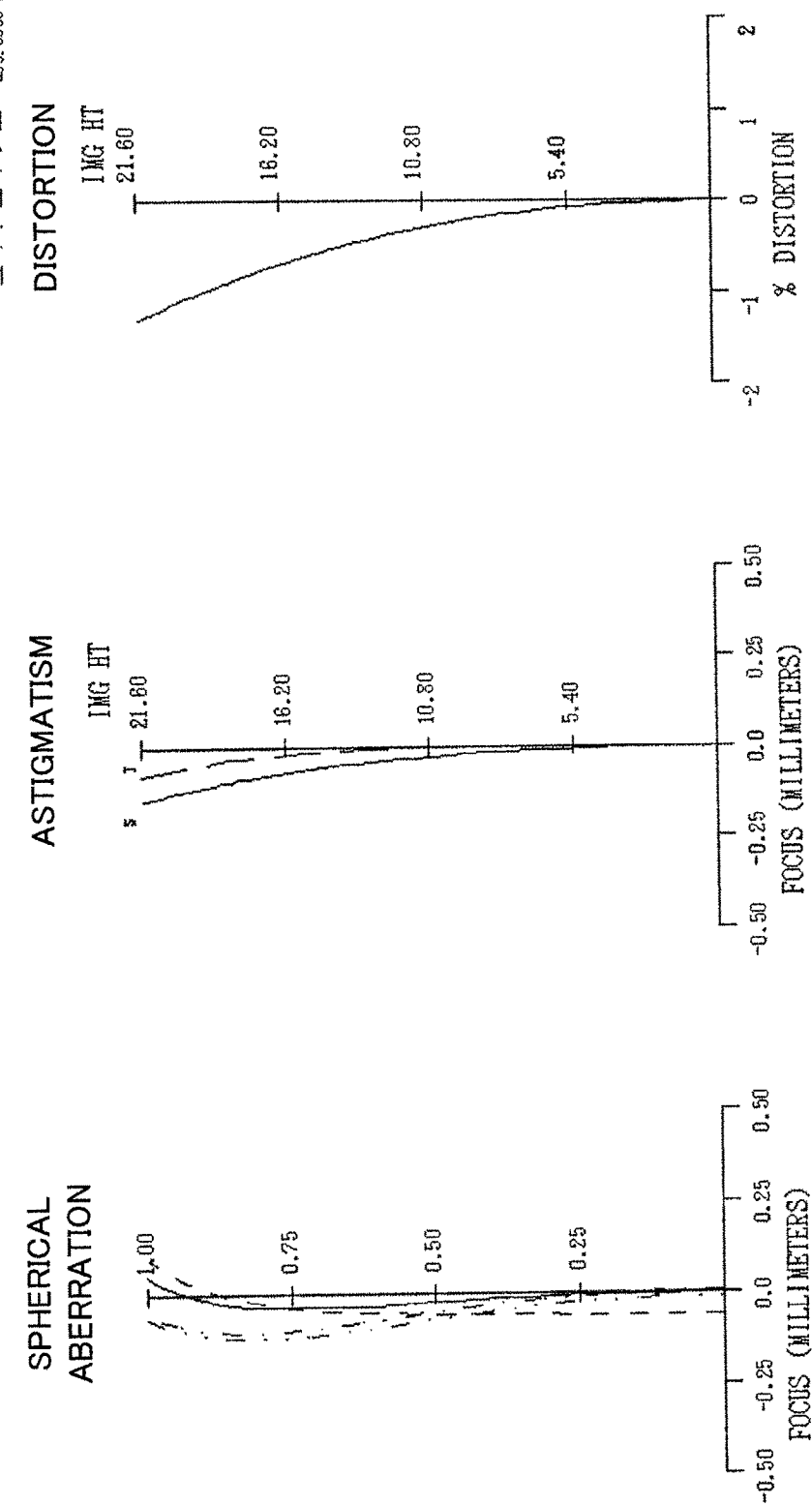
FIG. 16 is a figure showing spherical aberration, astigmatism, and distortion of this inverted equal-magnification relay lens according to the fifth example.
Figure 17:
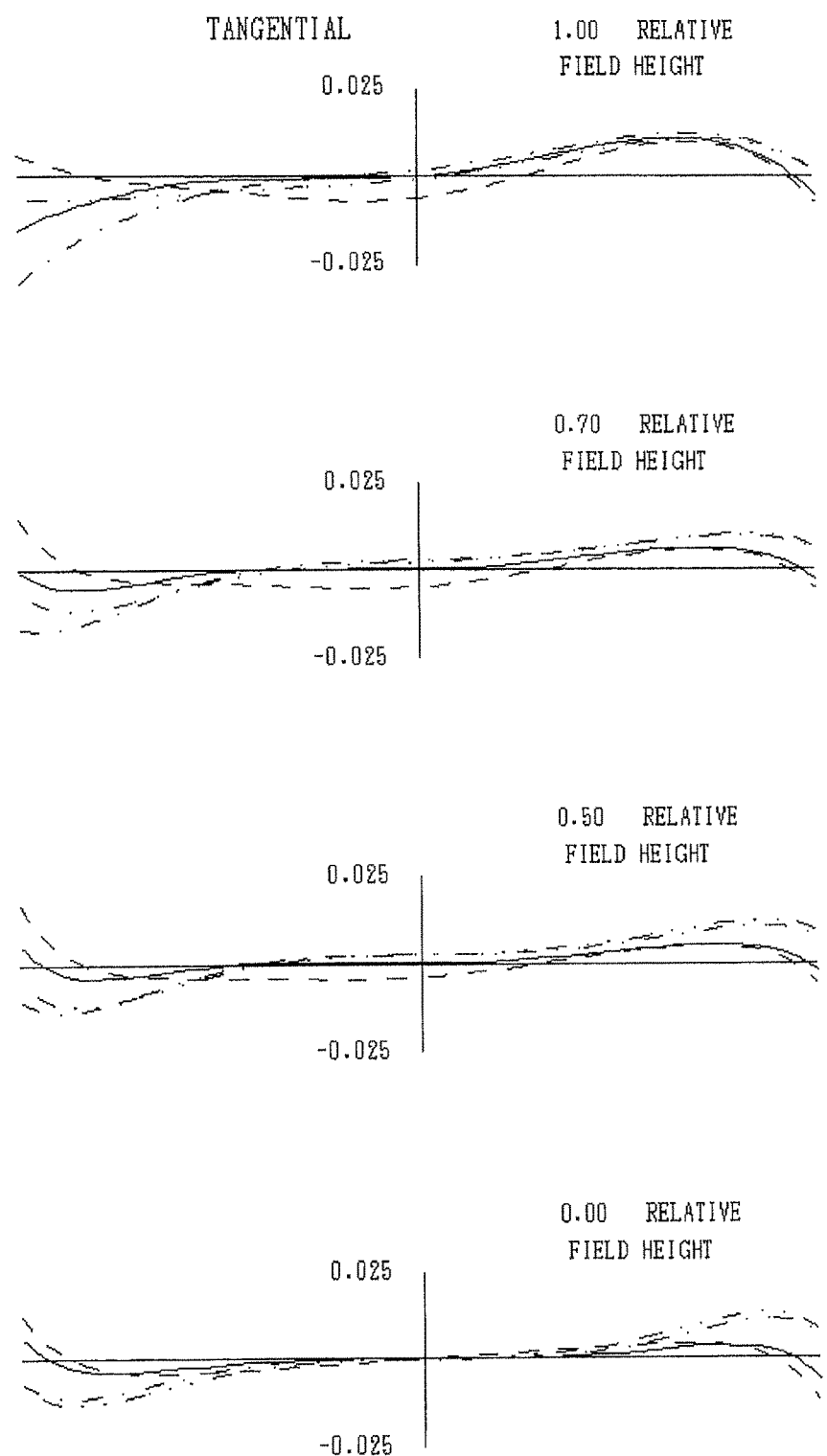
FIG. 17 is a figure showing comatic aberration of this inverted equal-magnification relay lens according to the fifth example.

FIG. 16 is a figure showing the spherical aberration, the astigmatism, and the distortion of this inverted equal-magnification relay lens 100 according to this fifth example. And FIG. 17 is a figure showing the comatic aberration of this inverted equal-magnification relay lens 100 according to the fifth example. As will be clear from the aberrations shown in FIGS. 16 and 17, with this inverted equal-magnification relay lens 100 according to the fifth example as well, all of the aberrations are corrected satisfactorily.

Yet further, with this inverted equal-magnification relay lens 100 according to the fifth example, when the temperature of the environment increases by +20° C., according to the values of the thermal expansion coefficient α and the relative refractive index temperature coefficient dn/dT shown in Table 5, actually the amount of fluctuation of the back focus position after the radius of curvature of each of the optical surfaces, the surface gaps between the optical surfaces, and the refractive indexes have changed is restricted within 0.10 mm, so that the lens is satisfactorily athermalized. Here, it is assumed that the air surface gaps between the optical surfaces are fixed by members made from aluminum (whose coefficient of thermal expansion at normal temperature is 234×10$^{-7}$/° C.).

Example #6

Figure 18:
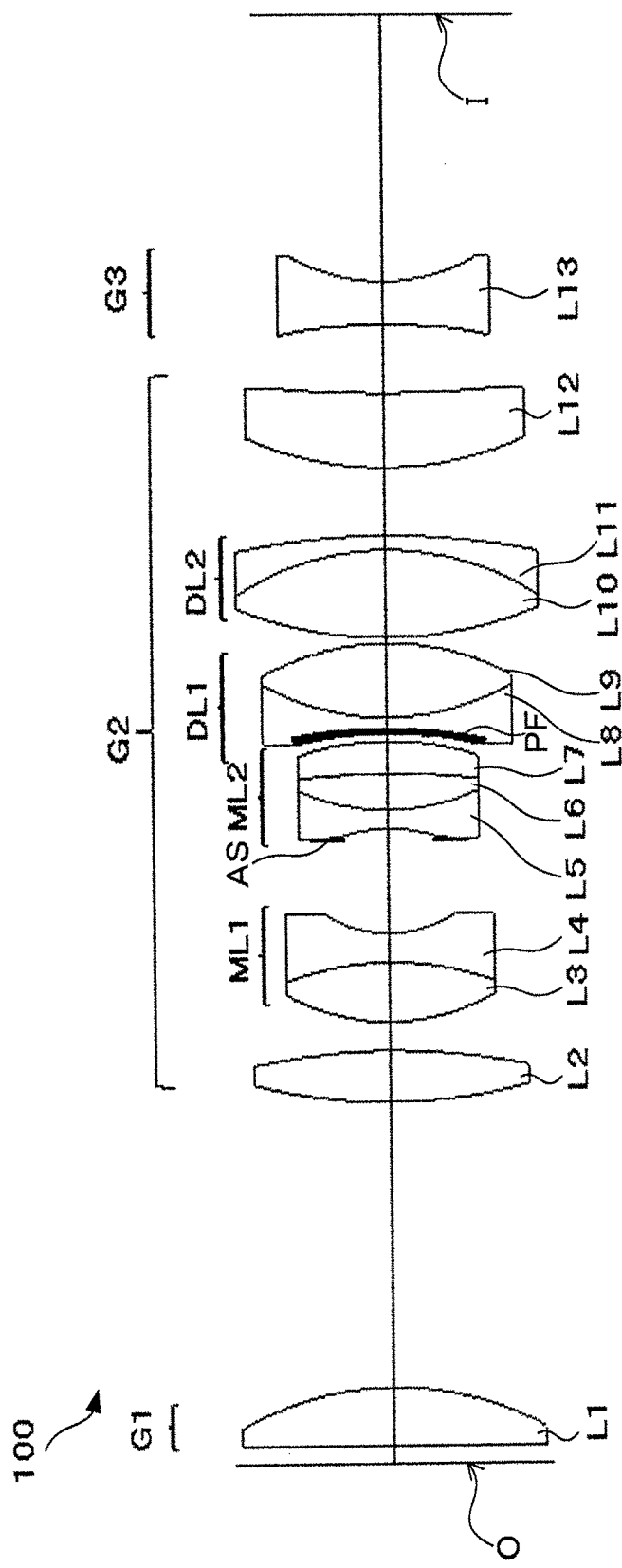
FIG. 18 is a figure for explanation of the structure of a inverted equal-magnification relay lens according to a sixth example.

Next, a sixth example will be explained. FIG. 18 is a figure for explanation of the structure of an inverted equal-magnification relay lens 100 according to this sixth example. This inverted equal-magnification relay lens 100 according to the sixth example also comprises, in order from the object side, a first lens group G1, a second lens group G2, and a third lens group G3.

The first lens group G1 has an overall positive power, and is disposed near the object side. This first lens group G1 comprises a positive lens L1.

The second lens group G2 is disposed with an appropriate distance separating it from the first lens group G1, and overall has a positive power. This second lens group G2 comprises, in order from the object side, a positive lens L2, a first cemented meniscus lens ML1, a second cemented meniscus lens ML2, a first doublet lens DL1, a second doublet lens DL2, and a positive lens L12. A close contact multi-layer type diffractive optical element PF that comprises two different resin members is provided on the object side concave surface of a negative lens L8 of the first doublet lens DL1.

The first cemented meniscus lens ML1 presents its concave surface toward the image side, and comprises a positive lens (a biconvex lens L3) and a negative lens (a biconcave lens L4). And the second cemented meniscus lens ML2 faces toward the first cemented meniscus lens ML1 with an aperture stop AS sandwiched between them and presents its concave surface toward the object side, and comprises a negative lens (a biconcave lens L5) and positive lenses (a biconvex lens L6 and a convex meniscus lens L7). Thus, in this sixth example, the second cemented meniscus lens ML2 is a three-layered cemented lens. Due to this, it is possible to reduce on-axis chromatic aberration of the secondary spectrum and the difference in comatic aberration due to differences in wavelength.

The first doublet lens DL1 is a cemented doublet lens in which a negative lens L8 and a positive lens L9 are bonded together. The close contact multi-layer type diffractive optical element PF is provided on the object side concave surface of the negative lens L8 of the first doublet lens DL1, and the positive lens L9 is adhered to the image side concave surface of the negative lens L8. And the second doublet lens DL2 is a cemented doublet lens in which a positive lens L10 and a negative lens L11 are bonded together. Thus, in this sixth example, two cemented doublet lenses are included in the second lens group G2.

Due to the chromatic aberration correction function of the close contact multi-layer type diffractive optical element PF which is provided on the object side concave surface of the negative lens L8 of the first doublet lens DL1, it is possible not to employ anomalous dispersion glass for the positive lens L10 of the second doublet lens DL2, and furthermore it is possible to reduce axial chromatic aberration of the secondary spectrum and/or fluctuations of the back focus position generated due to changes of the temperature of the environment.

The third lens group G3 comprises a biconcave lens L13, and has a negative power. The object side lens surface of this biconcave lens L13 is formed as an aspheric surface. By providing an aspheric optical surface to the third lens group G3 in this manner, contributions are made to correction of astigmatism and field curvature and so on, and it becomes possible to shorten the total length of the lens.

Moreover, in the inverted equal-magnification relay lens 100 according to this sixth example, the entrance pupil position is more toward the object surface O side than the first lens group G1, while the exit pupil position is more toward the third lens group G3 than the image surface I. The distance (ENT.P) at the maximum image height from the object surface to the entrance pupil plane is 76.72 mm, while the distance (EXT.P) from the exit pupil plane to the image surface is 80.95 mm. The focusing position surface number is the 4th surface (in other words, the focusing lens is the positive lens L2 of the second lens group G2), and the air gap from the lens behind it is 4.90 mm.

The following Table 6 gives data of various parameters for this inverted equal-magnification relay lens 100 according to the sixth example. It should be understood that, if the optical surface is an aspheric surface, two asterisks ** are appended to its surface number in Table 6, and the paraxial radius of curvature is given in the field for the radius of curvature r. The same is the case in the Tables for the seventh through the ninth examples explained below. It will be supposed that the shape of the diffractive optical surface is defined by Formula (b) of [Equation 4] of paragraph [0076] above. The entries under "Aspheric Surface Data" in the Table specify the aspheric surface coefficients when the shape of the aspheric surface given in "Lens Data" is described by this Formula (b).

TABLE 6

(Overall Specifications)
magnification β = −1.00
numerical aperture NA = 0.125
maximum image height Y = 21.6 mm (Lens Data)

| Surface number | r | d | nd | vd | α | dn/dT |
|---|---|---|---|---|---|---|
| object |  | 3.00 |  |  |  |  |
| 1 | ∞ | 10.00 | 1.81600 | 46.6 | 58 | 4.7 |
| 2 | −49.4429 | 49.13 |  |  |  |  |
| 3 | 85.0000 | 8.86 | 1.72916 | 54.6 | 56 | 4 |
| 4 | −101.6868 | 4.90 |  |  |  |  |
| 5 | 33.6683 | 10.23 | 1.51860 | 69.9 | 63 | 3.6 |
| 6 | −47.2902 | 5.08 | 1.67300 | 38.2 | 86 | 3.8 |
| 7 | 18.6598 | 16.73 |  |  |  |  |
| 8 | ∞ | 1.43 | aperture stop |  |  |  |
| 9 | −23.6781 | 3.26 | 1.67300 | 38.2 | 86 | 3.8 |
| 10 | 33.8780 | 6.28 | 1.80810 | 22.8 | 83 | −0.3 |
| 11 | −139.2670 | 5.57 | 1.64000 | 60.2 | 60 | 3.1 |
| 12 | −45.8490 | 1.30 |  |  |  |  |
| 13 | −60.9765 | 0.20 | 1.55710 | 50.0 | 1255 |  |
| 14* | −60.9765 | 0.20 | 1.52780 | 33.3 | 1255 |  |
| 15 | −60.9765 | 2.50 | 1.72047 | 34.7 | 81 | 3.5 |
| 16 | 39.8827 | 12.82 | 1.60300 | 65.4 | 89 | −2.5 |
| 17 | −40.9681 | 1.05 |  |  |  |  |
| 18 | 63.6951 | 15.05 | 1.72916 | 54.6 | 56 | 4 |
| 19 | −44.0406 | 2.50 | 1.73800 | 32.3 | 69 | 5.5 |
| 20 | −116.4938 | 11.67 |  |  |  |  |
| 21 | 53.9969 | 13.00 | 1.72916 | 54.6 | 56 | 4 |
| 22 | 198.5828 | 11.74 |  |  |  |  |
| 23** | −142.3128 | 7.59 | 1.58887 | 61.1 | 66 | 3.6 |
| 24 | 29.7521 | 45.86 |  |  |  |  |

(Diffractive Optical Surface Data)

Surface 14

$C_1 = -1.8243\text{E}-04$, $C_2 = 8.9235\text{E}-08$, $C_3 = -1.8511\text{E}-10$, $C_4 = 9.2372\text{E}-13$ (Aspheric Surface Data)

Surface 23

$\kappa = 9.0628$, $A_4 = -0.67441\text{E}-05$, $A_6 = 0.70992\text{E}-09$, $A_8 = -0.17502\text{E}-11$, $A_{10} = 0$ As will be understood from Table 6, the lens surface of the first lens group G1 that is closest toward the object side (i.e. its first surface) is a plane. Due to this, as described above, it is possible to keep the influence of minute defects such as particles of waste or the like to a minimum.

Moreover, with the inverted equal-magnification relay lens 100 according to this sixth example, the values related to Conditions (1) through (21) and (23) through (27) described above are as given below. Since, as shown below, the inverted equal-magnification relay lens 100 according to this sixth example satisfies Conditions (1) through (21) and (23) through (27), accordingly it is possible to obtain the advantageous effects described above.

|G1F/G2F|=1.06     Condition (1):

|G3F/G2F|=0.72     Condition (2):

|$E_{G1\text{-}G2}/E_{G2\text{-}G3}$|=3.2     Condition (3):

|$\alpha_{mid}/\alpha_{out}$|=0.045     Condition (4):

|Y/G3F|=0.52     Condition (5):

ENT.P/EXT.P=0.94     Condition (6):

WD=3.00 50·λ/NA²=1.88     Condition (7):

D/Y=2.12     Condition (8):

Condition (9):

$$Y \cdot \sum_{i=1}^{4}\left\{\frac{1}{R_i}\left(\frac{1}{n_i} - \frac{1}{n_{i-1}}\right)\right\} = 1.16 \quad \text{[Equation 11]}$$

$nd_{G1}$=1.81600 (positive lens L1 of first lens group G1)     Condition (10):

$vd_{G1}$=46.6 (positive lens L1 of first lens group G1)     Condition (11):

$vd_{G2TN}$=38.2 (biconcave lens L5 of second cemented meniscus lens ML2)     Condition (12):

Δθg, $F_{G2TN}$=−0.0044 (biconcave lens L5 of second
    cemented meniscus lens ML2)                     Condition (13):

ν$d_{G2TP1}$=22.8 (convex lens L6 sandwiched at center
    of second cemented meniscus lens ML2)           Condition (14):

Δθg, $F_{G2TP1}$=0.0261 (convex lens L6 sandwiched at
    center of second cemented meniscus lens
    ML2)                                            Condition (15):

ν$d_{G2TP2}$=60.2 (convex lens L7 at air surface side of
    second cemented meniscus lens ML2)              Condition (16):

Δθg, $F_{G2TP2}$=−0.0064 (convex lens L7 at air surface
    side of second cemented meniscus lens ML2)      Condition (17):

ν$d_{G2DN}$=34.7 (negative lens L8 of first doublet lens
    DL1)

ν$d_{G2DN}$=32.3: (negative lens L11 of second doublet
    lens DL2)                                       Condition (18):

Δθg, $F_{G2DN}$=−0.0017 (negative lens L8 of first doublet lens DL1)

Δθg, $F_{G2DN}$=0.0006 (negative lens L11 of second
    doublet lens DL2)                               Condition (19):

ν$d_{G2DP}$=65.4 (positive lens L9 of first doublet lens
    DL1)

ν$d_{G2DP}$=54.6 (positive lens L10 of second doublet
    lens DL2)                                       Condition (20):

Δθg, $F_{G2DP}$=0.0033 (positive lens L9 of first doublet
    lens DL1)

Δθg, $F_{G2DP}$=−0.0088 (positive lens L10 of second
    doublet lens DL2)                               Condition (21):

$|f_{DOE}/G2F|$=42.3                                Condition (23):

$P_{min}$=0.14                                      Condition (24):

$\Phi_{DOE}/\Phi_{MAX}$=0.61                        Condition (25):

Condition (26):

$$\left| \sum_{i=1}^{13} \left( \alpha_i - \frac{dn_i/dT}{n_i - 1} \right) \cdot \frac{h_i^2}{f_i} + 2\alpha_{DOE} \cdot \frac{h_{DOE}^2}{f_{DOE}} \right| = 3.4 \times 10^{-7}$$  [Equation 12]

Y/TL=0.086                                          Condition (27):

Yet further since, in this sixth example, the maximum angle of the light beam that is incident upon the diffractive optical surface (i.e. the fourteenth surface) with respect to the normal to base radius of curvature is 8.6°, and is well within 25°, accordingly almost no influence from flare is experienced, and it is possible to obtain a satisfactory image.

Figure 19:
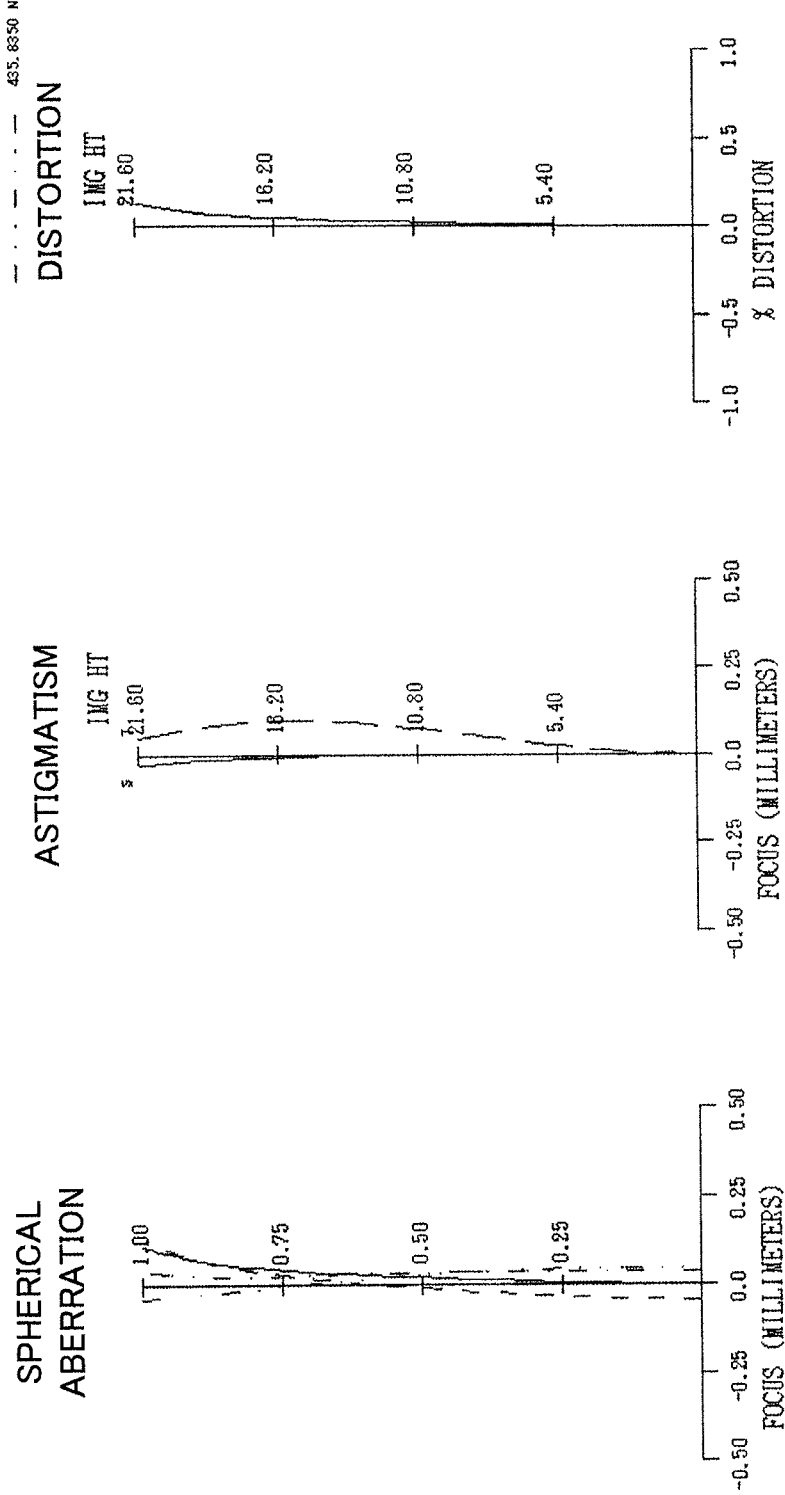
FIG. 19 is a figure showing spherical aberration, astigmatism, and distortion of this inverted equal-magnification relay lens according to the sixth example.
Figure 20:
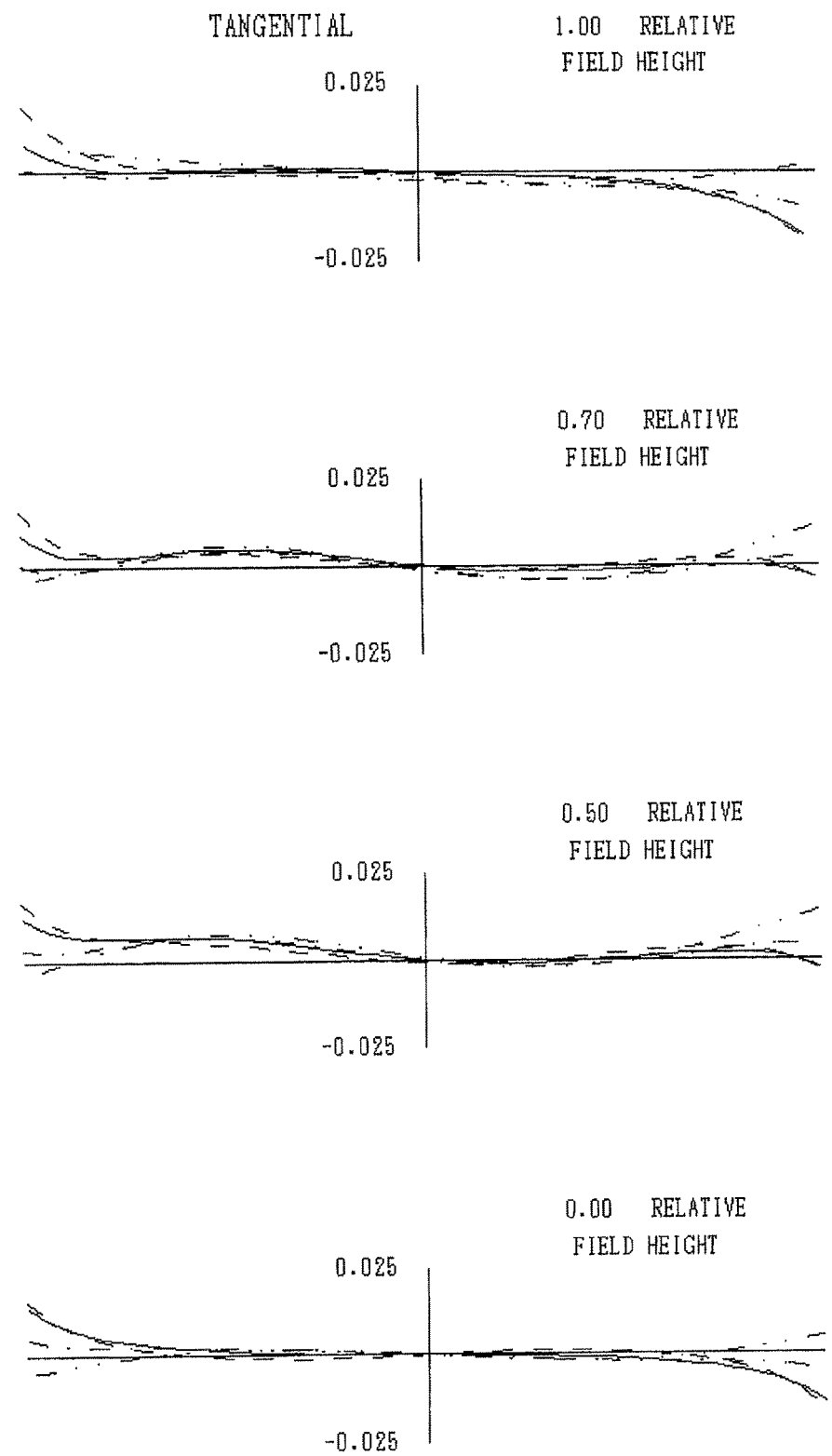
FIG. 20 is a figure showing comatic aberration of this inverted equal-magnification relay lens according to the sixth embodiment.

FIG. 19 is a figure showing the spherical aberration, the astigmatism, and the distortion of this inverted equal-magnification relay lens 100 according to this sixth example. And FIG. 20 is a figure showing the comatic aberration of this inverted equal-magnification relay lens 100 according to the sixth example. As will be clear from the aberrations shown in FIGS. 19 and 20, with this inverted equal-magnification relay lens 100 according to the sixth example as well, all of the aberrations are corrected satisfactorily.

Yet further, with this inverted equal-magnification relay lens 100 according to the sixth example, when the temperature of the environment increases by +20° C., according to the values of the thermal expansion coefficient α and the relative refractive index temperature coefficient dn/dT shown in Table 6, actually the amount of fluctuation of the back focus position after the radius of curvature of each of the optical surfaces, the surface gaps between the optical surfaces, and the refractive indexes have changed is restricted within 0.01 mm, so that the lens is satisfactorily athermalized. Here, it is assumed that the air surface gaps between the optical surfaces are fixed by members made from aluminum (whose coefficient of thermal expansion at normal temperature is $234 \times 10^{-7}$/° C.).

Example #7

Next, a seventh example will be explained. FIG. 21 is a figure for explanation of the structure of an inverted equal-magnification relay lens 100 according to this seventh example. This inverted equal-magnification relay lens 100 according to the seventh example also comprises, in order from the object side, a first lens group G1, a second lens group G2, and a third lens group G3.

The first lens group G1 has an overall positive power, and is disposed near the object. This first lens group G1 comprises a positive lens L1.

The second lens group G2 is disposed with an appropriate distance separating it from the first lens group G1, and overall has a positive power. This second lens group G2 comprises, in order from the object side, a positive lens L2, a cemented meniscus lens ML, a concave meniscus lens L5 (i.e. a single concave meniscus lens), a convex meniscus lens L6, a first doublet lens DL1, a positive lens L9, and a second doublet lens DL2. A close contact multi-layer type diffractive optical element PF that comprises two different resin members is provided on the object side concave surface of the convex meniscus lens L6.

The cemented meniscus lens ML presents its concave surface toward the image side, and comprises a positive lens (a biconvex lens L3) and a negative lens (a biconcave lens L4). The concave meniscus lens L5 opposes the cemented meniscus lens ML with an aperture stop AS being sandwiched between them, and presents its concave surface toward the object side. Thus, in this seventh example, field curvature correction is also performed by these concave surface structures that mutually oppose one another with the aperture stop AS being sandwiched between them.

The first doublet lens DL1 is a cemented doublet lens in which a positive lens L7 and a negative lens L8 are bonded together. And the second doublet lens DL2 is a cemented doublet lens in which a positive lens L10 and a negative lens L11 are bonded together. Thus, in this seventh example, two cemented doublet lenses are included in the second lens group G2, and it is possible to reduce on-axis chromatic aberration of the secondary spectrum and/or the differences in spherical aberration and/or comatic aberration due to differences in wavelength.

Furthermore, due to the chromatic aberration correction function of the close contact multi-layer type diffractive optical element PF which is provided on the object side concave surface of the convex meniscus lens L6, it is possible not to employ anomalous dispersion glass for the positive lens L10 of the second doublet lens DL2, and moreover it is possible to reduce axial chromatic aberration of the secondary spectrum and/or fluctuations of the back focus position generated due to changes of the temperature of the environment.

The third lens group G3 comprises a biconcave lens L12, and has a negative power. The image surface side lens surface of this biconcave lens L12 is formed as an aspheric surface. By providing an aspheric optical surface to the third lens group G3 in this manner, contributions are made to correction of astigmatism and field curvature and so on, and it becomes possible to shorten the total length of the lens.

Moreover, in the inverted equal-magnification relay lens 100 according to this seventh example, the entrance pupil position is more toward the object surface O side than the first lens group G1, while the exit pupil position is more toward the third lens group G3 side than the image surface I. The distance (ENT.P) from the object surface to the entrance pupil plane at the maximum image height is 76.70 mm, while the distance (EXT.P) from the exit pupil plane to the image surface is 80.20 mm.

The following Table 7 gives data of various parameters for this inverted equal-magnification relay lens 100 according to the seventh example.

TABLE 7

(Overall Specifications)
magnification β = −1.00
numerical aperture NA = 0.125
maximum image height Y = 21.6 mm (Lens Data)

| Surface number | r | d | nd | νd | α | dn/dT |
|---|---|---|---|---|---|---|
| object |  | 3.00 |  |  |  |  |
| 1 | ∞ | 10.00 | 1.81600 | 46.6 | 58 | 4.7 |
| 2 | −48.7189 | 45.60 |  |  |  |  |
| 3 | 105.0000 | 7.89 | 1.72916 | 54.6 | 56 | 4 |
| 4 | −122.8590 | 2.12 |  |  |  |  |
| 5 | 37.1550 | 11.09 | 1.64000 | 60.2 | 60 | 3.1 |
| 6 | −55.3180 | 2.78 | 1.67300 | 38.2 | 86 | 3.8 |
| 7 | 21.5439 | 23.20 |  |  |  |  |
| 8 | ∞ | 1.74 | aperture stop |  |  |  |
| 9 | −22.7635 | 14.54 | 1.81600 | 46.6 | 63 | 5.2 |
| 10 | −145.3290 | 1.30 |  |  |  |  |
| 11 | −135.0000 | 0.20 | 1.55710 | 50.0 | 1255 |  |
| 12* | −135.0000 | 0.20 | 1.52780 | 33.3 | 1255 |  |
| 13 | −135.0000 | 10.07 | 1.72916 | 54.6 | 56 | 4 |
| 14 | −38.0027 | 1.00 |  |  |  |  |
| 15 | 93.4537 | 12.52 | 1.61800 | 63.3 | 101 | −3.6 |
| 16 | −54.8103 | 5.00 | 1.72047 | 34.7 | 81 | 3.5 |
| 17 | −80.4643 | 1.50 |  |  |  |  |
| 18 | 97.2290 | 10.00 | 1.64000 | 60.2 | 60 | 3.1 |
| 19 | 605.8429 | 1.50 |  |  |  |  |
| 20 | 45.2653 | 13.91 | 1.64000 | 60.2 | 60 | 3.1 |
| 21 | −57.0942 | 15.31 | 1.67300 | 38.2 | 86 | 3.8 |
| 22 | 28.6333 | 6.00 |  |  |  |  |
| 23 | −128.4630 | 4.00 | 1.58887 | 61.1 | 66 | 3.6 |
| 24** | 160.3186 | 45.08 |  |  |  |  |

(Diffractive Optical Surface Data)

Surface 12

$C_1 = -1.9355E-04$, $C_2 = 1.4371E-07$, $C_3 = -4.4294E-11$, $C_4 = 6.1353E-13$ (Aspheric Surface Data)

Surface 24

$\kappa = 8.1666$, $A_4 = 0.92874E-05$, $A_6 = 0.75646E-08$, $A_8 = 0.11554E-10$, $A_{10} = 0$ As will be understood from Table 7, the lens surface of the first lens group G1 that is closest toward the object side (i.e. its first surface) is a plane. Due to this, as described above, it is possible to keep the influence of minute defects such as particles of waste or the like to a minimum.

Moreover, with the inverted equal-magnification relay lens 100 according to this seventh example, the values related to Conditions (1) through (3), (5) through (11), (18) through (21), and (23) through (27) described above are as given below. Since, as shown below, the inverted equal-magnification relay lens 100 according to this seventh example satisfies Conditions (1) through (3), (5) through (11), (18) through (21), and (23) through (27), accordingly it is possible to obtain the advantageous effects described above.

|G1F/G2F|=1.11                    Condition (1):

|G3F/G2F|=2.24                    Condition (2):

|$E_{G1-G2}/E_{G2-G3}$|=2.4             Condition (3):

|Y/G3F|=0.18                      Condition (5):

ENT.P/EXT.P=0.96                 Condition (6):

WD=3.00 50·λ/NA²=1.88            Condition (7):

D/Y=2.09                         Condition (8):

Condition (9):

$$Y \cdot \sum_{i=1}^{4} \left\{ \frac{1}{R_i}\left(\frac{1}{n_i} - \frac{1}{n_{i-1}}\right) \right\} = 0.94$$ [Equation 13]

$n_{dG1}$=1.81600 (positive lens L1 of first lens group G1)              Condition (10):

$\nu_{dG1}$=46.6 (positive lens L1 of first lens group G1)   Condition (11):

$\nu d_{G2DN}$=34.7 (negative lens L8 of first doublet lens DL1)

$\nu d_{G2DN}$=38.2 (negative lens L11 of second doublet lens DL2)       Condition (18):

$\Delta\theta g, F_{G2DN}$=−0.0017 (negative lens L8 of first doublet lens DL1)

$\Delta\theta g, F_{G2DN}$=−0.0044 (negative lens L11 of second doublet lens DL2)        Condition (19):

$\nu d_{G2DP}$=63.3 (positive lens L7 of first doublet lens DL1)

$\nu d_{G2DP}$=60.2 (positive lens L10 of second doublet lens DL2)       Condition (20):

$\Delta\theta g, F_{G2DP}$=0.0051 (positive lens L7 of first doublet lens DL1)

$\Delta\theta g, F_{G2DP}$=−0.0064 (positive lens L10 of second doublet lens DL2)        Condition (21):

|$f_{DOE}$/G2F|=44.1               Condition (23):

$P_{min}$=0.15                     Condition (24):

$\Phi_{DOE}/\Phi_{MAX}$=0.65             Condition (25):

Condition (26):

$$\left| \sum_{i=1}^{12} \left( \alpha_i - \frac{dn_i/dT}{n_i - 1} \right) \cdot \frac{h_i^2}{f_i} + 2\alpha_{DOE} \cdot \frac{h_{DOE}^2}{f_{DOE}} \right| = 3.0 \times 10^{-7}$$ [Equation 14]

Y/TL=0.087          Condition (27):

Yet further since, in this seventh example, the maximum angle of the light beam that is incident upon the diffractive optical surface (i.e. the twelfth surface) with respect to the normal to base radius of curvature is 19.2°, and is thus within 25°, accordingly almost no influence from flare is experienced, and it is possible to obtain a satisfactory image.

Figure 22:
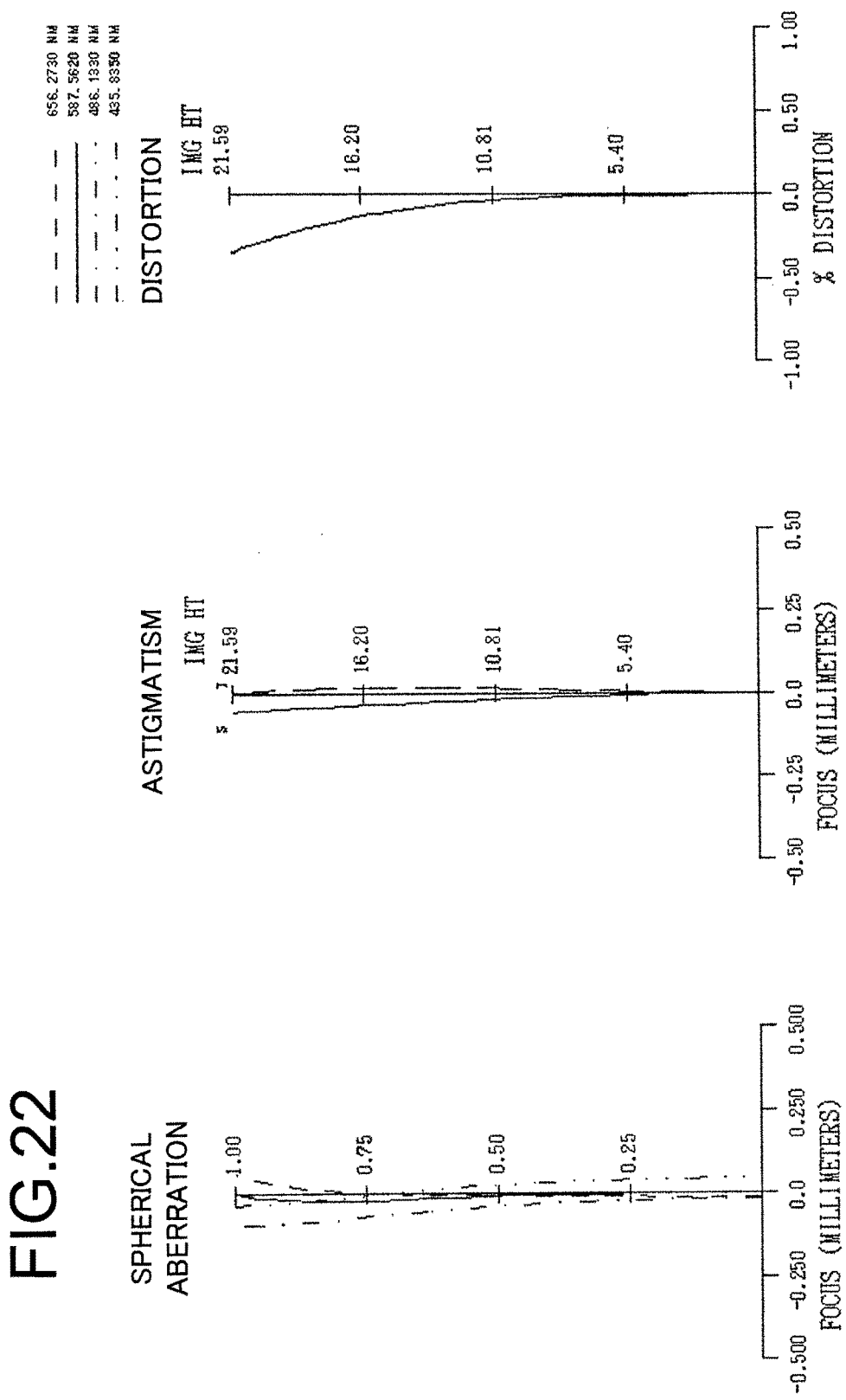
FIG. 22 is a figure showing spherical aberration, astigmatism, and distortion of this inverted equal-magnification relay lens according to the seventh embodiment.

FIG. 22 is a figure showing the spherical aberration, the astigmatism, and the distortion of this inverted equal-magnification relay lens 100 according to this seventh example. And FIG. 23 is a figure showing the comatic aberration of this inverted equal-magnification relay lens 100 according to the seventh example. As will be clear from the aberrations shown in FIGS. 22 and 23, with this inverted equal-magnification relay lens 100 according to the seventh example as well, all of the aberrations are corrected satisfactorily.

Yet further, with this inverted equal-magnification relay lens 100 according to the seventh example, when the temperature of the environment increases by +20° C., according to the values of the thermal expansion coefficient α and the relative refractive index temperature coefficient dn/dT shown in Table 7, actually the amount of fluctuation of the back focus position after the radius of curvature of each of the optical surfaces, the surface gaps between the optical surfaces, and the refractive indexes have changed is restricted within 0.02 mm, so that the lens is satisfactorily athermalized. Here, it is assumed that the air surface gaps between the optical surfaces are fixed by members made from aluminum (whose coefficient of thermal expansion at normal temperature is 234×10⁻⁷/° C.).

Example #8

Figure 24:
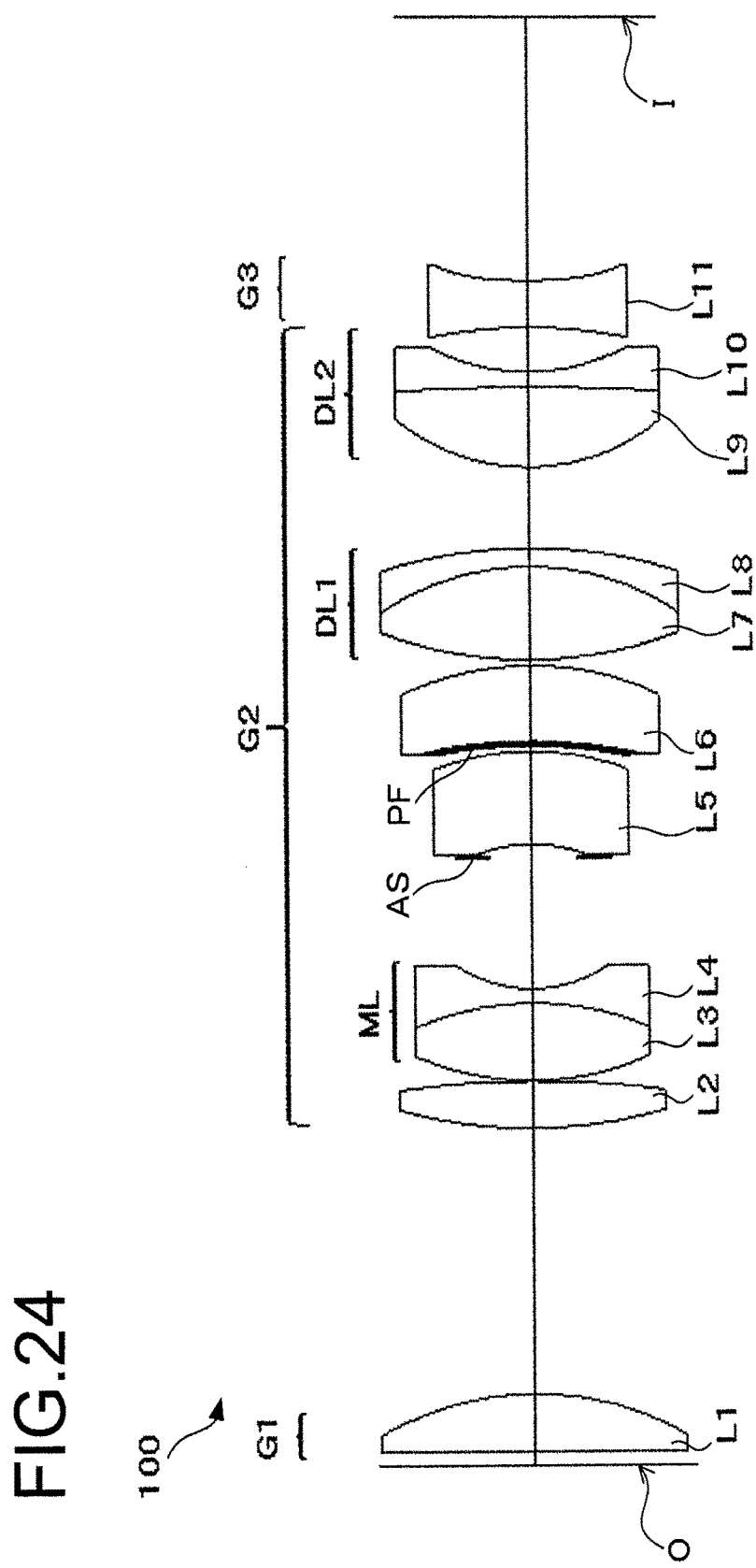
FIG. 24 is a figure for explanation of the structure of a inverted equal-magnification relay lens according to an eighth example.

Next, an eighth example will be explained. FIG. 24 is a figure for explanation of the structure of an inverted equal-magnification relay lens 100 according to this eighth example. This inverted equal-magnification relay lens 100 according to the eighth example also comprises, in order from the object side, a first lens group G1, a second lens group G2, and a third lens group G3.

The first lens group G1 has an overall positive power, and is disposed near the object side. This first lens group G1 comprises a positive lens L1.

The second lens group G2 is disposed with an appropriate distance separating it from the first lens group G1, and overall has a positive power. This second lens group G2 comprises, in order from the object side, a positive lens L2, a cemented meniscus lens ML, a concave meniscus lens L5 (i.e. a single concave meniscus lens), a convex meniscus lens L6, a first doublet lens DL1, and a second doublet lens DL2. A close contact multi-layer type diffractive optical element PF that comprises two different resin members is provided on the object side concave surface of the convex meniscus lens L6.

The cemented meniscus lens ML presents its concave surface toward the image side, and comprises a positive lens (a biconvex lens L3) and a negative lens (a biconcave lens L4). The concave meniscus lens L5 opposes the cemented meniscus lens ML with an aperture stop AS being sandwiched between them, and presents its concave surface toward the object side. Thus, in this eighth example, field curvature correction is also performed by these concave surface structures that mutually oppose one another with the aperture stop AS being sandwiched between them.

The first doublet lens DL1 is a cemented doublet lens in which a positive lens L7 and a negative lens L8 are bonded together. And the second doublet lens DL2 is a cemented doublet lens in which a positive lens L9 and a negative lens L10 are bonded together. Thus, in this eighth example, two cemented doublet lenses are included in the second lens group G2, and it is possible to reduce on-axis chromatic aberration of the secondary spectrum and/or the differences in spherical aberration and/or comatic aberration due to differences in wavelength.

Furthermore, due to the chromatic aberration correction function of the close contact multi-layer type diffractive optical element PF which is provided on the object side concave surface of the convex meniscus lens L6, it is possible not to employ anomalous dispersion glass for the positive lens L9 of the second doublet lens DL2, and moreover it is possible to reduce axial chromatic aberration of the secondary spectrum and/or fluctuations of the back focus position generated due to changes of the temperature of the environment.

The third lens group G3 comprises a biconcave lens L11, and has a negative power. The image surface side lens surface of this biconcave lens L11 is formed as an aspheric surface. By providing an aspheric optical surface to the third lens group G3 in this manner, contributions are made to correction of astigmatism and field curvature and so on, and it becomes possible to shorten the total length of the lens.

Moreover, in the inverted equal-magnification relay lens 100 according to this eighth example, the entrance pupil position is more toward the object surface O side than the first lens group G1, while the exit pupil position is more toward the third lens group G3 side than the image surface I. The distance (ENT.P) from the object surface to the entrance pupil plane at the maximum image height is 76.69 mm, while the distance (EXT.P) from the exit pupil plane to the image surface is 80.39 mm.

The following Table 8 gives data of various parameters for this inverted equal-magnification relay lens 100 according to the eighth example.

TABLE 8

(Overall Specifications)
magnification β = −1.00
numerical aperture NA = 0.125
maximum image height Y = 21.6 mm (Lens Data)

| Surface number | r | d | nd | vd | α | dn/dT |
|---|---|---|---|---|---|---|
| object |  | 3.00 |  |  |  |  |
| 1 | ∞ | 10.00 | 1.81600 | 46.6 | 58 | 4.7 |
| 2 | −48.1921 | 45.60 |  |  |  |  |
| 3 | 77.2336 | 8.10 | 1.72916 | 54.6 | 56 | 4 |
| 4 | −156.4150 | 0.10 |  |  |  |  |
| 5 | 45.9392 | 13.27 | 1.64000 | 60.2 | 60 | 3.1 |
| 6 | −45.9392 | 2.50 | 1.67300 | 38.2 | 86 | 3.8 |
| 7 | 21.2128 | 23.33 |  |  |  |  |
| 8 | ∞ | 1.68 | aperture stop |  |  |  |
| 9 | −22.4647 | 16.00 | 1.81600 | 46.6 | 63 | 5.2 |
| 10 | −42.4184 | 1.30 |  |  |  |  |
| 11 | −77.2352 | 0.20 | 1.55710 | 50.0 | 1255 |  |

TABLE 8-continued (Overall Specifications)
magnification β = −1.00
numerical aperture NA = 0.125
maximum image height Y = 21.6 mm

| 12* | −77.2352 | 0.20 | 1.52780 | 33.3 | 1255 | |
|---|---|---|---|---|---|---|
| 13 | −77.2352 | 13.20 | 1.72916 | 54.6 | 56 | 4 |
| 14 | −47.1891 | 1.00 | | | | |
| 15 | 66.6581 | 16.00 | 1.60300 | 65.4 | 89 | −2.5 |
| 16 | −42.1781 | 3.25 | 1.73800 | 32.3 | 69 | 5.5 |
| 17 | −76.3498 | 13.98 | | | | |
| 18 | 33.0183 | 13.80 | 1.64000 | 60.2 | 60 | 3.1 |
| 19 | −333.1071 | 2.63 | 1.67300 | 38.2 | 86 | 3.8 |
| 20 | 33.1796 | 7.62 | | | | |
| 21 | −77.1458 | 8.00 | 1.58887 | 61.1 | 66 | 3.6 |
| 22** | 70.2335 | 45.27 | | | | |

(Diffractive Optical Surface Data)

Surface 12

$C_1 = -2.2128\text{E}-04$, $C_2 = 1.14661\text{E}-07$, $C_3 = 5.7751\text{E}-11$, $C_4 = 6.1990\text{E}-13$ (Aspheric Surface Data)

Surface 22

$\kappa = 8.6066$, $A_4 = 0.10746\text{E}-04$, $A_6 = 0.68151\text{E}-08$, $A_8 = 0.26303\text{E}-12$, $A_{10} = 0$ As will be understood from Table 8, the lens surface of the first lens group G1 that is closest toward the object side (i.e. its first surface) is a plane. Due to this, as described above, it is possible to keep the influence of minute defects such as particles of waste or the like to a minimum.

Moreover, with the inverted equal-magnification relay lens 100 according to this eighth example, the values related to Conditions (1) through (3), (5) through (11), (18) through (21), and (23) through (27) described above are as given below. Since, as shown below, the inverted equal-magnification relay lens 100 according to this eighth example satisfies Conditions (1) through (3), (5) through (11), (18) through (21), and (23) through (27), accordingly it is possible to obtain the advantageous effects described above.

|G1F/G2F|=1.13    Condition (1):

|G3F/G2F|=1.17    Condition (2):

|E$_{G1-G2}$/E$_{G2-G3}$|=3.0    Condition (3):

|Y/G3F|=0.35    Condition (5):

ENT.P/EXT.P=0.95    Condition (6):

WD=3.00  50·λ/NA²=1.88    Condition (7):

D/Y=2.09    Condition (8):

Condition (9):

$$Y \cdot \sum_{i=1}^{4} \left\{ \frac{1}{R_i} \left( \frac{1}{n_i} - \frac{1}{n_{i-1}} \right) \right\} = 1.06 \quad \text{[Equation 15]}$$

$n_{dG1}$=1.81600 (positive lens L1 of first lens group G1)    Condition (10):

$\nu_{dG1}$=46.6 (positive lens L1 of first lens group G1)    Condition (11):

$\nu d_{G2DN}$=32.3 (negative lens L8 of first doublet lens DL1)

$\nu d_{G2DN}$=38.2 (negative lens L10 of second doublet lens DL2)    Condition (18):

$\Delta\theta g$, $F_{G2DN}$=0.0006 (negative lens L8 of first doublet lens DL1)

$\Delta\theta g$, $F_{G2DN}$=−0.0044 (negative lens L10 of second doublet lens DL2)    Condition (19):

$\nu d_{G2DP}$=65.4 (positive lens L7 of first doublet lens DL1)

$\nu d_{G2DP}$=60.2 (positive lens L9 of second doublet lens DL2)    Condition (20):

$\Delta\theta g$, $F_{G2DP}$=0.0033 (positive lens L7 of first doublet lens DL1)

$\Delta\theta g$, $F_{G2DP}$=−0.0064 (positive lens L9 of second doublet lens DL2)    Condition (21):

|$f_{DOE}$/G2F|=39.2    Condition (23):

$P_{min}$=0.13    Condition (24):

$\Phi_{DOE}/\Phi_{MAX}$=0.68    Condition (25):

Condition (26)

$$\left| \sum_{i=1}^{11} \left( \alpha_i - \frac{dn_i/dT}{n_i - 1} \right) \cdot \frac{h_i^2}{f_i} + 2\alpha_{DOE} \cdot \frac{h_{DOE}^2}{f_{DOE}} \right| = 3.4 \times 10^{-7} \quad \text{[Equation 16]}$$

Y/TL=0.086    Condition (27):

Yet further since, in this eighth example, the maximum angle of the light beam that is incident upon the diffractive optical surface (i.e. the twelfth surface) with respect to the normal to base radius of curvature is 8.5°, and is thus within 25°, accordingly almost no influence from flare is experienced, and it is possible to obtain a satisfactory image.

Figure 25:
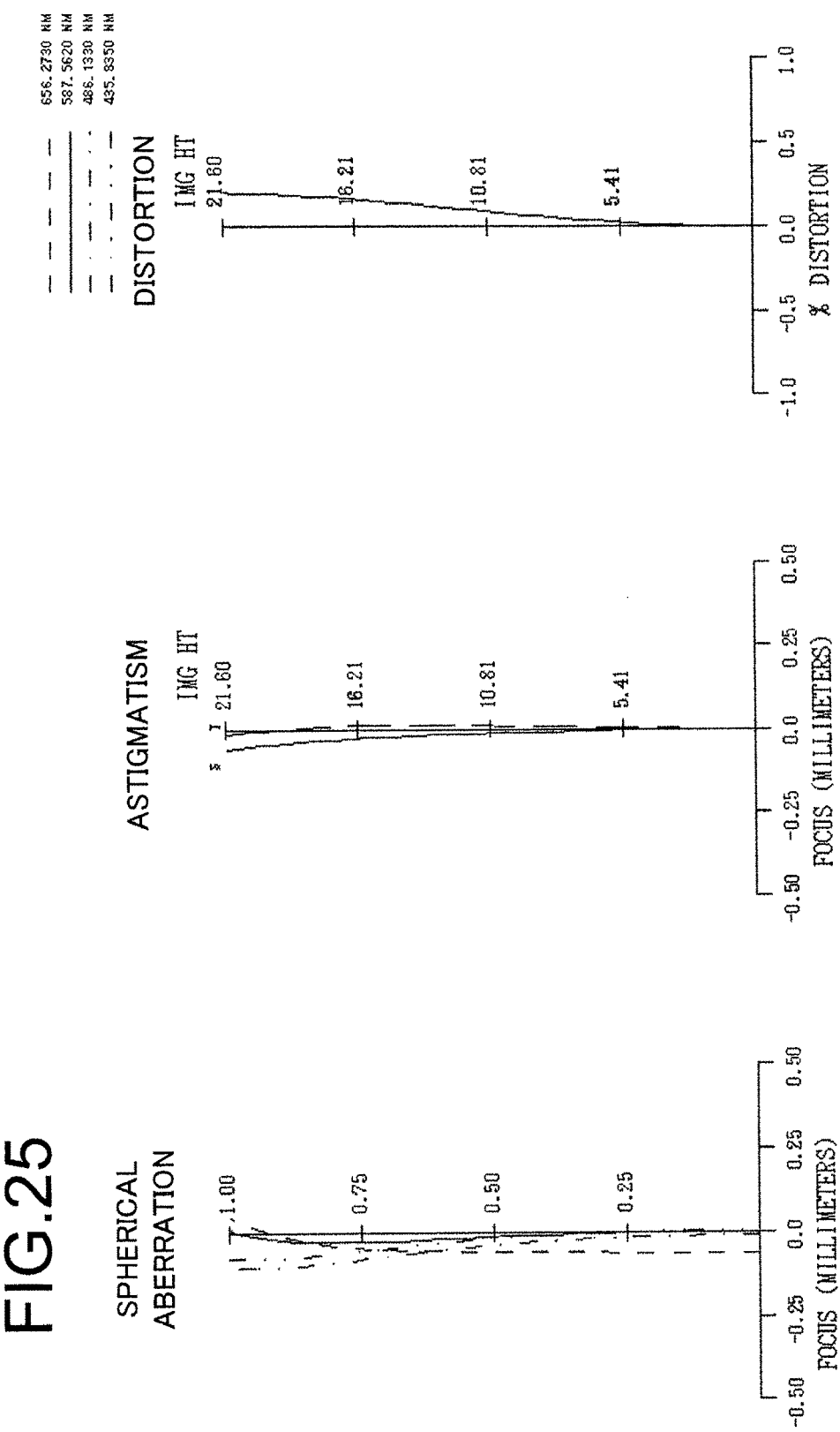
FIG. 25 is a figure showing spherical aberration, astigmatism, and distortion of this inverted equal-magnification relay lens according to the eighth example.

FIG. 25 is a figure showing the spherical aberration, the astigmatism, and the distortion of this inverted equal-magnification relay lens 100 according to this eighth example. And FIG. 26 is a figure showing the comatic aberration of this inverted equal-magnification relay lens 100 according to the eighth example. As will be clear from the aberrations shown in FIGS. 25 and 26, with this inverted equal-magnification relay lens 100 according to the eighth example as well, all of the aberrations are corrected satisfactorily.

Yet further, with this inverted equal-magnification relay lens 100 according to the eighth example, when the temperature of the environment increases by +20° C., according to the values of the thermal expansion coefficient α and the relative refractive index temperature coefficient dn/dT shown in Table 8, actually the amount of fluctuation of the back focus position after the radius of curvature of each of the optical surfaces, the surface gaps between the optical surfaces, and the refractive indexes have changed is restricted within 0.04 mm, so that the lens is satisfactorily athermalized. Here, it is assumed that the air surface gaps between the optical surfaces are fixed by members made from aluminum (whose coefficient of thermal expansion at normal temperature is 234×10⁻⁷/° C.).

Example #9

Figure 27:
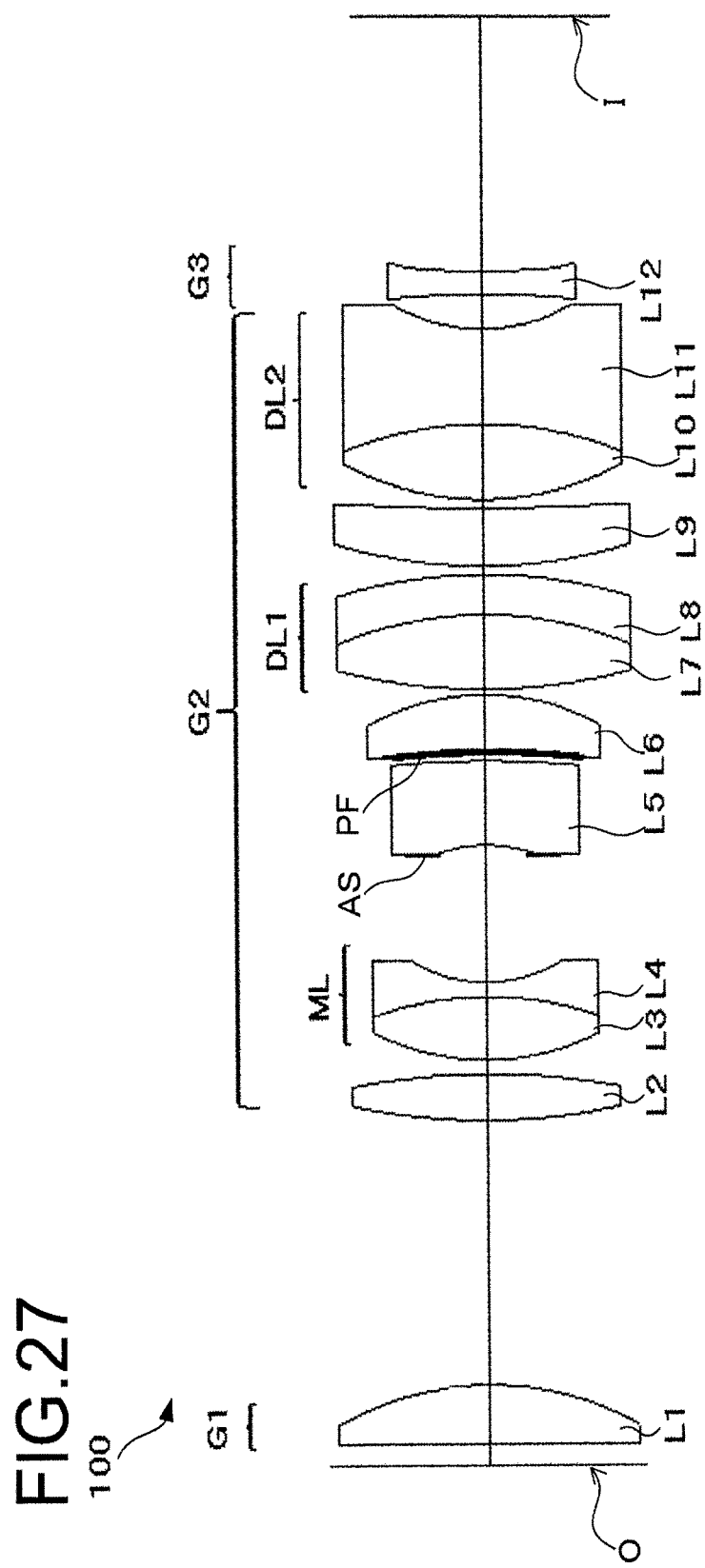
FIG. 27 is a figure for explanation of the structure of a inverted equal-magnification relay lens according to a ninth example.

Next, a ninth example will be explained. FIG. 27 is a figure for explanation of the structure of an inverted equal-magnification relay lens 100 according to this ninth example. This inverted equal-magnification relay lens 100 according to the ninth example also comprises, in order from the object side, a first lens group G1, a second lens group G2, and a third lens group G3.

The first lens group G1 has an overall positive power, and is disposed near the object. This first lens group G1 comprises a positive lens L1.

The second lens group G2 is disposed with an appropriate distance separating it from the first lens group G1, and overall has a positive power. This second lens group G2 comprises, in order from the object side, a positive lens L2, a cemented meniscus lens ML, a concave meniscus lens L5 (i.e. a single concave meniscus lens), a convex meniscus lens L6, a first doublet lens DL1, a positive lens L9, and a second doublet lens DL2. A close contact multi-layer type diffractive optical element PF that comprises two different resin members is provided on the object side concave surface of the convex meniscus lens L6.

The cemented meniscus lens ML presents its concave surface toward the image side, and comprises a positive lens (a biconvex lens L3) and a negative lens (a biconcave lens L4). The concave meniscus lens L5 opposes the cemented meniscus lens ML with an aperture stop AS being sandwiched between them, and presents its concave surface toward the object side. Thus, in this ninth example, field curvature correction is also performed by these concave surface structures that mutually oppose one another with the aperture stop AS being sandwiched between them.

The first doublet lens DL1 is a cemented doublet lens in which a positive lens L7 and a negative lens L8 are bonded together. And the second doublet lens DL2 is a cemented doublet lens in which a positive lens L10 and a negative lens L11 are bonded together. Thus, in this ninth example, two cemented doublet lenses are included in the second lens group G2, and it is possible to reduce on-axis chromatic aberration of the secondary spectrum and/or the differences in spherical aberration and comatic aberration due to differences in wavelength.

Furthermore, due to the chromatic aberration correction function of the close contact multi-layer type diffractive optical element PF which is provided on the object side concave surface of the convex meniscus lens L6, it is possible not to employ anomalous dispersion glass for the positive lens L10 of the second doublet lens DL2, and moreover it is possible to reduce axial chromatic aberration of the secondary spectrum and/or fluctuations of the back focus position generated due to changes of the temperature of the environment.

The third lens group G3 comprises a biconcave lens L12, and has a negative power. The image surface side lens surface of this biconcave lens L12 is formed as an aspheric surface. By providing an aspheric optical surface to the third lens group G3 in this manner, contributions are made to correction of astigmatism and field curvature and so on, and it becomes possible to shorten the total length of the lens.

Moreover, in the inverted equal-magnification relay lens 100 according to this ninth example, the entrance pupil position is more toward the object surface O side than the first lens group G1, while the exit pupil position is more toward the third lens group G3 side than the image surface I. The distance (ENT.P) from the object surface to the entrance pupil plane at the maximum image height is 76.71 mm, while the distance (EXT.P) from the exit pupil plane to the image surface is 79.27 mm.

The following Table 9 gives data of various parameters for this inverted equal-magnification relay lens 100 according to the ninth example.

TABLE 9

(Overall Specifications)
magnification β = −1.00
numerical aperture NA = 0.125
maximum image height Y = 21.6 mm (Lens Data)

| Surface number | r | d | nd | vd | α | dn/dT |
|---|---|---|---|---|---|---|
| object |  | 3.00 |  |  |  |  |
| 1 | ∞ | 10.00 | 1.81600 | 46.6 | 58 | 4.7 |
| 2 | −48.7189 | 45.60 |  |  |  |  |
| 3 | 102.5575 | 7.97 | 1.72916 | 54.6 | 56 | 4 |
| 4 | −114.9770 | 2.44 |  |  |  |  |
| 5 | 39.1503 | 10.89 | 1.64000 | 60.2 | 60 | 3.1 |
| 6 | −52.5674 | 2.50 | 1.67300 | 38.2 | 86 | 3.8 |
| 7 | 22.2575 | 22.37 |  |  |  |  |
| 8 | ∞ | 1.49 | aperture stop |  |  |  |
| 9 | −22.3088 | 14.68 | 1.81600 | 46.6 | 63 | 5.2 |
| 10 | −149.7170 | 1.30 |  |  |  |  |
| 11 | −135.0000 | 0.20 | 1.55710 | 50.0 | 1255 |  |
| 12* | −135.0000 | 0.20 | 1.52780 | 33.3 | 1255 |  |
| 13 | −135.0000 | 9.73 | 1.72916 | 54.6 | 56 | 4 |
| 14 | −37.4383 | 1.00 |  |  |  |  |
| 15 | 92.1296 | 13.00 | 1.60300 | 65.4 | 89 | −2.5 |
| 16 | −60.2582 | 7.00 | 1.72047 | 34.7 | 81 | 3.5 |
| 17 | −80.4643 | 1.50 |  |  |  |  |
| 18 | 80.5910 | 10.00 | 1.64000 | 60.2 | 60 | 3.1 |
| 19 | 331.6966 | 1.50 |  |  |  |  |
| 20 | 46.9469 | 12.97 | 1.64000 | 60.2 | 60 | 3.1 |
| 21 | −58.1306 | 16.52 | 1.67300 | 38.2 | 86 | 3.8 |
| 22 | 28.2174 | 6.00 |  |  |  |  |
| 23 | −139.7020 | 4 | 1.58887 | 61.1 | 66 | 3.6 |
| 24** | 166.7557 | 44.15 |  |  |  |  |

(Diffractive Optical Surface Data)

Surface 12

$C_1 = -2.1365E-04$, $C_2 = 1.4571E-07$, $C_3 = -1.5878E-11$, $C_4 = 4.9179E-13$ (Aspheric Surface Data)

Surface 24

$\kappa = 5.9891$, $A_4 = 0.96937E-05$, $A_6 = 0.71343E-08$, $A_8 = 0.16788E-10$, $A_{10} = 0$ As will be understood from Table 9, the lens surface of the first lens group G1 that is closest toward the object side (i.e. its first surface) is a plane. Due to this, as described above, it is possible to keep the influence of minute defects such as particles of waste or the like to a minimum.

Moreover, with the inverted equal-magnification relay lens 100 according to this ninth example, the values related to Conditions (1) through (3), (5) through (11), (18) through (21), and (23) through (27) described above are as given below. Since, as shown below, the inverted equal-magnification relay lens 100 according to this ninth example satisfies Conditions (1) through (3), (5) through (11), (18)

through (21), and (23) through (27), accordingly it is possible to obtain the advantageous effects described above.

| | |
|---|---|
| $\|G1F/G2F\|=1.12$ | Condition (1): |
| $\|G3F/G2F\|=2.41$ | Condition (2): |
| $\|E_{G1\text{-}G2}/E_{G2\text{-}G3}\|=2.4$ | Condition (3): |
| $\|Y/G3F\|=0.17$ | Condition (5): |
| ENT.P/EXT.P=0.97 | Condition (6): |
| $WD=3.00\ 50\cdot\lambda/NA^2=1.88$ | Condition (7): |
| $D/Y=2.04$ | Condition (8): |

Condition (9):

$$Y \cdot \sum_{i=1}^{4}\left\{\frac{1}{R_i}\left(\frac{1}{n_i}-\frac{1}{n_{i-1}}\right)\right\} = 0.93 \quad \text{[Equation 17]}$$

| | |
|---|---|
| $n_{dG1}=1.81600$ (positive lens $L1$ of first lens group $G1$) | Condition (10): |
| $\nu_{dG1}=46.6$ (positive lens $L1$ of first lens group $G1$) | Condition (11): |
| $\nu d_{G2DN}=34.7$ (negative lens $L8$ of first doublet lens DL1) | |
| $\nu d_{G2DN}=38.2$ (negative lens $L11$ of second doublet lens DL2) | Condition (18): |
| $\Delta\theta g, F_{G2DN}=-0.0017$ (negative lens $L8$ of first doublet lens DL1) | |
| $\Delta\theta g, F_{G2DN}=-0.0044$ (negative lens $L11$ of second doublet lens DL2) | Condition (19): |
| $\nu d_{G2DP}=65.4$ (positive lens $L7$ of first doublet lens DL1) | |
| $\nu d_{G2DP}=60.2$ (positive lens $L10$ of second doublet lens DL2) | Condition (20): |
| $\Delta\theta g, F_{G2DP}=0.0033$ (positive lens $L7$ of first doublet lens DL1) | |
| $\Delta\theta g, F_{G2DP}=-0.0064$ (positive lens $L10$ of second doublet lens DL2) | Condition (21): |
| $\|f_{DOE}/G2F\|=40.5$ | Condition (23): |
| $P_{min}=0.13$ | Condition (24): |
| $\Phi_{DOE}/\Phi_{MAX}=0.65$ | Condition (25): |

Condition (26):

$$\left|\sum_{i=1}^{12}\left(\alpha_i - \frac{dn_i/dT}{n_i-1}\right)\cdot\frac{h_i^2}{f_i} + 2\alpha_{DOE}\cdot\frac{h_{DOE}^2}{f_{DOE}}\right| = 2.4\times10^{-7} \quad \text{[Equation 18]}$$

| | |
|---|---|
| $Y/TL=0.086$ | Condition (27): |

Yet further since, in this ninth example, the maximum angle of the light beam that is incident upon the diffractive optical surface (i.e. the twelfth surface) with respect to the normal to base radius of curvature is 19.4°, and is thus within 25°, accordingly almost no influence from flare is experienced, and it is possible to obtain a satisfactory image.

Figure 28:
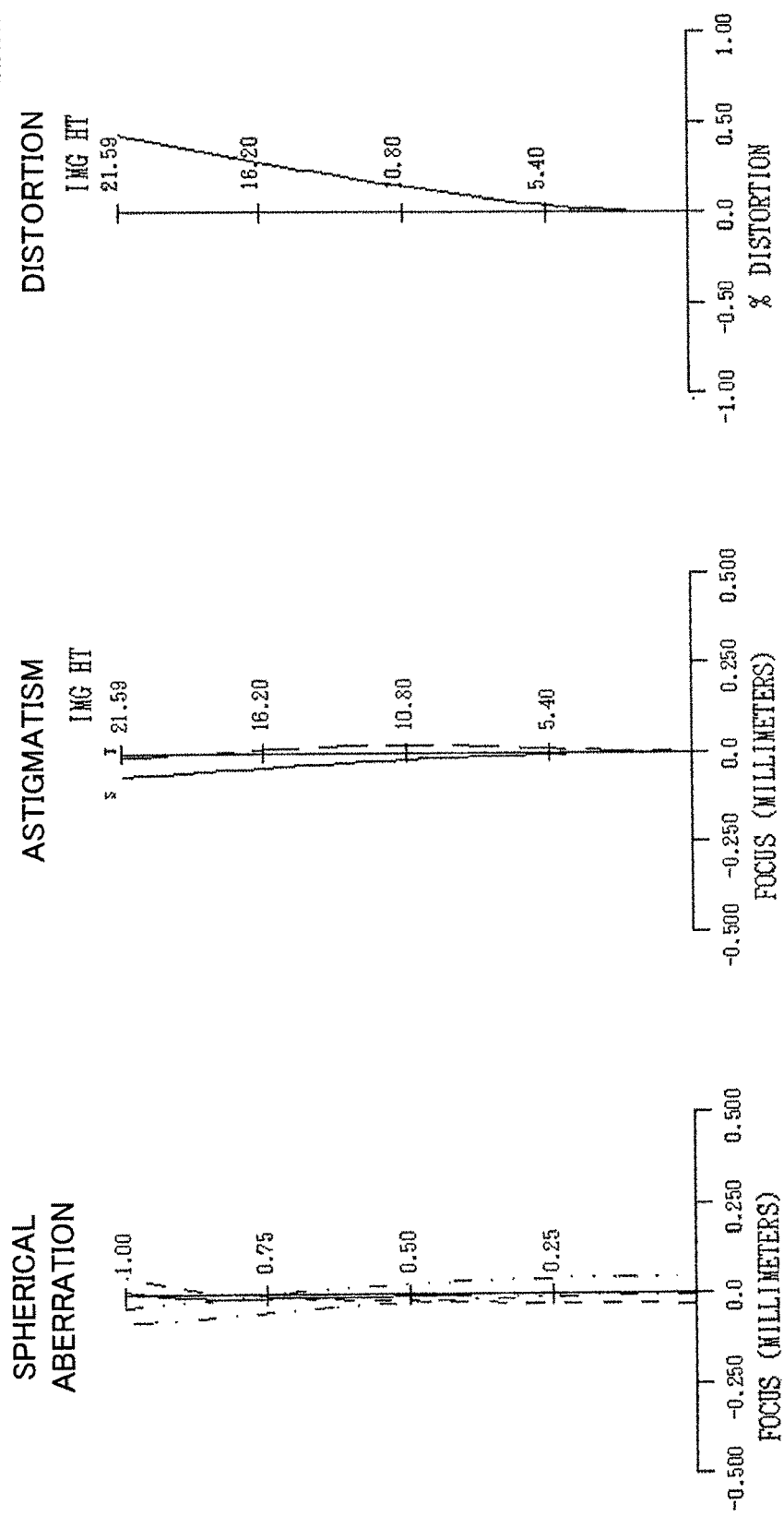
FIG. 28 is a figure showing spherical aberration, astigmatism, and distortion of this inverted equal-magnification relay lens according to the ninth example.

FIG. 28 is a figure showing the spherical aberration, the astigmatism, and the distortion of this inverted equal-magnification relay lens 100 according to this ninth example. And FIG. 29 is a figure showing the comatic aberration of this inverted equal-magnification relay lens 100 according to the ninth example. As will be clear from the aberrations shown in FIGS. 28 and 29, with this inverted equal-magnification relay lens 100 according to the ninth example as well, all of the aberrations are corrected satisfactorily.

Yet further, with this inverted equal-magnification relay lens 100 according to the ninth example, when the temperature of the environment increases by +20° C., according to the values of the thermal expansion coefficient α and the relative refractive index temperature coefficient dn/dT shown in Table 9, actually the amount of fluctuation of the back focus position after the radius of curvature of each of the optical surfaces, the surface gaps between the optical surfaces, and the refractive indexes have changed is restricted within 0.01 mm, so that the lens is satisfactorily athermalized. Here, it is assumed that the air surface gaps between the optical surfaces are fixed by members made from aluminum (whose coefficient of thermal expansion at normal temperature is $234\times10^{-7}/°$ C.).

According to the embodiment explained above, the following advantageous effects are obtained.

(1) The inverted equal-magnification relay lens 100 comprises, in order from the object side, the first lens group G1 that is disposed near the object and that has a positive power, the second lens group G2 that is disposed so as to be separated from the first lens group G1 by a certain distance and that has a positive power, and the third lens group G3 that has a negative power; and the entrance pupil position is more toward the side of the object surface O than the first lens group G1, while the exit pupil position is more toward the side of the third lens group G3 than the image surface I. Since, in this manner, it is arranged for the entrance pupil position of the inverted equal-magnification relay lens 100 to be more toward the side of the object surface O than the first lens group G1, accordingly, when the inverted equal-magnification relay lens 100 has been inserted between the interchangeable lens 10 and the camera body 20, it is possible to bring the exit pupil position of the interchangeable lens 10 and the entrance pupil position of the inverted equal-magnification relay lens 100 close to one another. Accordingly, it is possible to ensure an appropriate image height.

(2) Furthermore, it is desirable for the positional relationship between the exit pupil position of the inverted equal-magnification relay lens 100 and the image formation surface in the camera body 20 (in other words, the image surface I of the inverted equal-magnification relay lens 100), and the positional relationship between the exit pupil position of the interchangeable lens 10 when the interchangeable lens 10 is directly attached to the camera body 20 and the image formation surface in the camera body 20 (in other words, the focal plane of the interchangeable lens 10), generally to agree with one another. Thus, with the inverted equal-magnification relay lens 100 of this embodiment, it is arranged to set the exit pupil position more toward the side of the third lens group G3 than the image surface I.

Furthermore, when the inverted equal-magnification relay lens 100 has been inserted between the interchangeable lens 10 and the camera body 20, the focal plane of the interchangeable lens 10 (in other words, the image formation surface due to the interchangeable lens 10) becomes the object surface O of the inverted equal-magnification relay lens 100. And, when the entrance pupil position of the inverted equal-magnification relay lens 100 and the exit pupil position of the interchangeable lens 10 generally agree with one another, then the positional relationship between the focal plane and the exit pupil position of the interchangeable lens 10, and the positional relationship between the object surface O of the and the entrance pupil position inverted equal-magnification relay lens 100 generally agree with one another. Accordingly, if it is ensured that the positional relationship between the object surface O and the entrance pupil position, and the positional relationship between the exit pupil position and the image surface I, of the inverted equal-magnification relay lens 100 generally agree with one another, then it may be considered that the positional relationship between the exit pupil position and the focal plane of the interchangeable lens 10, and the positional relationship between the exit pupil position and the image surface I of the inverted equal-magnification relay lens 100, generally agree with one another. Based upon this, with the inverted equal-magnification relay lens 100, at the maximum image height, it is arranged for the distance from the object surface O to the entrance pupil plane, and the distance from the exit pupil plane to the image surface I, to be approximately the same (in other words, it is arranged for Condition (6) to be satisfied). Due to this, it is possible to make the positional relationship between the image formation surface of the camera body 20 and the exit pupil position of the inverted equal-magnification relay lens 100, and the positional relationship, when the interchangeable lens 10 is directly attached to the camera body 20, between the image formation surface of the camera body 20 and the exit pupil position of the interchangeable lens 10, generally to agree with one another. Accordingly, it is possible to perform proper image forming up to an image height that reaches the edge of the field of view, without causing vignetting to be generated.

(3) Furthermore, in the inverted equal-magnification relay lens 100, the second lens group G2 includes an optical member that comprises a glass member and a diffractive optical element PF that is bonded to that glass member, and this diffractive optical element PF is made by bonding together two different resin members, and has a diffractive optical surface C at the interface between these resin members upon which diffraction grating grooves are formed. Due to this, by combining this diffractive optical element PF with normal optical glass (i.e. a refracting optical element), it becomes possible to perform satisfactory correction of chromatic aberration, which cannot be done with normal glass, and thus it becomes possible to perform satisfactory correction of chromatic aberration, which can only otherwise be done with special anomalous dispersion glass which is high in price. Furthermore, since use of a lot of anomalous dispersion glass, which is effective for on-axis aberration correction, is also connected to fluctuation of the back focus position originating due to change of the temperature of the environment, accordingly, in relation to this aspect as well, the fact of provision of the diffractive optical element PF having the diffractive optical surface C is effective for suppressing fluctuation of the back focus position originating due to change of the temperature of the environment.

(4) Furthermore, with this inverted equal-magnification relay lens 100, because of the fact that the third lens group G3 which has a negative power includes an aspheric optical surface, accordingly it is possible to shorten the total length of the lens from the object surface to the image surface, and thus it is possible to make this inverted equal-magnification relay lens 100 more compact.

Variant Embodiments

While, in the embodiments described above, examples were explained in which, in the first camera system 1 and the second camera system 2, the camera body which had the image sensor 21 was a digital camera, it would also be possible for it to be a film camera.

In the intermediate adapter 30 of the second camera system described above, it would also be acceptable to arrange for a field lens to be disposed more toward the side of the interchangeable lens 10 than the micro array 33.

In the inverted equal-magnification relay lens 100 described above, if the second lens group G2 includes a first cemented meniscus lens that presents a concave surface to the image side and that comprises one or more positive lenses and/or negative lenses, and a single concave meniscus lens that sandwiches an aperture stop between itself and the first cemented meniscus lens and that presents its concave surface to the object side, then it would also be acceptable for the first cemented meniscus lens described above to be a three-layered cemented lens.

While various examples have been explained in the above description, the present invention should not be considered as being limited to the details of those examples. Other variations that are considered to be within the range of the technical concept of the present invention are also included within the scope of the present invention.

The disclosure of the following priority applications are herein incorporated by reference.

Japanese Patent Application No. 2014-097568 (filed on May 9, 2014).

REFERENCE SIGNS LIST

1 . . . first camera system; 2 . . . second camera system; 10 . . . interchangeable lens; 11 . . . photographic lens; 20 . . . camera body; 21 image sensor; 30 intermediate adapter; 33 . . . micro lens array; 100 . . . inverted equal-magnification relay lens G1 . . . first lens group; G2 . . . second lens group; G3 . . . third lens group; ML . . . cemented meniscus lens; ML1 . . . first cemented meniscus lens; ML2 . . . second cemented meniscus lens; DL1 . . . first cemented doublet lens DL2: second cemented doublet lens

The invention claimed is:

1. An inverted equal-magnification relay lens comprising, in order from an object side:
a first lens group having a positive power, and disposed near an object;
a second lens group having a positive power, and disposed at a predetermined distance from the first lens group; and
a third lens group having a negative power,
wherein an entrance pupil position is more toward an object surface side than the first lens group, an exit pupil position is more toward a third lens group side than an image surface, and the following Formulas (1), (2), and (3) are satisfied:

$$0.65 \leq |G1F/G2F| \leq 2.0 \quad (1)$$

$$0.35 \leq |G3F/G2F| \leq 3.1 \quad (2)$$

$$1.7 \leq |E_{G1-G2}/E_{G2-G3}| \leq 6.2 \quad (3)$$

where:
G1F: a focal length of the first lens group;
G2F: a focal length of the second lens group;
G3F: a focal length of the third lens group;
$E_{G1\text{-}G2}$ is a distance between an image side principal point of the first lens group and an object side principal point of the second lens group; and
$E_{G2\text{-}G3}$ is the distance between an image side principal point of the second lens group and an object side principal point of the third lens group.

2. The inverted equal-magnification relay lens according to claim 1, wherein focusing is performed by shifting one of lenses comprised in the second lens group.

3. The inverted equal-magnification relay lens according to claim 1, wherein:
the second lens group comprises, in order from the object side
a first cemented meniscus lens that presents its concave surface toward the image side and that comprises a positive lens and a negative lens, and
a single concave meniscus lens or a second cemented meniscus lens comprising a negative lens and a positive lens, opposing the first cemented meniscus lens with an aperture stop being sandwiched between them, and presenting its concave surface toward the object side;
the third lens group comprises a biconcave lens;
an object side NA is less than or equal to 0.125; and
a following Formula (5) is satisfied:

$$|Y/G3F| \geq 0.12 \qquad (5)$$

where:
Y (>0): a maximum image height; and
G3F: a focal length of the third lens group.

4. The inverted equal-magnification relay lens according to claim 1, wherein the following Formula (6) is satisfied:

$$0.9 \leq \text{ENT.P/EXT.P} \leq 1.1 \qquad (6)$$

where:
ENT.P: a distance from an object surface to an entrance pupil plane at a maximum image height; and
EXT.P: a distance from an exit pupil plane to an image surface at a maximum image height.

5. The inverted equal-magnification relay lens according to claim 1, wherein:
a lens surface in the first lens group most toward the object side is a plane or a convex surface with respect to the object; and
following Formulas (7) and (8) are satisfied:

$$WD \geq 50 \cdot \lambda / NA^2 \qquad (7)$$

$$D/Y \geq 1.8 \qquad (8)$$

where:
WD: a distance from an object surface to the lens surface of the first lens group most toward the object side;
$\lambda$: a main wavelength used;
NA: an object side numerical aperture;
D: a distance from the lens surface of the third lens group most toward the image surface side to the image surface; and
Y (>0): a maximum image height.

6. The inverted equal-magnification lens according to claim 1, wherein:
the second lens group comprises
a first cemented meniscus lens that presents its concave surface toward the image side and that comprises a positive lens and a negative lens, and
a single concave meniscus lens or a second cemented meniscus lens comprising a negative lens and a positive lens, opposing the first cemented meniscus lens with an aperture stop being sandwiched between them, and presenting its concave surface toward the object side;
the third lens group comprises a biconcave lens; and
the following Condition (9) is satisfied:

[Equation 1]

$$0.55 \leq Y \cdot \sum_{i=1}^{4} \left\{ \frac{1}{R_i} \left( \frac{1}{n_i} - \frac{1}{n_{i-1}} \right) \right\} \leq 1.5 \qquad \text{[Condition (9)]}$$

where:
Y (>0): a maximum image height the suffix i=1: a concave surface of the first cemented meniscus lens toward the image side;
the suffix i=2: a concave surface of the second cemented meniscus lens or the single concave meniscus lens toward the object side;
the suffix i=3: a concave surface of the biconcave lens of the third lens group toward the object side;
the suffix i=4: a concave surface of the biconcave lens of the third lens group toward the image side;
$R_i$: a radius of curvature of a lens surface corresponding to the suffix i;
$n_{i-1}$: a refractive index of medium on the object side with respect to the lens surface corresponding to the suffix i; and
$n_i$: a refractive index of medium on the image side with respect to the lens surface corresponding to the suffix i.

7. The inverted equal-magnification relay lens according to claim 1, wherein:
the second lens group comprises
a first cemented meniscus lens that presents its concave surface toward the image side and that comprises a positive lens and a negative lens, and
a single concave meniscus lens or a second cemented meniscus lens comprising a negative lens and a positive lens, opposing the first cemented meniscus lens with an aperture stop being sandwiched between them, and presenting its concave surface toward the object side; and
at least one of the first cemented meniscus lens and the second cemented meniscus lens is a three-layered cemented lens.

8. The equal-magnification relay lens according to claim 1, wherein:
the second lens group comprises
a first cemented meniscus lens that presents its concave surface toward the image side and that comprises a positive lens and a negative lens, and
a single concave meniscus lens or a second cemented meniscus lens comprising a negative lens and a positive lens, opposing the first cemented meniscus lens with an aperture stop being sandwiched between them, and presenting its concave surface toward the object side; and
furthermore, in addition to the first cemented meniscus lens and the second cemented meniscus lens or the single concave meniscus lens, the second lens group also comprises at least one cemented doublet lens comprising a negative lens and a positive lens.

9. The inverted equal-magnification relay lens according to claim 1, wherein:
the second lens group comprises an optical member comprising a glass member and a diffractive optical element bonded to the glass member; and
the diffractive optical element comprises two different resin members that are bonded together, and has a diffractive optical surface at the interface therebetween upon which diffraction grating grooves are formed.

10. The inverted equal-magnification relay lens according to claim 9, wherein a following Condition (23) is satisfied:

$$23.0 \leq |f_{DOE}/G2F| \leq 57.0 \tag{23}$$

where:
G2F: a focal length of the second lens group; and
$f_{DOE}$: a focal length of the diffractive optical element.

11. The inverted equal-magnification relay lens according to claim 9, wherein a following Condition (24) is satisfied:

$$0.09 \leq P_{min} \leq 0.20 \tag{24}$$

where:
$P_{min}$: the minimum pitch of the diffraction grating grooves of the diffractive optical element.

12. The equal-magnification relay lens according to claim 9, wherein the following Condition (25) is satisfied:

$$0.4 \leq \Phi_{DOE}/\Phi_{MAX} \leq 0.9 \tag{25}$$

where:
$\Phi_{DOE}$: a diameter of a light flux passing through the diffractive optical surface of the diffractive optical element; and
$\Phi_{MAX}$: a maximum diameter of a light flux passing through the second lens group.

13. The inverted equal-magnification relay lens according to claim 9, wherein a maximum angle of a light beam that is incident upon the diffractive optical surface of the diffractive optical element is limited to within 25° with respect to a normal to a base radius of curvature that forms the diffractive optical surface.

14. The equal-magnification relay lens according to claim 9, wherein the following Condition (26) is satisfied in relation to the m unit lens elements and the diffractive optical element that constitute the entirety of the inverted equal-magnification relay lens:

[Equation 2]

$$\left| \sum_{i=1}^{m} \left( \alpha_i - \frac{dn_i/dT}{n_i - 1} \right) \cdot \frac{h_i^2}{f_i} + 2\alpha_{DOE} \cdot \frac{h_{DOE}^2}{f_{DOE}} \right| \leq 4.5 \times 10^{-7}, \quad \text{[Condition (26)]}$$

where:
m: a total number of unit lens elements that make up the inverted equal-magnification relay lens;
$\alpha_i$: a thermal expansion coefficient of an optical member that constitutes the i-th unit lens element among the m unit lens elements;
$n_i$: a d ray refractive index of an optical member that constitutes the i-th unit lens element among the m unit lens elements
$dn_i/dT$: the relative refractive index temperature coefficient for d rays of an optical member that constitutes the i-th unit lens element among the m unit lens elements
$f_i$: a focal length of an optical member that constitutes the i-th unit lens element among the m unit lens elements
$h_i$: an average value of relative incident heights upon the two sides of an optical member that constitutes the i-th unit lens element among the m unit lens elements, when incident heights at which a paraxial light beam emitted from an on-axis object point and being incident upon this inverted equal-magnification relay lens is incident upon each of optical members of this inverted equal-magnification relay lens are taken as relative incident heights by normalizing a maximum incident height as unity;
$\alpha_{DOE}$: an average thermal expansion coefficient of the two resin members that constitute the diffractive optical element;
$f_{DOE}$: a focal length of the diffractive optical element; and
$h_{DOE}$: an average value of relative incident heights upon three surfaces of the diffractive optical element, when the incident heights at which a paraxial light beam emitted from an on-axis object point and being incident upon this inverted equal-magnification relay lens is incident upon each of optical members of this inverted equal-magnification relay lens are taken as relative incident heights by normalizing a maximum incident height as unity.

15. The equal-magnification relay lens according to claim 9, wherein the third lens group comprises an aspheric optical surface, and the following Condition (27) is satisfied:

$$Y/TL \geq 0.08 \tag{27}$$

where:
Y (>0): a maximum image height; and
TL: a lens total length, from object surface to image surface.

16. The equal-magnification relay lens according to claim 1, further comprising:
an optical axis folding member that is disposed between the first lens group and the second lens group, wherein
the optical axis folding member folds the optical axis between the first lens group and the second lens group into a cranked shape.

17. A camera system comprising:
an attachable and detachable interchangeable lens;
an attachable and detachable camera body; and
an intermediate adapter installed between the interchangeable lens and the camera body, wherein:
the intermediate adapter comprises an inverted equal-magnification relay lens according to claim 1; and
the inverted equal-magnification relay lens makes the focal plane of the interchangeable lens and the image formation surface of the camera body be conjugate with each other.

18. A camera system comprising:
an attachable and detachable interchangeable lens;
an attachable and detachable camera body; and
an intermediate adapter installed between the interchangeable lens and the camera body, wherein:
the intermediate adapter includes an optical element comprising a plurality of lenses arranged in a two dimensional array, and an inverted equal-magnification relay lens according to claim 1;
the optical element is disposed in the vicinity of the focal plane of the interchangeable lens; and
the inverted equal-magnification relay lens makes the focal plane of the optical element and the image formation surface of the camera body be conjugate with each other.

19. An inverted equal-magnification relay lens comprising, in order from an object side:

a first lens group having a positive power, and disposed near an object;

a second lens group (i) having a positive power, (ii) disposed at a predetermined distance from the first lens group, and (iii) comprising, in order from the object side a first cemented meniscus lens that presents its concave surface toward an image side and that comprises a positive lens and a negative lens, and a single concave meniscus lens or a second cemented meniscus lens comprising a negative lens and a positive lens, opposing the first cemented meniscus lens with an aperture stop being sandwiched between them, and presenting its concave surface toward the object side; and a third lens group having a negative power and comprising a biconcave lens, wherein:

an object side NA is less than or equal to 0.125; and an entrance pupil position is more toward an object surface side than the first lens group, an exit pupil position is more toward a third lens group side than an image surface, and the following Formulas (1), (2), and (5) are satisfied:

$$0.65 \leq |G1F/G2F| \leq 2.0 \qquad (1)$$

$$0.35 \leq |G3F/G2F| \leq 3.1 \qquad (2)$$

$$|Y/G3F| > 0.12 \qquad (5)$$

where:
G1F: a focal length of the first lens group;
G2F: a focal length of the second lens group;
G3F: a focal length of the third lens group; and
Y (>0): a maximum image height.

20. An inverted equal-magnification relay lens comprising, in order from an object side:

a first lens group having a positive power, and disposed near an object;

a second lens group (i) having a positive power, (ii) disposed at a predetermined distance from the first lens group, and (iii) comprising a first cemented meniscus lens that presents its concave surface toward an image side and that comprises a positive lens and a negative lens, and a single concave meniscus lens or a second cemented meniscus lens comprising a negative lens and a positive lens, opposing the first cemented meniscus lens with an aperture stop being sandwiched between them, and presenting its concave surface toward the object side; and a third lens group having a negative power and comprising a biconcave lens, wherein an entrance pupil position is more toward an object surface side than the first lens group, an exit pupil position is more toward a third lens group side than an image surface, and the following Formulas (1) and (2) and Condition (9) are satisfied:

$$0.65 \leq |G1F/G2F| \leq 2.0 \qquad (1)$$

$$0.35 \leq |G3F/G2F| \leq 3.1 \qquad (2)$$

$$0.55 \leq Y \cdot \sum_{i=1}^{4} \left\{ \frac{1}{R_i} \left( \frac{1}{n_i} - \frac{1}{n_{i-1}} \right) \right\} \leq 1.5 \qquad [\text{Condition (9)}]$$

where:
G1F: a focal length of the first lens group;
G2F: a focal length of the second lens group;
G3F: a focal length of the third lens group;
Y (>0): a maximum image height;
the suffix i=1: a concave surface of the first cemented meniscus lens toward the image side;
the suffix i=2: a concave surface of the second cemented meniscus lens or the single concave meniscus lens toward the object side;
the suffix i=3: a concave surface of the biconcave lens of the third lens group toward the object side;
the suffix i=4: a concave surface of the biconcave lens of the third lens group toward the image side;
$R_i$: a radius of curvature of a lens surface corresponding to the suffix i;
$n_{i-1}$: a refractive index of medium on the object side with respect to the lens surface corresponding to the suffix i; and
$n_i$: a refractive index of medium on the image side with respect to the lens surface corresponding to the suffix i.

21. An inverted equal-magnification relay lens comprising, in order from an object side:

a first lens group having a positive power, and disposed near an object;

a second lens group (i) having a positive power, (ii) disposed at a predetermined distance from the first lens group, and (iii) comprising a first cemented meniscus lens that presents its concave surface toward an image side and that comprises a positive lens and a negative lens, and a single concave meniscus lens or a second cemented meniscus lens comprising a negative lens and a positive lens, opposing the first cemented meniscus lens with an aperture stop being sandwiched between them, and presenting its concave surface toward the object side; and a third lens group having a negative power, wherein:

at least one of the first cemented meniscus lens and the second cemented meniscus lens is a three-layered cemented lens; and an entrance pupil position is more toward an object surface side than the first lens group, an exit pupil position is more toward a third lens group side than an image surface, and the following Formulas (1) and (2) are satisfied:

$$0.65 \leq |G1F/G2F| \leq 2.0 \qquad (1)$$

$$0.35 \leq |G3F/G2F| \leq 3.1 \qquad (2)$$

where:
G1F: a focal length of the first lens group;
G2F: a focal length of the second lens group; and
G3F: a focal length of the third lens group.

22. An inverted equal-magnification relay lens comprising, in order from an object side:

a first lens group having a positive power, and disposed near an object;

a second lens group (i) having a positive power, (ii) disposed at a predetermined distance from the first lens group, and (iii) comprising a first cemented meniscus lens that presents its concave surface toward an image side and that comprises a positive lens and a negative lens, a single concave meniscus lens or a second cemented meniscus lens comprising a negative lens and a positive lens, opposing the first cemented meniscus lens with an aperture stop being sandwiched between them, and presenting its concave surface toward the object side, and at least one cemented doublet lens comprising a negative lens and a positive lens; and a third lens group having a negative power, wherein an entrance pupil position is more toward an object surface side than the first lens group, an exit pupil position is more toward a third lens group side than an image surface, and the following Formulas (1) and (2) are satisfied:

$$0.65 \leq |G1F/G2F| \leq 2.0 \tag{1}$$

$$0.35 \leq |G3F/G2F| \leq 3.1 \tag{2}$$

where:
G1F: a focal length of the first lens group;
G2F: a focal length of the second lens group; and
G3F: a focal length of the third lens group.

23. An inverted equal-magnification relay lens comprising, in order from an object side:
a first lens group having a positive power, and disposed near an object;
a second lens group (i) having a positive power, (ii) disposed at a predetermined distance from the first lens group, and (iii) comprising an optical member comprising a glass member and a diffractive optical element bonded to the glass member; and
a third lens group having a negative power, wherein:
the diffractive optical element comprises two different resin members that are bonded together and has a diffractive optical surface at the interface therebetween upon which diffraction grating grooves are formed; and
an entrance pupil position is more toward an object surface side than the first lens group, an exit pupil position is more toward a third lens group side than an image surface, and the following Formulas (1) and (2) are satisfied:

$$0.65 \leq |G1F/G2F| \leq 2.0 \tag{1}$$

$$0.35 \leq |G3F/G2F| \leq 3.1 \tag{2}$$

where:
G1F: a focal length of the first lens group;
G2F: a focal length of the second lens group; and
G3F: a focal length of the third lens group.

24. An inverted equal-magnification relay lens comprising, in order from an object side:
a first lens group having a positive power, and disposed near an object;
a second lens group having a positive power, and disposed at a predetermined distance from the first lens group;
a third lens group having a negative power; and
an optical axis folding member (i) that is disposed between the first lens group and the second lens group and (ii) that folds the optical axis between the first lens group and the second lens group into a cranked shape,
wherein an entrance pupil position is more toward an object surface side than the first lens group, an exit pupil position is more toward a third lens group side than an image surface, and the following Formulas (1) and (2) are satisfied:

$$0.65 \leq |G1F/G2F| \leq 2.0 \tag{1}$$

$$0.35 \leq |G3F/G2F| \leq 3.1 \tag{2}$$

where:
G1F: a focal length of the first lens group;
G2F: a focal length of the second lens group; and
G3F: a focal length of the third lens group.

* * * * *